United States Patent
Brown et al.

(10) Patent No.: US 11,728,494 B2
(45) Date of Patent: Aug. 15, 2023

(54) COMPACT HIGH TEMPERATURE ELECTROCHEMICAL CELL STACK ARCHITECTURE

(71) Applicant: Versa Power Systems Ltd., Danbury, CT (US)

(72) Inventors: Casy Cloudless Brown, Calgary (CA); Khun Bong Luc, Calgary (CA); Cameron James Rankin, Calgary (CA)

(73) Assignee: VERSA POWER SYSTEMS LTD, Danbury, CT (US)

( * ) Notice: Subject to any disclaimer, the term of this patent is extended or adjusted under 35 U.S.C. 154(b) by 445 days.

(21) Appl. No.: 16/668,344

(22) Filed: Oct. 30, 2019

(65) Prior Publication Data

US 2020/0106110 A1 Apr. 2, 2020

Related U.S. Application Data

(63) Continuation of application No. PCT/IB2018/053099, filed on May 4, 2018.
(Continued)

(51) Int. Cl.
*H01M 8/026* (2016.01)
*H01M 8/0271* (2016.01)
(Continued)

(52) U.S. Cl.
CPC ......... *H01M 8/026* (2013.01); *H01M 8/0271* (2013.01); *H01M 8/2432* (2016.02);
(Continued)

(58) Field of Classification Search
CPC .................................................... H01M 8/026
See application file for complete search history.

(56) References Cited

U.S. PATENT DOCUMENTS

| 4,910,100 A | 3/1990 | Nakanishi et al. |
| 5,399,442 A | 3/1995 | Shundo |

(Continued)

FOREIGN PATENT DOCUMENTS

| CN | 1360740 | 7/2002 |
| JP | 11-503858 | 3/1999 |

(Continued)

OTHER PUBLICATIONS

Extended European Search Report for EP18795160.3, dated Jan. 18, 2021 (7 pages).

(Continued)

*Primary Examiner* — Brian R Ohara
(74) *Attorney, Agent, or Firm* — Foley & Lardner LLP

(57) ABSTRACT

An electrochemical cell unit comprises a first electrochemical cell comprising a first oxidant electrode and a first fuel electrode, and a second electrochemical cell comprising a second oxidant electrode and a second fuel electrode. An interconnect interposed between the first electrochemical cell and the second electrochemical cell. The interconnect comprises an interconnect main body defining a longitudinal channel along a longitudinal axis thereof. The interconnect main body includes a plurality of corrugations defining a plurality of fuel channels on a first surface of the interconnect main body facing the first electrochemical cell, and a plurality of oxidant channels on a second surface of the interconnect main body facing the second electrochemical cell. Each of the plurality of fuel channels and the plurality of oxidant channel positioned around the longitudinal channel.

33 Claims, 36 Drawing Sheets

Related U.S. Application Data

(60) Provisional application No. 62/501,633, filed on May 4, 2017.

(51) Int. Cl.
  *H01M 8/2432* (2016.01)
  *H01M 8/2475* (2016.01)
  *H01M 8/2485* (2016.01)
  *H01M 8/12* (2016.01)

(52) U.S. Cl.
  CPC ....... *H01M 8/2475* (2013.01); *H01M 8/2485* (2013.01); *H01M 2008/1293* (2013.01)

(56) References Cited

U.S. PATENT DOCUMENTS

| | | | |
|---|---|---|---|
| 5,549,983 A * | 8/1996 | Yamanis | H01M 8/2483 |
| | | | 429/469 |
| 6,258,474 B1 | 7/2001 | Diethelm et al. | |
| 6,296,962 B1 | 10/2001 | Minh | |
| 6,344,290 B1 | 2/2002 | Bossel | |
| 6,844,100 B2 | 1/2005 | Bourgeois et al. | |
| 7,014,934 B2 | 3/2006 | Novak | |
| 7,759,016 B2 | 7/2010 | Itoh | |
| 7,832,737 B2 | 11/2010 | Chou et al. | |
| 8,168,346 B2 | 5/2012 | Kushibiki et al. | |
| 8,383,282 B2 | 2/2013 | Reinert | |
| 8,535,846 B2 | 9/2013 | Kushibiki et al. | |
| 8,609,295 B2 | 12/2013 | Ibuka et al. | |
| 8,623,569 B2 | 1/2014 | Gottmann et al. | |
| 2002/0045087 A1 * | 4/2002 | Sugita | H01M 8/247 |
| | | | 429/476 |
| 2003/0054215 A1 | 3/2003 | Doshi et al. | |
| 2004/0234836 A1 * | 11/2004 | Orishima | H01M 8/2432 |
| | | | 429/457 |
| 2006/0210858 A1 | 9/2006 | Warrier et al. | |
| 2006/0286428 A1 | 12/2006 | Weng et al. | |
| 2009/0194219 A1 | 8/2009 | Day et al. | |
| 2012/0107714 A1 | 5/2012 | Day et al. | |
| 2012/0178012 A1 | 7/2012 | Min et al. | |
| 2012/0196194 A1 | 8/2012 | Perry et al. | |
| 2012/0302717 A1 | 11/2012 | Zhou et al. | |
| 2013/0130144 A1 | 5/2013 | Todo et al. | |
| 2013/0177829 A1 | 7/2013 | Homma | |
| 2014/0332145 A1 | 11/2014 | Gottmann et al. | |
| 2015/0180079 A1 | 6/2015 | Leger et al. | |

FOREIGN PATENT DOCUMENTS

| | | | |
|---|---|---|---|
| JP | 2005-276780 | 10/2005 | |
| JP | 2007-141841 A | 6/2007 | |
| JP | 2010-033865 | 2/2010 | |
| JP | 2012-014916 A | 1/2012 | |
| JP | 2014-072028 A | 4/2014 | |
| JP | 2014-143052 A | 8/2014 | |
| JP | 2015-089950 A | 5/2015 | |
| WO | WO-99/67845 A1 | 12/1999 | |
| WO | WO-9967845 A1 * | 12/1999 | ............... C25B 9/18 |
| WO | WO-2012/015113 A1 | 2/2012 | |

OTHER PUBLICATIONS

International Search Report and Written Opinion in PCT/IB2018/053099 dated Aug. 24, 2018 (15 pages).

* cited by examiner

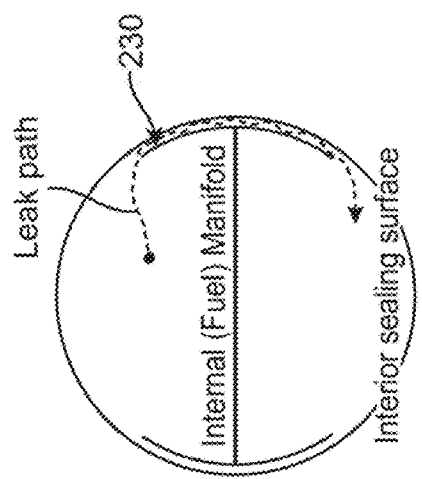
FIG. 3
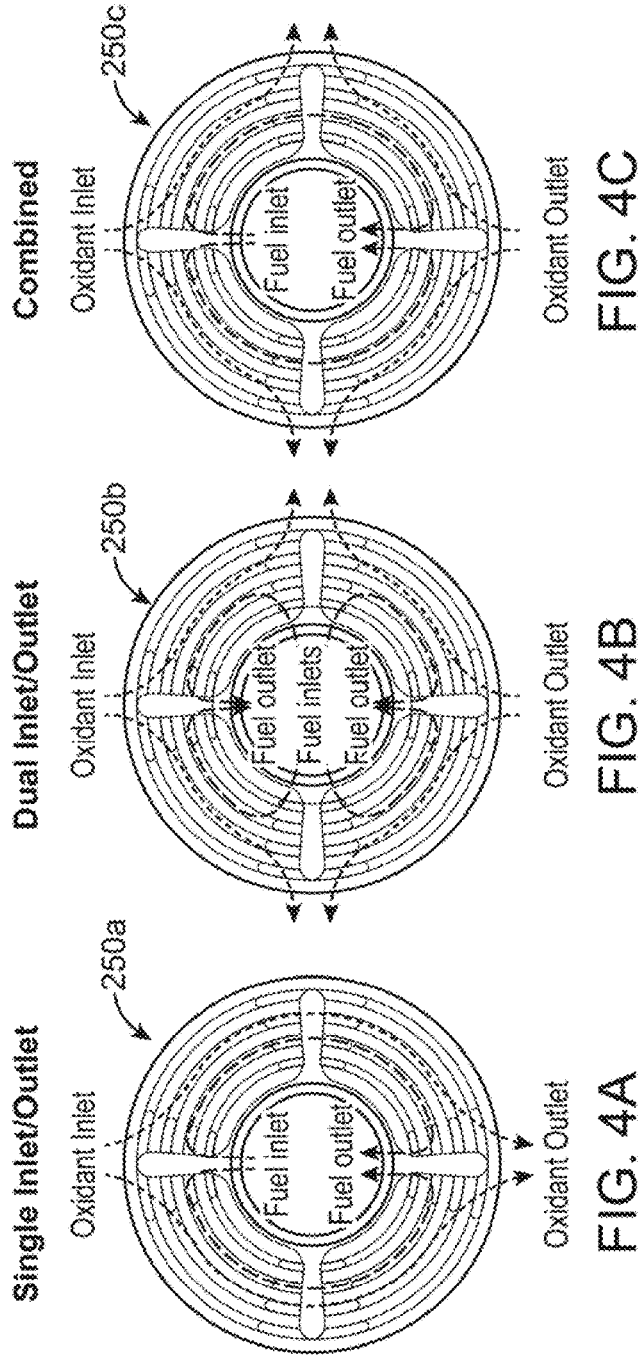
FIG. 4A
FIG. 4B
FIG. 4C

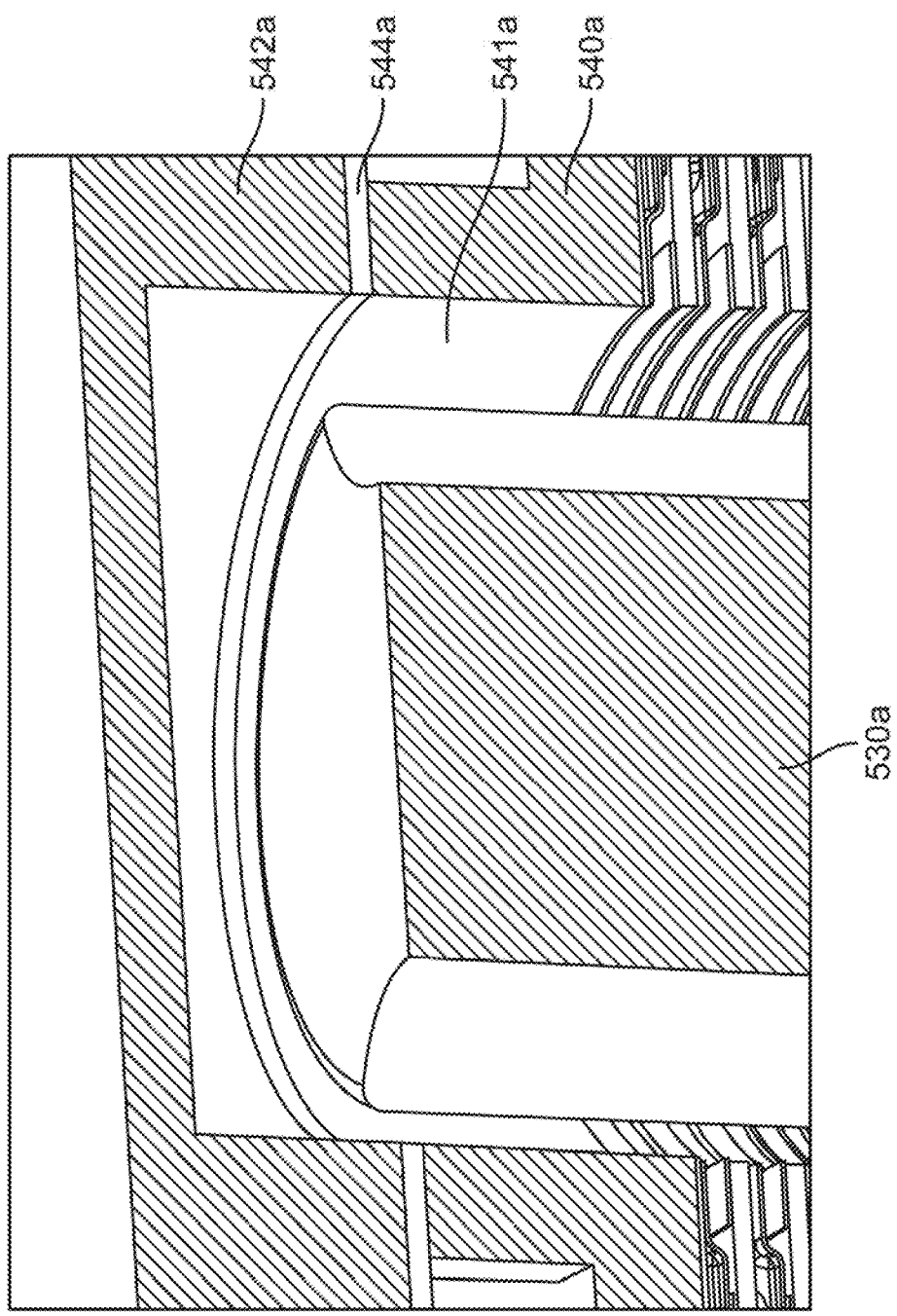

COMPACT HIGH TEMPERATURE ELECTROCHEMICAL CELL STACK ARCHITECTURE

CROSS-REFERENCE TO RELATED APPLICATIONS

The present application is a Continuation of International Application No. PCT/IB2018/053099, filed May 4, 2018, which claims priority to and benefit of U.S. Provisional Patent Application No. 62/501,633, filed May 4, 2017, the entire disclosures of which are incorporated herein by reference.

STATEMENT OF GOVERNMENT RIGHTS

This invention was made with Government support under Award Number DE-FE0026093 awarded by DOE. The Government has certain rights in this invention.

TECHNICAL FIELD

The present disclosure relates to high temperature fuel cell stacks and electrolysis stacks, and particularly to solid oxide (SOFC) and solid oxide electrolysis cell (SOEC) stacks, and more particularly, to high power density compact SOFC stacks.

BACKGROUND

Solid oxide fuel cells comprise an electrolyte sandwiched between a cathode and an anode. Oxygen reacts with electrons at the cathode to form oxygen ions, which are conducted through the ion-conducting ceramic electrolyte to the anode. At the anode, oxygen ions combine with available fuel (e.g., hydrogen and carbon monoxide, methane, any other hydrocarbons or other suitable fuel) to form products (e.g., water and carbon dioxide) thereby liberating electrons to produce electrical power. Such technologies can also be operated in reverse to perform electrolysis to form fuel gases and oxygen when provided with appropriate reactants (e.g., water and carbon dioxide) and electrical power. In such implementations, the technology is termed a solid oxide electrolysis cell. SOFC development has seen a multitude of approaches (anode, cathode or electrolyte supported, monolithic ceramic vs metallic interconnects, planar vs tubular and variants thereof). The prime challenge to commercialize the technology has been the simultaneous achievement of marketable price, reasonable performance, and useful lifetime. These drivers are closely related.

SUMMARY

Embodiments described herein relate generally to electrochemical cells such as fuel cells or electrolysis cells, and in particular to electrochemical cell stacks that include corrugated interconnects interposed between adjacent electrochemical cells and electrically coupled thereto, the corrugations forming a plurality of fuel channels on one side and a plurality of oxidant channels on the opposite side that are fluidly isolated via sealing members, the interconnects configured to provide compliance to the electrochemical cell stack.

In some embodiments, a electrochemical cell unit comprises a first electrochemical cell comprising a first oxidant electrode and a first fuel electrode, and a second electrochemical cell comprising a second oxidant electrode and a second fuel electrode. An interconnect is interposed between the first electrochemical cell and the second electrochemical cell. The interconnect comprises an interconnect main body defining a longitudinal channel along a longitudinal axis thereof. The interconnect main body includes a plurality of corrugations defining a plurality of fuel channels on a first surface of the interconnect main body facing the first electrochemical cell, and a plurality of oxidant channels on a second surface of the interconnect main body facing the second electrochemical cell. Each of the plurality of fuel channels and the plurality of oxidant channel are positioned around the longitudinal channel.

In some embodiments, a fuel channel base of each of the plurality of fuel channels electrically contacts the second oxidant electrode, and an oxidant channel base of each of the plurality of oxidant channels electrically contacts the first fuel electrode. In some embodiments, the electrochemical cell unit further comprises an outer seal member positioned on an outer perimeter of the interconnect on the first surface, and an inner seal member positioned on an inner perimeter of the interconnect on the second surface around the longitudinal channel. The outer seal member fluidly seals one of the plurality of fuel channels or the plurality of oxidant channels from a volume outside the outer perimeter, and the inner seal member fluidly seals the other of the plurality of fuel channels or the plurality of oxidant channels from the longitudinal channel. In some embodiments, the interconnect main body defines at least one fuel inlet channel and at least one fluid outlet channel fluidly coupled to each of the plurality of fuel channels, and further defines at least one oxidant inlet channel and at least one oxidant outlet channel fluidly coupled to each of the plurality of oxidant channels.

In some embodiments, the outer seal member fluidly seals the plurality of fuel channels from the volume outside the outer perimeter, and the at least one fuel inlet channel and the at least one fuel outlet channel are fluidly coupled to the longitudinal channel so as to receive fuel from a first portion of the longitudinal channel and expel spent fuel into a second portion of the longitudinal channel. In some embodiments, the inner seal member may fluidly seal the plurality of oxidant channels from the longitudinal channel, and the at least one oxidant inlet channel and the at least one oxidant outlet channel are fluidly coupled to the outer perimeter of the interconnect so as to receive oxidant from a first portion of the volume outside the outer perimeter, and expel spent oxidant from a second portion of the volume outside the outer perimeter. In some embodiments, the electrochemical cell unit further comprises an edge seal member disposed on at least one of an outer edge of each of the first electrochemical cell and the second electrochemical cell proximate to the outer perimeter of the interconnect, or an inner edge of each of the first electrochemical cell and the second electrochemical cell proximate to the longitudinal channel.

In some embodiments, an electrochemical cell stack comprises a stack of a plurality electrochemical cell units. Each of the plurality of electrochemical cell units comprise a first electrochemical cell comprising a first oxidant electrode and a first fuel electrode, a second electrochemical cell comprising a second oxidant electrode and a second fuel electrode, and an interconnect interposed between the first electrochemical cell and the second electrochemical cell. The interconnect comprises an interconnect main body defining a longitudinal channel along a longitudinal axis thereof. The longitudinal channel spans a height of the electrochemical cell stack. The interconnect main body includes a plurality of corrugations defining a plurality of fuel channels on a first surface of the interconnect main body facing the first electrochemical cell, and a plurality of oxidant channels on a second surface of the interconnect main body facing the second electrochemical cell, each of the plurality of fuel channels and the plurality of oxidant channel positioned around the longitudinal channel.

In some embodiments, each of the plurality of electrochemical cell units further comprise an outer seal member positioned on an outer perimeter of the interconnect on the first surface, and an inner seal member positioned on an inner perimeter of the interconnect on the second surface around the longitudinal channel. The outer seal member fluidly isolates one of the plurality of fuel channels or the plurality of oxidant channels from a volume outside the outer perimeter, and the inner seal member fluidly isolates the other of the plurality of fuel channels or the plurality of oxidant channels from the longitudinal channel. In some embodiments, the interconnects included in each of the plurality of electrochemical cell units cooperatively form a bellows like structure such that the electrochemical cell stack has compliance. In some embodiments, the electrochemical cell stack further comprises a post disposed in the longitudinal channel, the post defining at least one post inlet configured to receive one of the fuel or oxidant and at least one post outlet configured to receive and expel the other of the spent fuel or spent oxidant from the electrochemical cell stack, the post inlet and the post outlet fluidly isolated from each other.

In some embodiments, the electrochemical cell stack further comprises a top end plate positioned at a top end of the electrochemical cell stack around the post such that a gap is provided between the top end plate and the post, the gap structured to allow movement of the post therewithin for relieving thermal stress. In some embodiments, the electrochemical cell stack further comprises a compliant sealing member positioned in the gap, the compliant sealing member providing sufficient compliance so as to allow the movement of the post. In some embodiment, the electrochemical cell stack further comprises a top end cap positioned on the top end plate, and a secondary sealing member interposed between the top end plate and the top end cap. In some embodiments, the top end plate comprises a post interface tube extending axially from a surface of the top end plate away from the post, at least a portion of the post interface tube positioned around a portion of the post.

In some embodiments, the electrochemical cell stack further comprises a bottom end plate positioned on a bottom end of the electrochemical cell stack opposite the top end. A top compression plate is positioned on the top end plate. A biasing member is positioned proximate to the top end of electrochemical cell stack and configured to exert a compressive force on the stack of the plurality of electrochemical cell units. At least one compression member is coupled to the top compression plate and configured to transmit the compressive force from the top compression plate to the bottom end plate. In some embodiments, the electrochemical cell stack further comprises a bottom compression plate positioned at the bottom end of the electrochemical cell stack, wherein the at least one compression member is coupled to the bottom compression plate. In some embodiments the biasing member comprises a stack of Belleville springs interposed between the top compression plate and the top end plate.

In some embodiments, the electrochemical cell stack further comprises a base plate assembly positioned at a bottom end of the electrochemical cell stack. The base plate assembly comprises a bottom end plate defining at least one fuel port and at least one oxidant port. A high strength sealing plate axially aligned with the bottom end plate and configured to yield relative to the bottom end plate so as to reduce transfer of mechanical stress from the high strength sealing plate to the bottom end plate. In some embodiments, the high strength sealing plate is positioned between the stack of the plurality of electrochemical cell units and the bottom end plate, and the base plate assembly further comprises a plurality of short tubes positioned between the high strength sealing plate and the bottom end plate. In some embodiments, the bottom end plate is interposed between the stack of the plurality of electrochemical cell units and the high strength sealing plate, and the base plate assembly further comprises a plurality of short tubes positioned between the high strength sealing plate and the bottom end plate. The short tubes are configured to yield in response to thermal stress such that the high strength sealing plate is free to move laterally relative to the bottom end plate so as to reduce stress transfer to the bottom end plate.

In some embodiments, the electrochemical cell stack comprises a manifold disposed around the stack of the plurality of electrochemical cell units. The manifold defines the volume around the outer perimeter. A first portion of the volume provides an inlet for one of the fuel or oxidant into the electrochemical cell stack, and a second portion of the volume provides an outlet for spent fuel or oxidant from the electrochemical cell stack. In some embodiments, the electrochemical cell stack, further comprises a dielectric sealing member positioned in the volume and configured to fluidly seal the first portion of the volume from the second portion of the volume.

In some embodiments, an electrochemical cell assembly comprises a housing comprising a housing base. An array of electrochemical cell stacks is disposed on the housing base within the housing. Each of the electrochemical cell stacks included in the array comprises a stack of a plurality electrochemical cell units. Each of the plurality of electrochemical cell units comprises a first electrochemical cell comprising a first oxidant electrode and a first fuel electrode, a second electrochemical cell comprising a second oxidant electrode and a second fuel electrode, and an interconnect interposed between the first electrochemical cell and the second electrochemical cell. The interconnect comprises an interconnect main body defining a longitudinal channel along a longitudinal axis thereof, the longitudinal channel spanning a height of the electrochemical cell stack. The interconnect main body includes a plurality of corrugations defining a plurality of fuel channels on a first surface of the interconnect main body facing the first electrochemical cell, and a plurality of oxidant channels on a second surface of the interconnect main body facing the second electrochemical cell, each of the plurality of fuel channels and the plurality of oxidant channel positioned around the longitudinal channel.

In some embodiments, the electrochemical cell assembly further comprises a ring separator positioned around each of the electrochemical cell stacks, and a cross separator positioned between each set of four electrochemical cell stacks included in the array of electrochemical cell stacks. In some embodiments, the electrochemical cell assembly further comprises an oxidant preheat tube positioned between each set of four electrochemical cell stacks through the corresponding cross separator. In some embodiments, the electrochemical cell assembly further comprises a fuel inlet, a fuel outlet, an oxidant inlet and an oxidant outlet fluidly coupled to the array of electrochemical cell stacks through the housing base. The housing base defines at least one heat exchange channel configured to provide heat exchange between the fuel entering the housing base through the fuel inlet and spent fuel exiting the housing base through the fuel outlet. In some embodiments, the electrochemical cell assembly further comprises a fuel bypass inlet fluidly coupled to the array of electrochemical cell stacks through the housing base, the fuel bypass inlet bypassing the at least one heat exchange channel.

The foregoing is a summary of the disclosure and thus by necessity contains simplifications, generalizations, and omissions of detail. Consequently, those skilled in the art will appreciate that the summary is illustrative only and is not intended to be in any way limiting. Other aspects, features, and advantages of the devices and/or processes described herein, as defined by the claims, will become apparent in the detailed description set forth herein and taken in conjunction with the accompanying drawings.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 3 is a top schematic view of an internal fuel manifold, showing a potential fuel-in to fuel-out leak path.

FIGS. 4A-4C are top schematic views of a fuel cell unit according to embodiments, each showing different possible flow paths of fuel and oxidant gas, based on different combinations of internal and external manifold designs. FIG. 4A depicts a fuel cell unit with a single fuel inlet, a single fuel outlet, a single oxidant inlet, and a single oxidant outlet. FIG. 4B depicts a fuel cell unit with two fuel inlets, two fuel outlines, two oxidant inlets, and two oxidant outlets. FIG. 4C depicts a fuel cell unit with a single fuel inlet, a single fuel outlet, two oxidant inlets, and two oxidant outlets.

FIG. 12A shows a top, fuel side of the interconnect. FIG. 12B shows a bottom, oxidant side of the interconnect.

FIGS. 16A and 16B are cross-sectional perspective views of a top portion of the fuel cell stack of FIGS. 15A and 15C, respectively, showing the center post along with a top plate and top cap.

Figure 1A:
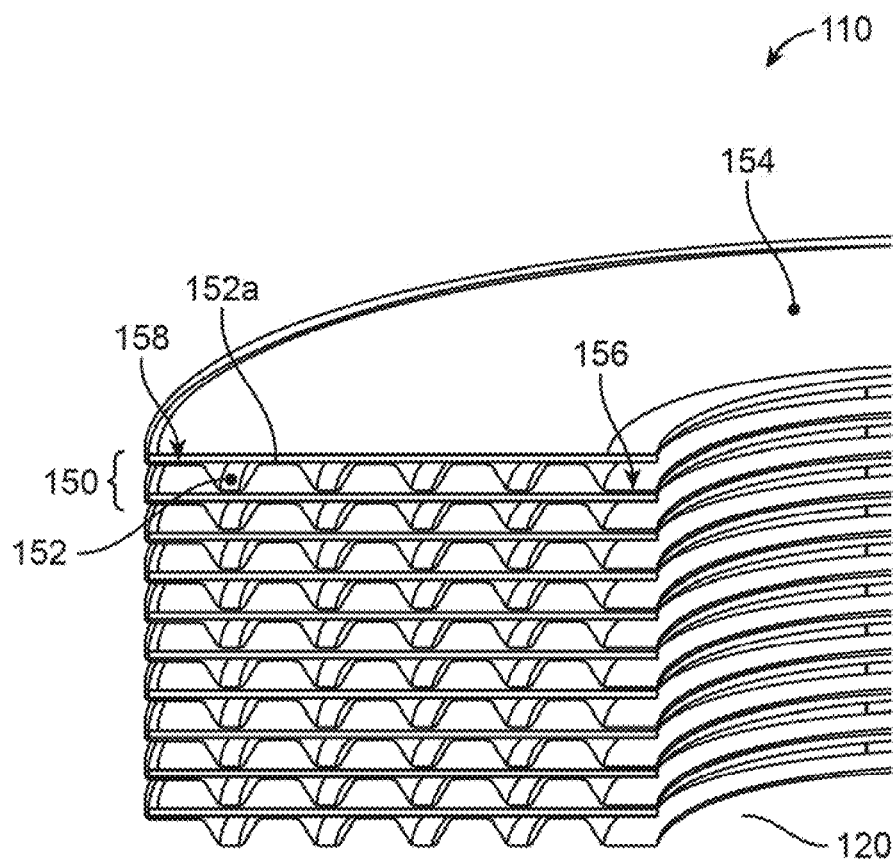
FIG. 1A is a cross-sectional perspective view of a portion of a fuel cell stack having hermetically sealed fuel cell units, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to electrochemical cells such as fuel cells and electrolysis cells, and in particular to electrochemical cell stacks that include corrugated interconnects interposed between adjacent electrochemical cells and electrically coupled thereto, the corrugations forming a plurality of fuel channels on one side and a plurality of oxidant channels on the opposite side that are fluidly isolated via sealing members, the interconnects configured to provide compliance to the electrochemical cell stack.

According to certain embodiments, a mechanical stack layout is provided representing a design approach focusing on reducing material content within the stack while maintaining (and in many cases improving) the feasibility of the overall design relative to the current stack technology. Certain embodiments use relatively small generally annular solid oxide fuel cells and thin interconnects, the integration of which yields an order of magnitude increase in power density (W/kg) over a current baseline. This can be achieved by careful thermal design to ensure a maximum thermal communication between the active area of the cell (the heat generation location) and the stack environment.

Efforts to decrease price tend to decrease lifetime directly or because they involve a strategy of running the fuel cell harder. Efforts to improve performance (higher output) tend to decrease lifetime and efficiency. Efforts to increase lifetime often involve expensive materials and/or running at low power density, which both increase price. For example, tubular technology has been demonstrated over the long term (5+years), but at a price and performance level that is generally acknowledged to be unacceptable for practical market applications. Conversely, planar SOFC technology is closer to meeting price and performance targets, but faces challenges meeting practical longevity targets. The general focus to close this price/performance/longevity gap is to develop higher performance cells, while increasing their size in an effort primarily to reduce manufacturing costs. This is evident in almost all SOFC development activities whether it be development of high surface area tubular designs or planar designs. An exception to this trend exists in the form of microtubular SOFC cells, advocated mostly by University laboratories for applications where rapid thermal transients are required. Microtubular systems are not advanced as viable solutions for larger scale systems (typical ranging in the hundreds of W output maximum).

An additional set of constraints generally exists for mobile applications. Present SOFC technology display volumetric and mass indexed power densities are on the order of 200 W/L and 100 W/kg. Thus, a 70 kW power unit will occupy ~350 L and weigh approximately 700 kg for the stack alone, and significantly more for an entire power system. A small car could not accommodate an SOFC based prime power system at these weight and volumes. A second constraint for automotive applications is heat-up time. Present stacks require on the order of 1 hour to reach an operating temperature of around 750 degrees Celsius from ambient. For practical mobile applications, startup times on the order of seconds are generally expected, and startup times on the order of a few minutes might be acceptable with a change in expectations and/or a secondary power source such as batteries to cover the first few minutes of operation.

Finally, one of the key challenges of many fuel cell technologies is managing the waste heat and the temperature distribution within the stack. As stack sizes get larger, direct heat rejection to the environment becomes less and less viable. Large stacks instead rely on endothermic reactions (reforming) and/or convective cooling to gas streams. Practical experience shows that in order for convective cooling to be viable at reasonable in-stack temperature differences, the flow rates must be high.

Embodiment described herein provide a different approach to the meeting price, performance and/or lifetime targets of electrochemical cells (e.g., fuel cells or electrolysis cells) while addressing the key challenges. Embodiments described herein also address the weight and volume challenges posed by mobile applications of electrochemical cells while allowing heat-up times projected to be on the order of a few minutes.

Briefly, embodiments described herein propose reversing the current trend of progressively increasing cell size and performance, proposing instead to decrease cell size, decrease reliance on cell performance, and focus on a tight integration of components optimized for operation with small cells. By careful integration, certain embodiments described herein may result in stacks of the same or greater power output than current stacks, in 1/7th the volume and at 1/10th the weight.

Various embodiments described herein may provide benefits including, for example: (1) reduction in volume per unit power output without requiring an increase in cell performance (e.g., 7× reduction or better); (2) reduction in weight per unit power output without requiring an increase in cell performance (e.g., 10× reduction or better); (3) a corresponding expectation of an approximate cost reduction (e.g., 10× reduction or better); (4) rapid transient response (e.g., on the order of 10× faster than current electrochemical cell stacks, providing heat-up time on the order of minutes instead of hours); (5) a level of modularity supporting power ranges from, for example, 1 kW to many MW with the same stack for both mobile and stationary applications; (6) significant reduction of anode to cathode leakage for increased efficiency and wider application potential; (7) higher voltage and lower current output (offering better efficiency within the power electronics); (8) intrinsic load sharing and redundancy at larger kW ratings (e.g., 10 kW and above); (9) low conduction distances between stack core and stack edge where heat can be rejected to the environment, which enables indirect thermal management of stack internals; and (10) reduced balance of plant requirements via lower air flows, easier compression requirements, higher voltage/lower current power, and/or shorter transients.

For example, embodiments described herein describe two particular sizes and implementations of the SOFC stacks described herein for which physical hardware and test results are available. These are provided as concrete examples of the application of the embodiments described herein, but variants smaller, larger, and between the sizes of these embodiments are similarly possible. The key size considerations are the cell size and cell count. Some embodiments described herein include cells with an active area of 21 $cm^2$ or 25 $cm^2$ and have been demonstrated at up to 234 cells per stack. Other embodiments described herein have cells with an active area of 81 $cm^2$ and are designed to operate with upwards of 350 cells per stack, and has been demonstrated at up to 45 cells per stack.

While various embodiments describe herein refer to electrochemical cell units and electrochemical cell stacks as fuel cell units and fuel cell stacks, respectively, it should be appreciated that various embodiments of the electrochemical cell units and electrochemical cell stacks described herein may be operated in reverse flow so as to include electrolysis cell units and electrochemical cell stacks, or include any other electrochemical cell unit or stack.

Figure 1B:
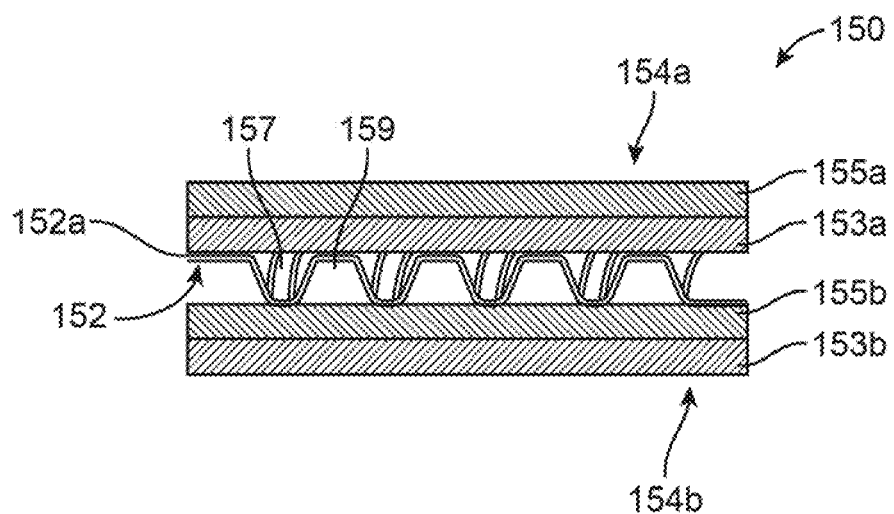
FIG. 1B is a schematic illustration of a fuel cell unit which may be included in the electrochemical cell stack of FIG. 1A, according to an embodiment.
Figure 2:
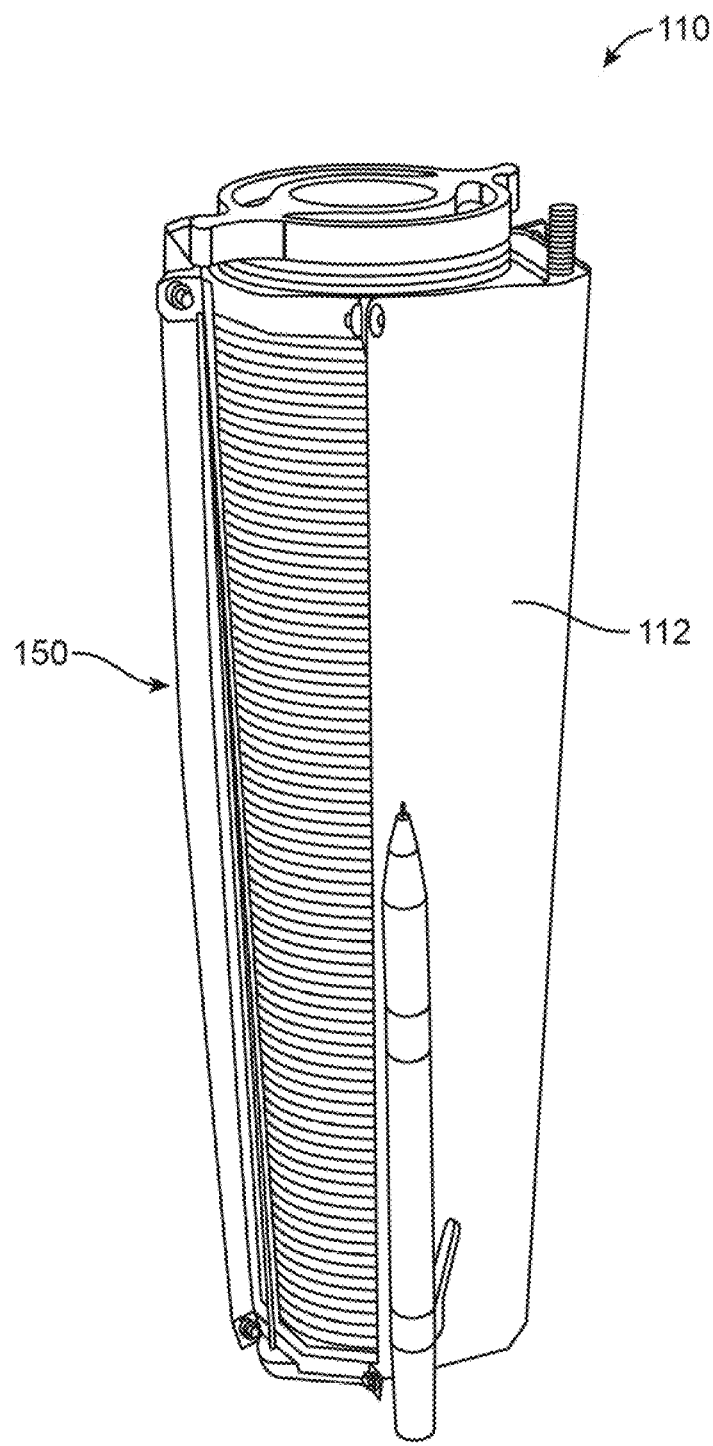
FIG. 2 is a front view of a fuel cell stack that was produced according to an embodiment.

FIG. 1A is a cross-sectional perspective view of a portion of a fuel cell stack 110 shown in FIG. 2, according to an embodiment. The fuel cell stack 110 includes a stack of a plurality of fuel cell units 150, and more specifically, hermetically sealed fuel cell units 110, according to an embodiment. The fuel cell stack 110 includes a plurality of solid oxide fuel cell units 150 alternating with a plurality of interconnects 152. For example, FIG. 1B shows a schematic illustration of a fuel cell unit 150, which may be included in the fuel cell stack 110. Each fuel cell unit 150 includes a first electrochemical cell 154a including a first fuel electrode 153a (e.g., an anode), a first oxidant electrode 155a (e.g., a cathode) and may include an electrolyte interposed between the first fuel electrode 153a and the first oxidant electrode 155a. The second electrochemical cell 154b also comprises a second fuel electrode 153b, a second oxidant electrode 155b, and may also include an electrolyte interposed between the second fuel electrode 153a and the second oxidant electrode 155a. In some embodiments, each of the anodes optionally include an anode support. In some embodiments, the fuel cell stack 110 may be operated for in reverse flow, i.e., as an electrolysis cell stack. In such embodiments, the fuel electrodes 153a/b of the electrochemical cells 154a/b may include a cathode, and the oxidant electrode 155a/b of the electrochemical cells 154a/b may include an anode.

An interconnect 152 is interposed between the first electrochemical cell 154a and the second electrochemical cell 154b. The interconnect 152 comprises an interconnect main body 152a defining a longitudinal channel 120 along a longitudinal axis thereof (e.g., a longitudinal axis of the electrochemical cell stack 110 such that the longitudinal channel 120 may span the fuel cell stack 110). The interconnect main body 152a includes a plurality of corrugations defining a plurality of fuel channels 157 on a first surface of the interconnect main body 152a facing the first electrochemical cell 154a, and a plurality of oxidant channels 159 on a second surface of interconnect main body facing the second electrochemical cell 154b. Each of the plurality of fuel channels 157 and the plurality of oxidant channel 159 may be positioned around the longitudinal channel 120, for example, symmetrically and/or in an annular configuration. A fuel channel base of each of the plurality of fuel channels 157 may electrically contact the second oxidant electrode 155b, and an oxidant channel base of each of the plurality of oxidant channels 159 may electrically contact the first fuel electrode 153a.

For example, the electrochemical cells 154a/b and the interconnects 152 are shaped such that, when the fuel cell stack 110 is formed, the longitudinal channel 120 extends longitudinally through the fuel cell stack 110. In the embodiment of FIG. 1A, the electrochemical cells 154a/b and interconnects 152 have an annular shape, and the longitudinal channel 120 is a central channel located at an axial center of the fuel cell stack 110. While described as having an annular shape the fuel cell stack 110 may have any other suitable shape, for example, ovular, hexagonal, square or off-square, or any other shape, as long as a longitudinal channel 120 extends longitudinally through the fuel cell stack 110. Further, while the longitudinal channel 120 is described as extending along a geometric center of the fuel cell stack 110, in other embodiments, the longitudinal channel 120 may be offset from the geometric center of the fuel cell stack 110 as long as the longitudinal channel 120 does not overlap with outer edges of the fuel cell stack 110.

The electrochemical cells 154a/b are sealed to each interconnect 152 alternately at the inner and outer periphery, as shown in FIGS. 1A and 1B. This yields a structure that is hermetically sealed, yet compliant at the unit cell level to reduce the possibility of thermal stress buildup.

One gas, either fuel or oxidant is admitted to and extracted from the fuel cell units 150 via the longitudinal channel 120, while the other gas is admitted to and extracted from the fuel cell units 150 at an outer periphery of the fuel cell stack 110. In particular embodiments, fuel is admitted and extracted from the longitudinal channel 120, and the oxidant is admitted and extracted at the outer perimeter of the fuel cell stack 110. The hermetic cell-to-interconnect seals prevents mixing of the gases. For example, as shown in FIG. 1A, an outer seal member 158 may be positioned on an outer perimeter of the interconnect 152 on the first surface proximate to the first electrochemical cell 154a, and an inner seal member 156 may be positioned on an inner perimeter of the interconnect 152 on the second surface proximate to the second electrochemical cell 154b around the longitudinal channel 120. The outer seal member 158 may fluidly seal one of the plurality of fuel channels 157 or the plurality of oxidant channels 159 from a volume outside the outer perimeter of the fuel cell stack 10, and the inner seal member 156 may fluidly seal the other of the plurality of fuel channels 157 or the plurality of oxidant channels 159 from the longitudinal channel 120. Particularly, as shown in FIG. 1A, the outer seal member 158 fluidly seals the fuel channels 157 from the volume outside the outer perimeter, and the inner seal member 156 fluidly seals the oxidant channels 159 from the longitudinal channel 120.

By avoiding leakage that would result in fuel and oxidant mixing and combusting, several advantages are gained, including (i) a reduction in a loss of reactants to the system, (ii) a reduction in the heat load on the stack (and especially in localized heating that can damage stack components), (iii) a reduction in steam formation on the oxidant side, which reduces chromium volatilization and transport, which can be a significant degradation mechanism for the oxidant electrode, and (iv) a reduction in cross leak during heat-up and cool-down which allows lower volumes of protective cover gas to be used.

The fuel cell stack 110 may include, for example, between 20 and 400 fuel cell units 150, limited only by the aspect ratio (height to diameter or width) of the finished stack where too high an aspect ratio can present manufacturing and packaging difficulties. In various embodiments, the aspect ratio may be in a range of 4:1 to 5:1, although shorter stacks may be useful for specific applications and for development purposes. The plurality of fuel cell units 150 may be stacked vertically, with intermediate metallic interconnects 152, into a tower.

Each fuel cell stack has a power range of about 50 W to 20 kW (e.g., 0.5 kW to 20 kW, 1 kW to 15 kW, or 5 kW to 10 kW, inclusive of all ranges and values therebetween), depending on the operating conditions and stack size. In one embodiment, the stack has a power range of about 7 kW. Practical stacks as small as approximately 50 W could be fabricated by reducing the cell count and adjusting the operating conditions.

The fuel cell stack 110 or any other electrochemical cell stack described herein make use of appropriate geometry to improve the ability to thermally control the electrochemical cell stack, while offering a cell design that reduces the mechanical stresses induced during manufacture of the cell and later during stack operation. These two advantages allow thinning of both the interconnect 152 and the cell without compromising their structure.

A thickness of the interconnects 152 may be in a range of 0.05 to 0.7 mm (e.g., in a range of 0.075 to 0.4 mm, or 0.08 mm to 0.15 mm, inclusive of all ranges and values therebetween). A thickness of the electrochemical cell units may be in a range of 0.2 to 0.4 mm. In particular embodiments, the thickness may be in a range of 0.25 to 0.35 mm. Over one year of operation has been demonstrated in a stack of this design that incorporated 0.12 mm interconnects 152 and 0.3 mm cells. This is roughly $1/10^{th}$ the material thickness in the interconnect and $1/2$ the cell thickness used in typical SOFC stack designs. When end plates, a compression system, and all other parts are included that form a complete stack, the proposed stack weight in one embodiment was confirmed at $\sim 1/10^{th}$ of the weight of a conventional stack on a per active area basis.

In other words the material content of the electrochemical cell stack is reduced, and the reduction is significant. The design does not require the use of any exotic materials, and in many areas simplifies the materials requirements relative to a conventional electrochemical cell stack. The compression system may be simplified due to lower loads, as discussed in more detail below. Manifolds may also be simplified due to lower sealing requirements, as also discussed in more detail below. This lowered material content reduces the intrinsic cost of the electrochemical cell stack. While part count per kW goes up, part suitability for automation also increases, due to the use of small parts, fewer different parts per layer, and a lack of large tolerances that require operator intervention. Thus, the cost advantage of the lower material content may outweigh the increased overall part count.

The fuel cell stack 110 shown in FIG. 2 includes 234 cells. Each fuel cell unit 150 was annular in shape, with a 60 mm outer cell diameter, a 300 micron thickness, and an active area of 21 cm². Each interconnect 152 was a stamped metallic interconnect of 100 micron material thickness and 390 micron flow channel height. The fuel cell stack 110 also includes a manifold 112 positioned around the stack of the plurality of fuel cell units 150 and may define a volume around the outer perimeter of the fuel cell stack 110 which may be used to introduce and expel one of the fuel and the oxidant around the outer perimeter of the fuel cell stack 110. For example, a first portion of the volume may provide an inlet for one of the fuel or oxidant into the fuel cell stack 110, and a second portion of the volume may provide an outlet for spent fuel or oxidant from the fuel cell stack 110.

Embodiments described herein may reduce material content by an order of magnitude while offering many other advantages, for example, reduce the cost per kW at a stack and at a system level. The improved thermal layout may simultaneously improve performance and reduce degradation through improved temperature control. Furthermore, embodiments described herein may improve thermal control of the electrochemical cell stack, allowing lower cooling air flows and lower inlet temperatures, both of which may improve the balance of plant efficiency.

Fuel Inlet/Outlet Seals and Oxidant Inlet/Outlet Seals

The separation of fuel in from fuel out and oxidant in from oxidant out may be achieved through structurally independent manifolds (e.g., the manifold 112) that are separate from the stack core and sealed to it via compliant seals that are compressible and allow relative motion between the stack core and the manifolds. This allows the stack core to grow and bend due to thermally induced loads independently of the manifolds which prevents or reduces thermally induced mechanical stress in the overall structure thereby protecting the individual components. For example ceramic cells are susceptible to brittle fracture if overly stressed. The compliant seals seal between the inlet and outlet of the same gas stream. In other words, compliant seals separate the fuel inlet from the fuel outlet, and the oxidant inlet from the oxidant outlet. Preferably, the compliant seals do not seal between fuel and oxidant gas in any location. Compliant high temperature ceramic seals are known to have leaks since they typically achieve compliance by virtue of being a packed ceramic structure with included and connected porosity. In the embodiments described herein, such leaks may be acceptable because they do not result in combustion and will have only minor impacts on overall efficiency as long as the leak rate is low (e.g.: below ~5% of total flow). This allows the advantageous use of an external manifold design approach, which offers cost, weight and volume advantages. FIG. 3 shows a representation of a fuel manifold 230, for example, a post (e.g., a center post) located within the longitudinal channel of the electrochemical cell stack, and the resulting fuel-in to fuel-out leak path.

The separation of inlet gas from outlet gas around the periphery of the stack may be achieved through a sheet metal manifold (e.g., the manifold 112) structure that compresses the compliant seals onto the stack core ("stack core" meaning the assembly of the repeated stack parts—cell, interconnect, seals, as well as the end plates). The metal gas separation components may be coated with a dielectric coating to protect against shorting of the stack to the manifold.

The annular cell design keeps the conduction path from any portion of the heat generating area of the cell to the outer surface of the stack to a minimum, which assists in maintaining thermal control of the stack.

FIGS. 4A-4C are top schematic views of a fuel cell units 250a/b/c, according to various embodiments, each showing different possible flow paths of fuel and oxidant gas, based on different combinations of internal and external manifold designs. In other embodiments, the fuel cell units 250a/b/c may comprise electrochemical cell units operated in reverse so as operate as electrolysis cell units. FIG. 4A depicts a fuel cell unit 250a with a single fuel inlet, a single fuel outlet, a single oxidant inlet, and a single oxidant outlet. FIG. 4B depicts a fuel cell unit 250b with two fuel inlets, two fuel outlets, two oxidant inlets, and two oxidant outlets. FIG. 4C depicts a fuel cell unit 250c with a single fuel inlet, a single fuel outlet, two oxidant inlets, and two oxidant outlets. These different flow strategies offer different thermal and pressure drop profiles to the stack, and can be selected for best fit with the particular application.

For example, the interconnect main body (e.g., the interconnect main body 152a) of the interconnects (e.g., the interconnects 152) included in each of the fuel cell units 250a/b/c may define at least one fuel inlet channel and at least one fluid outlet channel fluidly coupled to each of the plurality of fuel channels (e.g., the fuel channels 157). The interconnect main body may further define at least one oxidant inlet channel and at least one oxidant outlet channel fluidly coupled to each of the plurality of oxidant channels (e.g., the oxidant channels 159). The at least one fuel inlet channel and the at least one fuel outlet channel may be fluidly coupled to the longitudinal channel so as to receive fuel from a first portion of the longitudinal channel and expel spent fuel into a second portion of the longitudinal channel. The outer seal member (e.g., the outer seal member 158) may fluidly seal the plurality of fuel channels from the volume outside the outer perimeter. Furthermore, the at least one oxidant inlet channel and the at least one oxidant outlet channel may be fluidly coupled to the outer perimeter of the interconnect so as to receive oxidant from a first portion, and expel spent oxidant from a second portion of the volume outside the outer perimeter. The inner seal member (e.g., the inner seal member 156) may fluidly seal the plurality of oxidant channels from the longitudinal channel.

Modular Arrays

Figure 5:
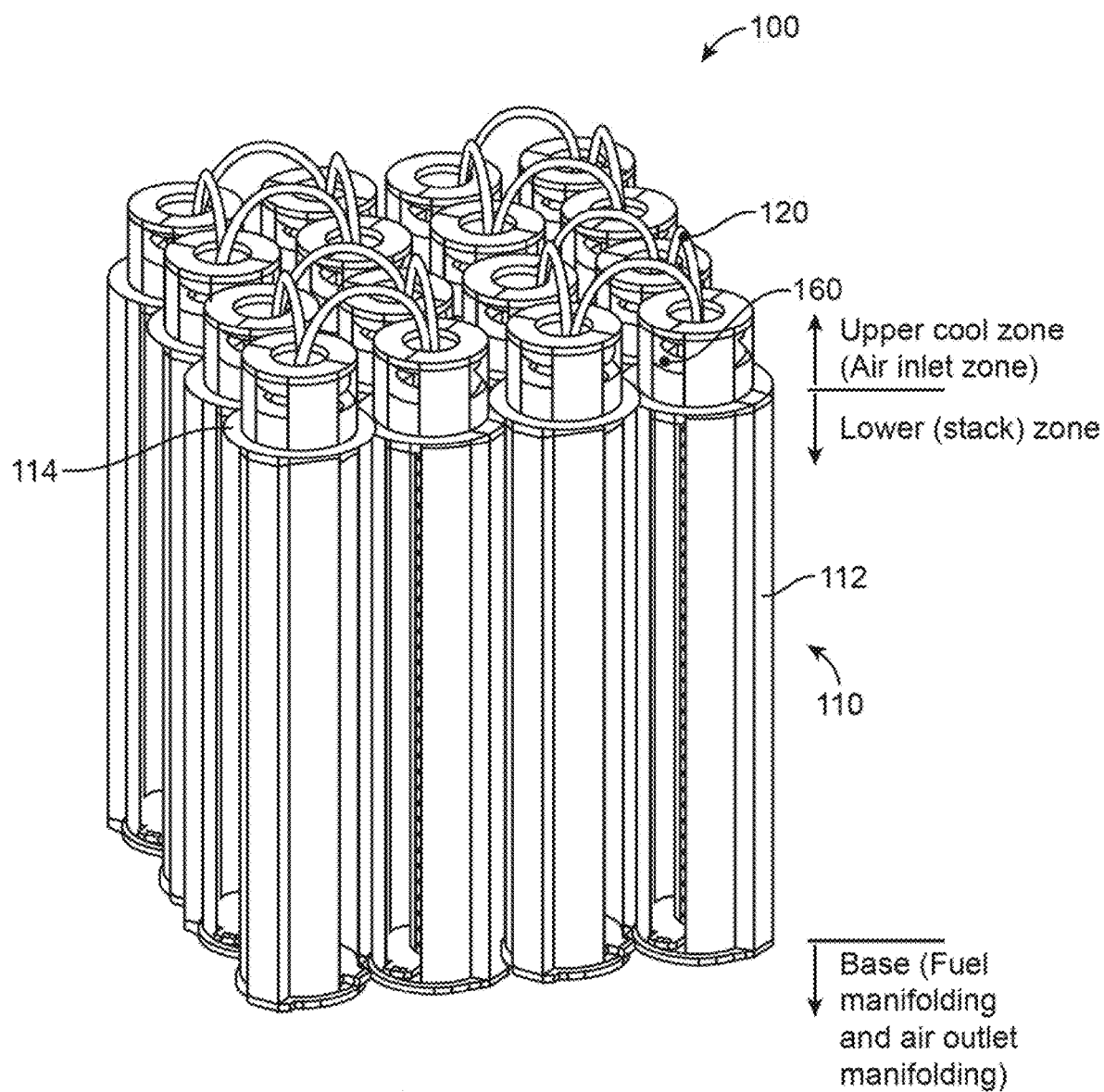
FIG. 5 is a perspective view of an array of fuel cell stacks, according to an embodiment.
Figure 7A:
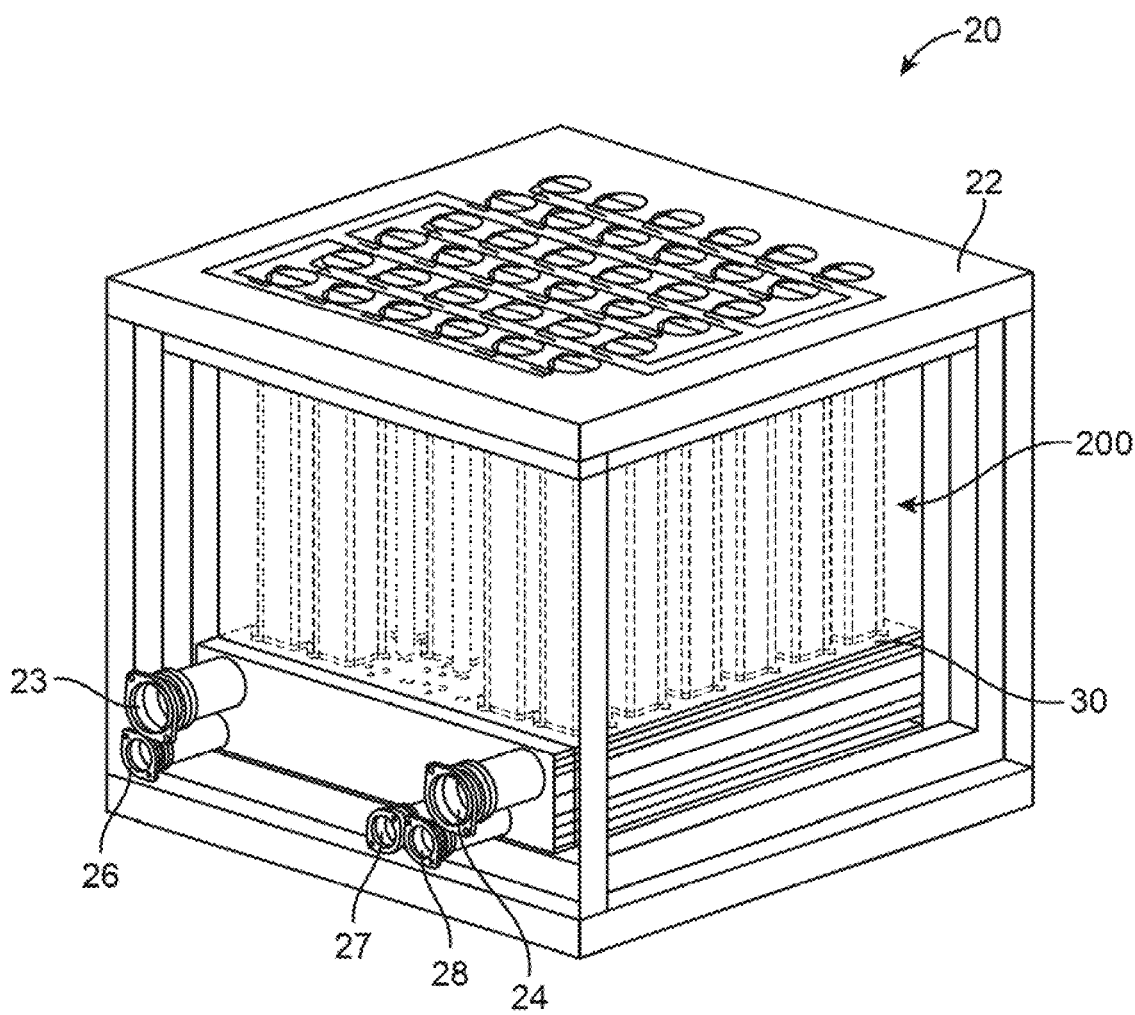
FIGS. 7A and 7B are perspective views of an array of fuel cell stacks, according to two different embodiments.
Figure 7B:
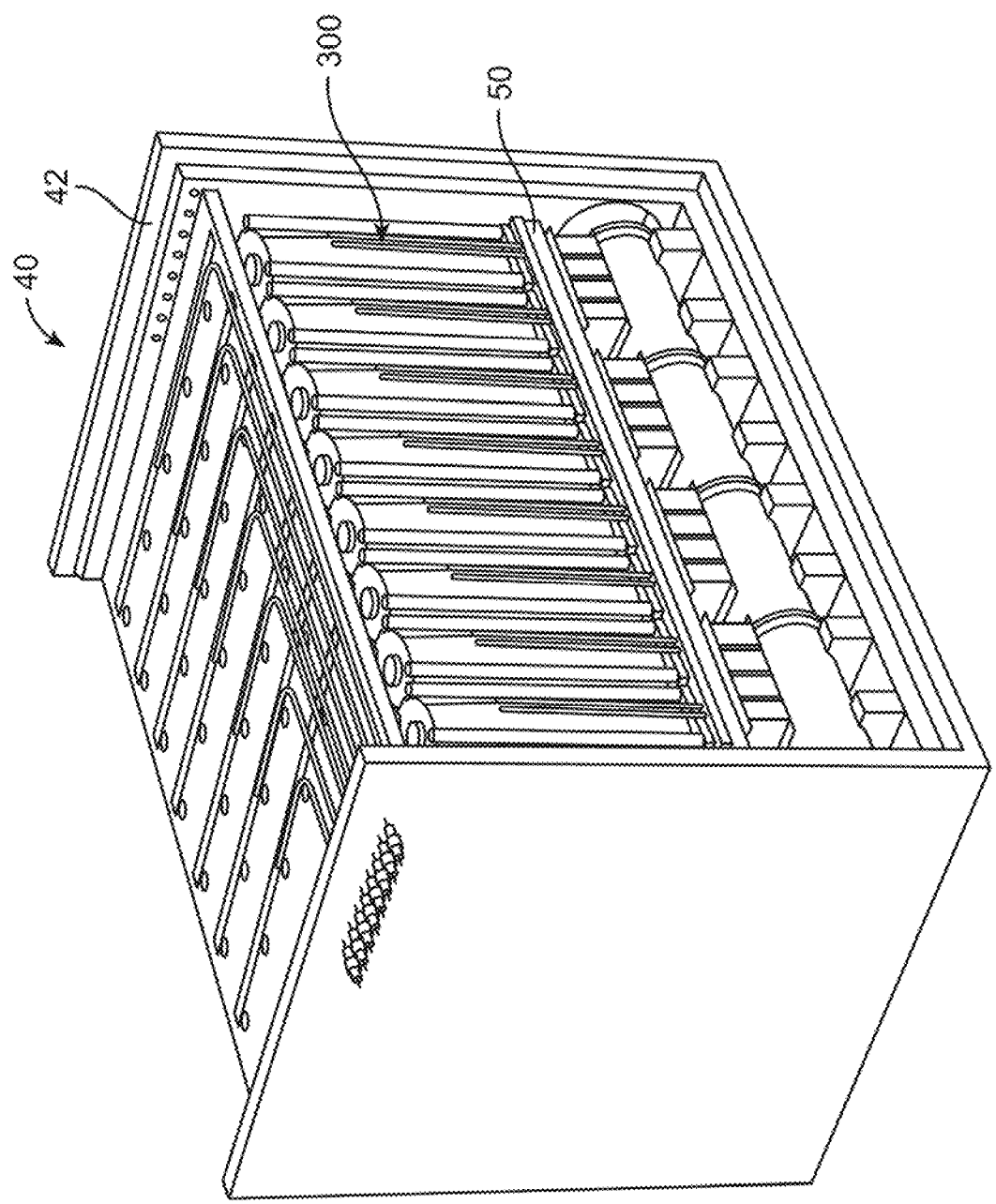

For larger systems stacks would be deployed in modular arrays, for example, deployed in a 20 kW to 250 kW or larger arrays as shown in the array 100 of FIG. 5 or an array 200 shown in FIG. 7A, or in a 40 kW to 500 kW array as shown in array 300 of FIG. 7B. Larger systems may be composed of multiple arrays. The stack design lends itself particularly well to arrayed layouts due to its integrated compression system, direct bolted connection with integrated gas connection, short conduction path to the environment, and high voltage—low current output. By simplifying or eliminating stack-to-module interfaces, the stack has the potential to simplify the design of larger systems. Two embodiments of a stack array based on the stack 110 of FIG. 2 are described below. Stacks may be arrayed into different package sizes depending on the application. Possible sizes range from a single stack (~1.2 kW) to a 15×15 arrays of stacks (250 kW) or larger. As an example, a 10×10, 100 kW package would measure approximately 0.6 m×0.6 m×0.3 m (113 L), including compression, current collection and ducting, which is competitive with internal combustion engines.

FIG. 5 is a perspective view of an array 100 of the fuel cell stacks 110, according to one embodiment. In this embodiment, fuel is fed and extracted from the base of the fuel cell stack 110, while oxidant gas (e.g., air) is admitted into a containing volume above the stack and extracted from the base of the fuel cell stack 110. Air generally has the higher convective heat capacity and so may be used as the primary means of cooling the electrochemical cell stack 110. The air is admitted above the fuel cell stack 110 (or stack array) at a relatively low temperature, cooling the area above the fuel cell stacks 110. Spring compression and current collection may be integrated into this region, where the cooler temperatures allow the use of less exotic material and/or the use of less material overall while maintaining adequate strength and current carrying capacity.

Figure 6:
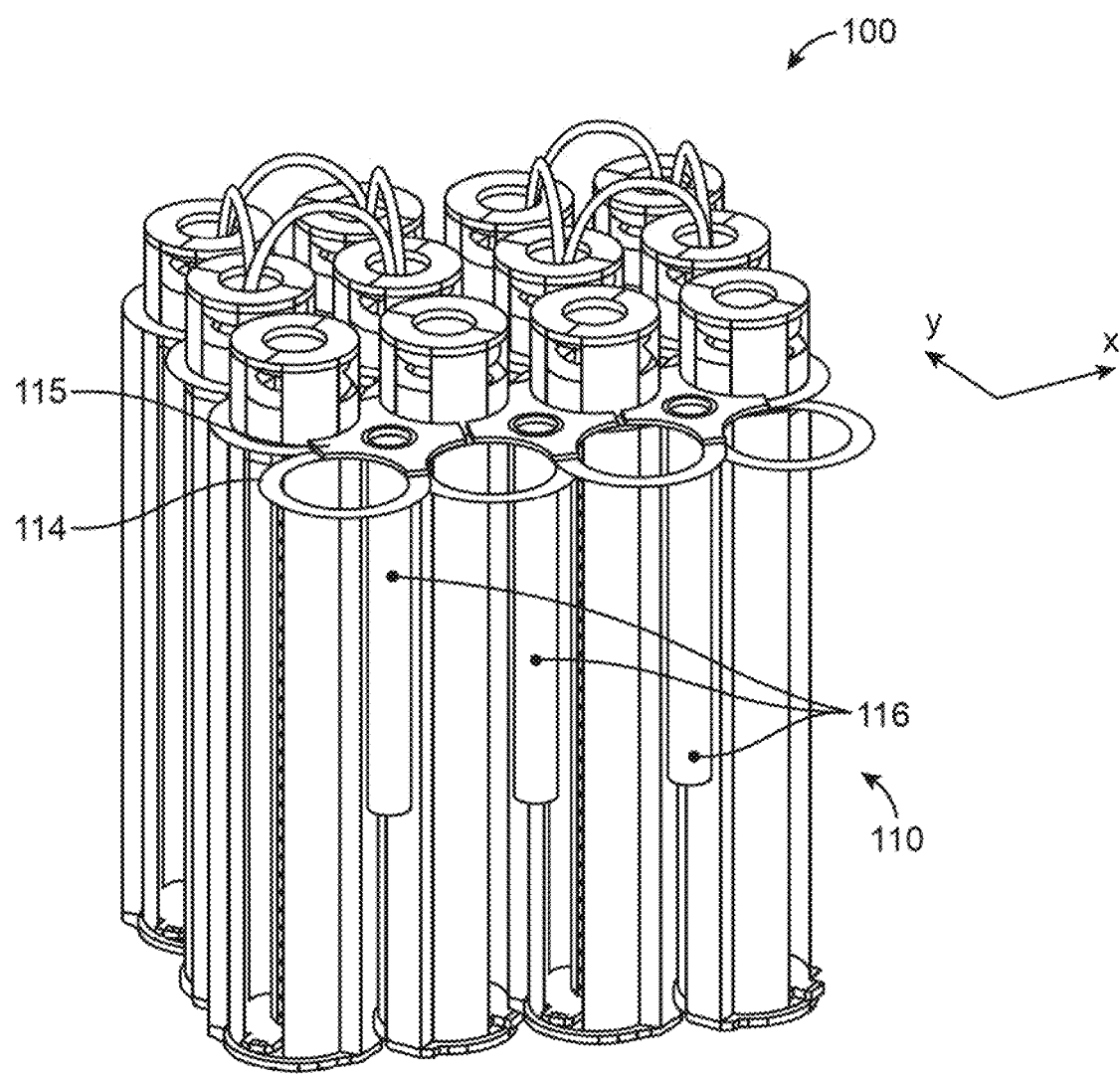
FIG. 6 shows a perspective view of a portion of the array shown in FIG. 5, with some fuel cell stacks removed to show oxidant preheating tubes.

In some embodiments, air is heated to an appropriate inlet temperature while passing from the upper low-temperature region, through oxidant preheat tubes 116 or inlet tubes, into the volume surrounding the stack 110, as shown in FIG. 6. Sealing between the upper zone and the stack zone may not be perfect, vastly simplifying the overall layout. FIG. 6 shows that the separation between the upper cool zone and the lower stack zone is made by overlapping separators mounted to the individual fuel cell stacks 110. In the embodiment shown in FIG. 6, there are two separator types, ring separators 114 around each stack, and cross separators 115 that sit between each grouping of four fuel cell stacks 110. For example, a ring separator 114 may be positioned around each of the fuel cell stacks 110 included in the array 100, and a cross separator 115 may be positioned between each set of four fuel cell stacks 110 included in the array 100. The oxidant preheat tube 116 may positioned through the corresponding cross separator 115.

The separators 114, 115 overlap to provide a barrier to direct gas preferentially to the oxidant preheat tubes 116. This overlapping separator geometry maintains full freedom for the fuel cell stacks 110 to sway under thermal loads, without adding side loads to the fuel cell stacks 110 or breaking the separation between zones. The oxidant preheat tubes 116 may act as radiant heat transfer surfaces, heating the inlet air using radiation off the hot fuel cell stacks 110 before allowing the oxidant (e.g., air) to directly contact the stack air manifold. The air inlet to the fuel cell stack 110 may be an opening in the air manifold along the full vertical face, where air that has been preheated first in the upper zone, second in the oxidant preheat tubes 116 and third by direct contact with the stack manifold, is finally allowed to enter the fuel cell stack 110 proper. Stack cooling, a key challenge for large SOFC stacks, may be accomplished by heating the oxidant flow. Unlike direct convective cooling, the multi-staged inlet approach allows much larger temperature increases than would be allowed if the oxidant (e.g., air) was directly admitted to the fuel cell stack 110 core. With proper sizing, inlet temperatures on the order of 200 degrees Celsius (e.g., 150 to 250 degrees Celsius) may be achieved, compared to 600 degrees Celsius for a conventional stack. This large temperature delta allowance enables lower air flows and less preheat load, simplifying and increasing the efficiency of the balance of the components of an electrochemical cell assembly (e.g., a fuel cell assembly or an electrolysis cell assembly) including the array 100.

Each fuel cell stack 110 may be self-contained except for the air inlet ducting and the outer insulation. The packaging solution described herein offers efficiencies by sharing the air inlet and outer insulation shell between multiple fuel cell stacks 110. In some embodiments, a fuel cell assembly (e.g., the fuel cell assembly 20 of FIG. 7A) may include the following repeat units: (1) unit cell (cell+interconnect): ~8 W, ~0.8V; (2) fuel cell stack (several hundred cells+manifolding, compression, etc.): ~1200 W, 160 V to 250 V; (3) array (variable, up to 200+stacks, enclosure, insulation, etc.): ~20 to 250+kW, kV range; and (4) modules (variable, structures of arrays in road transportable sizes): 1 MW+, kV range. In other embodiments, a fuel cell assembly (e.g., the fuel cell assembly 40 of FIG. 7B) may include the following repeat units: (1) unit cell (cell+interconnect): ~20 W, ~0.8 V; (2) stack (several hundred cells+manifolding, compression, etc.): 7,000 W, 160 V to 350 V; (3) 40 to 35030 kW, kV range; (4) modules (variable, structures of arrays in road transportable sizes): 1 MW+, kV range.

In larger power implementations (~10 kW and up) a modular approach provides additional benefits. First, stack voltages are high enough that they may be connected in a parallel or series-parallel electrical configuration. This provides automatic load shedding. Any stack whose performance degrades will automatically shed its current load to stacks parallel to it electrically. The complete loss of a stack in a larger multi-stack array would have little negative effect. Second, failed stacks can be replaced without disturbing other stacks, and at a relatively low cost. Where a conventional system with relatively few stacks might require removal and refurbishment of a large and difficult to manage stack in the event of a single weakness, in an array of small stacks local weaknesses can be fixed by replacing only the weak stack, a smaller device and a quicker and lower cost process.

FIGS. 7A and 7B are perspective views of electrochemical cell assemblies including an array of electrochemical cell stacks, according to two different embodiments. These embodiments are similar to the embodiment of FIGS. 5 and 6, with the exception that all gas services, including inlet air, are fed from the bottom. This decreases the complexity at the top of the stack array, which may bring advantages for initial assembly and for servicing. It also offers advantages in terms of ease of integration into a system, and offers the potential for additional heat transfer between ingoing and outgoing air streams. As described herein, the electrochemical cell assemblies of FIGS. 7A and 7B include fuel cell assemblies having an array of fuel cell stacks. In other embodiments, the electrochemical cell assemblies of FIGS. 7A and 7B may be operated in reverse flow so as to be operated as electrolysis cell assemblies including an array of electrolysis cell stacks.

Figure 8A:
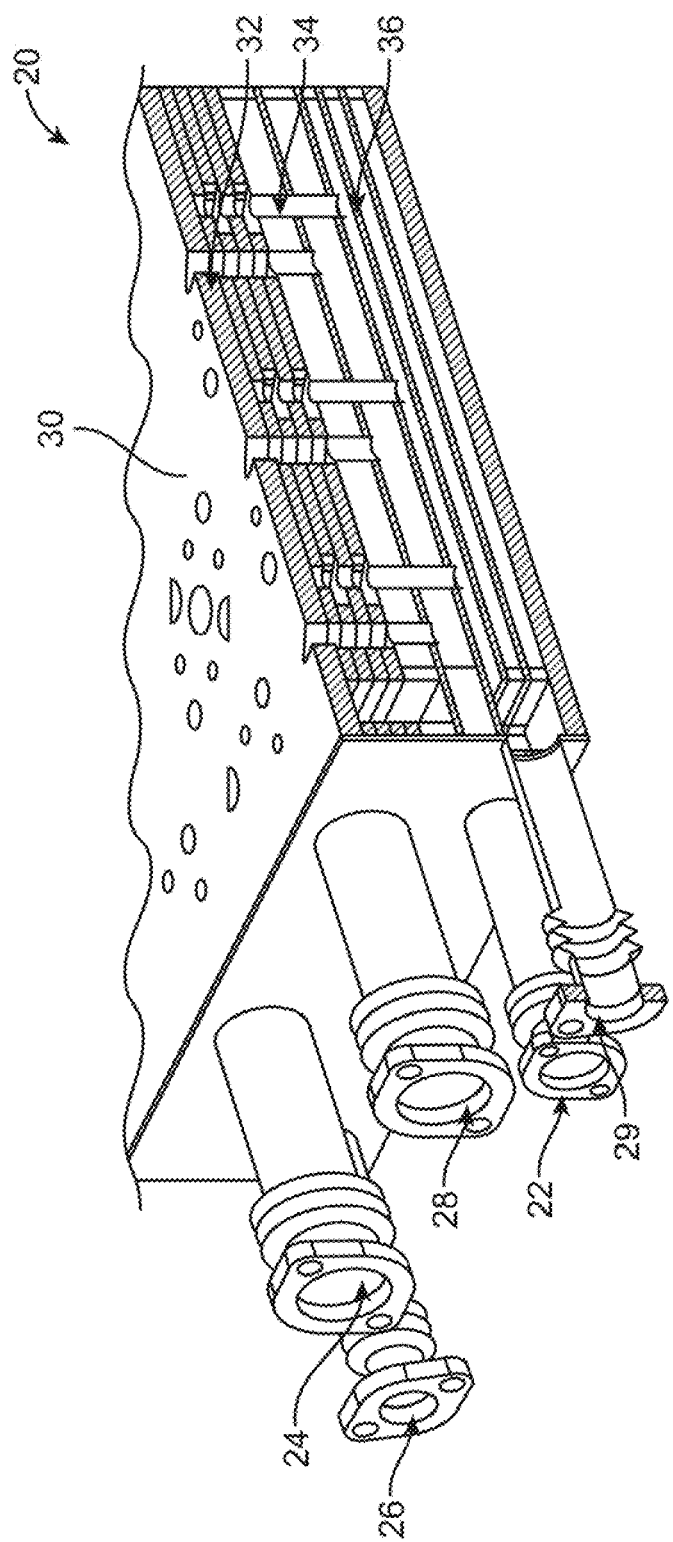
FIGS. 8A and 8B are perspective views of a base portion of the arrays shown in FIGS. 7A and 7B, showing the fuel and oxidant inlets and outlets of the array.

FIG. 7A shows a fuel cell assembly 20, according to an embodiment. The fuel cell assembly 20 includes a housing 22 having housing base 30. An array 200 of fuel cell stacks (e.g., the electrochemical cell stacks 110) is disposed on the housing base 30. The array 200 includes a six by six array of fuel cell stacks (40+kW array) with all gas services from the bottom. FIG. 7B shows a fuel cell assembly 40, according to another embodiment. The fuel cell assembly 40 includes a housing 42 having a housing base 50 on which an array 300 of fuel cell stacks (e.g., the fuel cell stacks 110) are positioned. The array 300 includes an eight by five array (280+kW array), with all gas services from the bottom. In these layouts, the housing base 30, 50 incorporates heat exchange functions and distributes and collects gasses evenly to all fuel cell stacks. FIG. 8A is a perspective view of a base portion of the fuel cell assembly 20 shown in FIG. 7A, showing the fuel and oxidant inlets and outlets of the array. Two stacks have been omitted on the left side of FIG. 7A, so that two of the oxidant preheat tubes can be seen. As shown in FIG. 8A, the electrochemical cell assembly 20 comprises a fuel inlet 22, a fuel outlet 24, an oxidant inlet 26 and an oxidant outlet 28 fluidly coupled to the array 200 of electrochemical cell stacks through the housing base 30. The housing base 30 also defines at least one heat exchange channel 34 configured to provide heat exchange between the fuel entering the housing base 30 through fuel inlet 22 and spent fuel exiting the housing base 30 through the fuel outlet 24. A plurality of stack interfaces 32 (e.g., throughholes) for communicating fuel and oxidant between the array 200 and the housing base 30 and one or more gas distribution channels 36 may also be provided in the housing base 30. Furthermore, a fuel bypass inlet 29 is fluidly coupled to the array 200 of electrochemical cell stacks through the housing base 32 such that the fuel bypass inlet 29 bypasses the at least one heat exchange channel. Thus the fuel inlet 22 and the fuel bypass inlet 29 provide dual fuel inlets, of which the fuel bypass inlet 29 leads straight into the array 200 of fuel cell stacks, and the fuel inlet 22 travels through the heat exchange and reforming sections. These dual inlets are optional, but provide extra controllability of stack inlet temperature and in-stack reforming.

Figure 7C:
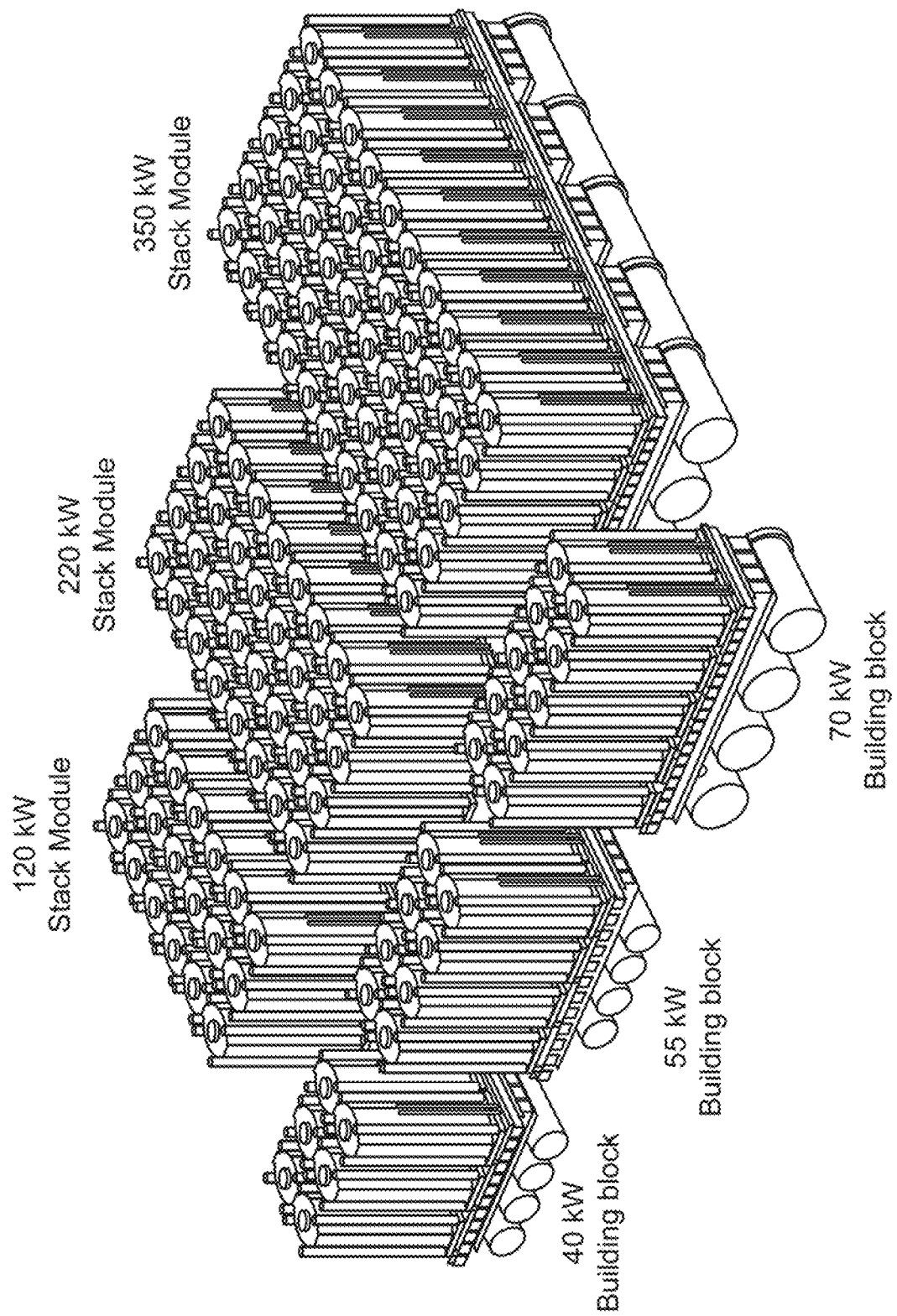
FIG. 7C illustrates deployment scales from 40 kW to 350 kW based on progressive arrays of the fuel cell stack shown in FIG. 7A.

FIG. 7C shows the flexibility in array size while maintaining overall module simplicity. Shown are conceptual arrays from 40 kW through 350 kW, based on the array 300 of fuel cell stacks shown in FIG. 7B.

Figure 8B:
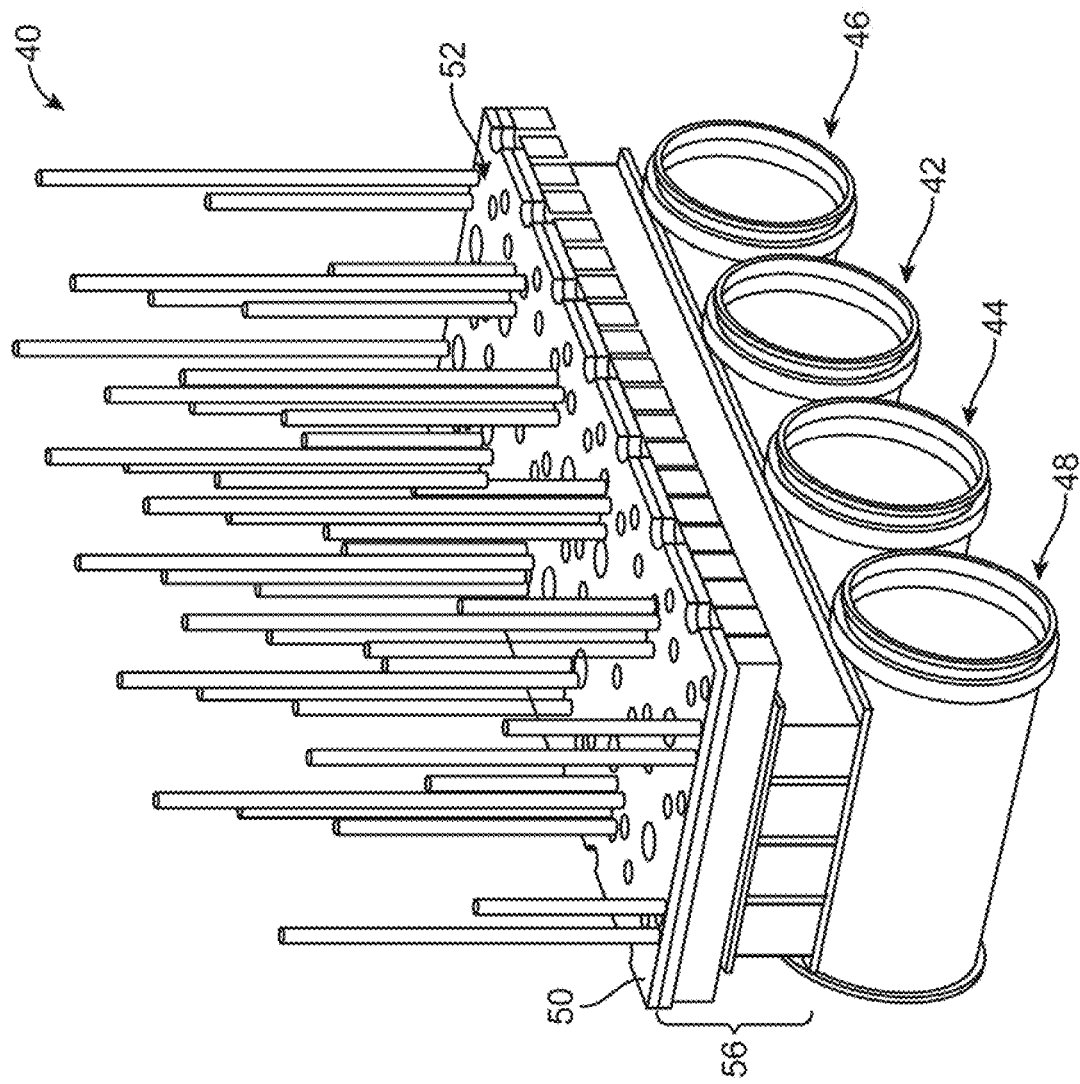

FIG. 8B is a perspective view of a base portion of the fuel cell assembly 40 shown in FIG. 7B, showing a fuel inlet 42, a fuel outlet 44, an oxidant inlet 46 and an oxidant outlet 48 fluidly coupled to the array 300. In these embodiments, the upper portion 56 of the housing base 50 incorporates fuel in to fuel out heat exchange, and may also include fuel reforming sections. A plurality of stack interfaces 52 are also provided in the housing base 50. The fuel cell assembly 40 shown in FIG. 7B does not have dual inlets.

Figure 9A:
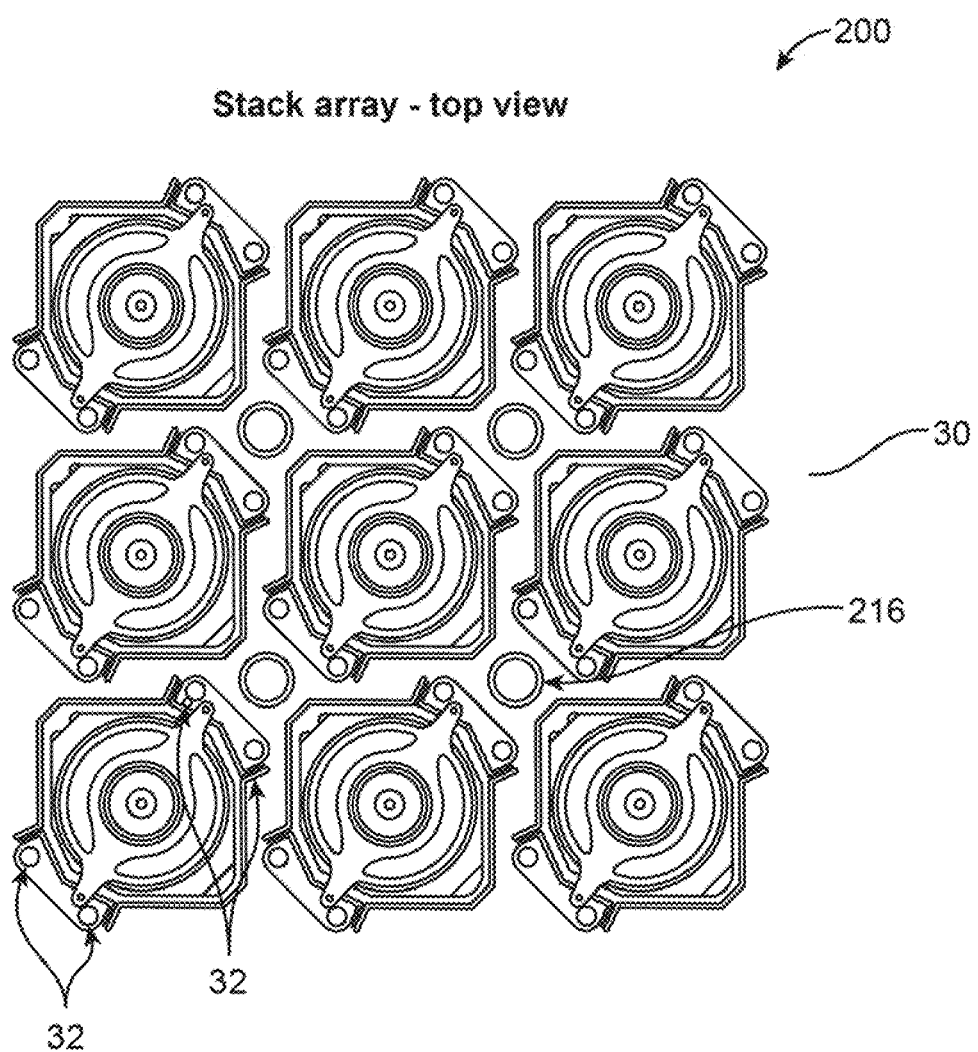
FIGS. 9A and 9B are top views of a portion of the arrays shown in FIGS. 7A and 7B, showing oxidant preheating tubes and stack mounting points.
Figure 9B:
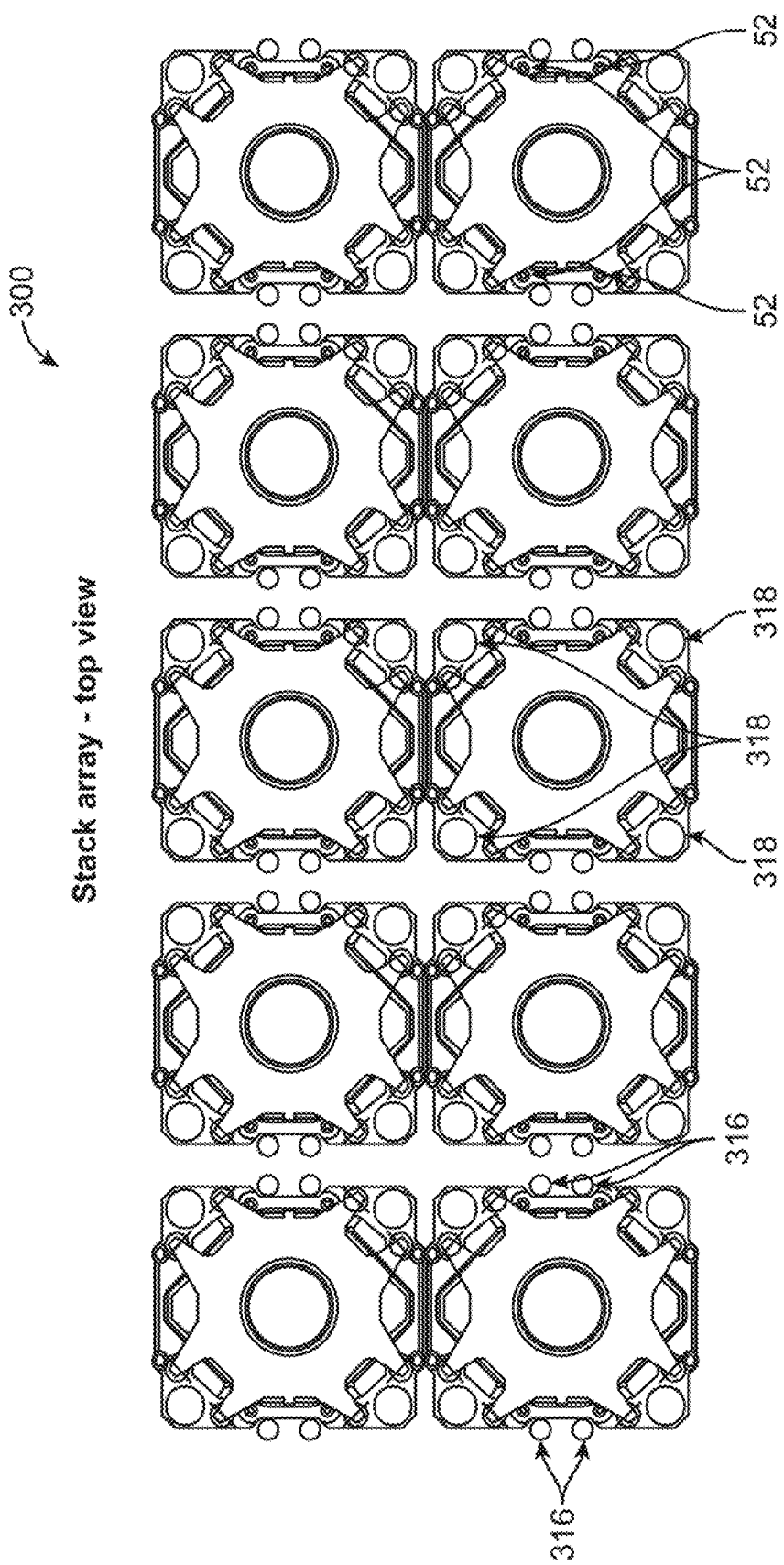

In these embodiments, the cold air inlets enter the stack hot zone from the bottom. FIG. 9A is a top view of a portion of the fuel cell stack 200 shown in FIG. 7A, showing oxidant preheating tubes 216 and stack mounting interfaces 32. FIG. 9B is a top view of a portion of the fuel cell stack 300 shown in FIG. 7B, showing oxidant preheating tubes 316, fuel preheating tubes 318 and stack mounting interfaces 52. As seen in FIGS. 9A and 9B, the arrays 200, 300 of these embodiments also include oxidant preheat tubes 316, which act as radiant surfaces to absorb heat from the fuel cell stacks and use it to preheat the incoming gas. However, in these embodiments, the oxidant preheat tubes 316 lead up into the hot zone (rather than down from a top of the array). In these embodiments of the array, the only connections out the top are the top current collection connections. These are relatively simple connections due to the small current carried by each stack (typically less than 30 A for fuel cell operation and typically less than 150 A for electrolysis operation).

Interconnect Design

When designing for small cells, one of the challenge areas is sealing. Given a seal with some characteristic leakage that is proportional to seal area and inversely related to seal thickness in the leak direction, designing to minimize leakage will favor larger cells. Firstly, the ratio of cell active area to edge length (sealed length) scales roughly with cell size $$\text{Active Area/Seal length} \approx \frac{x^2}{4x} \propto x$$

Secondly, proportionally less active area is given over to sealing, for a given seal width, for large cells.

$$\text{Active Area/Total Area} \approx \frac{(x - \text{seal width})^2}{x^2}$$

This means that smaller cells will need narrower seals in order to maintain a reasonable active area ratio, and that they will also require lower leak per unit seal length, to maintain the same overall leakage rate.

These constraints mean that a narrow seal that has low leak rate is desirable to support a high performing, low leak stack based around small cells. This type of sealing exists in the form of glass-ceramic seals, brazed joints, or welded joints. One drawback of such seals is that they are not compliant. Compliance may be desirable in SOFC stacks because it operates across a wide temperature range, and the parts of the stack need to move relative to one another during heatup or during changes in operating conditions to prevent damaging buildup of stress. Some stack designs build compliant features into the sheet metal interconnects in order to enable rigid joints, but the compliant features themselves are relatively bulky and suffer the same problem as wide seals; they become space ineffiecient for small cell designs.

Figure 10:
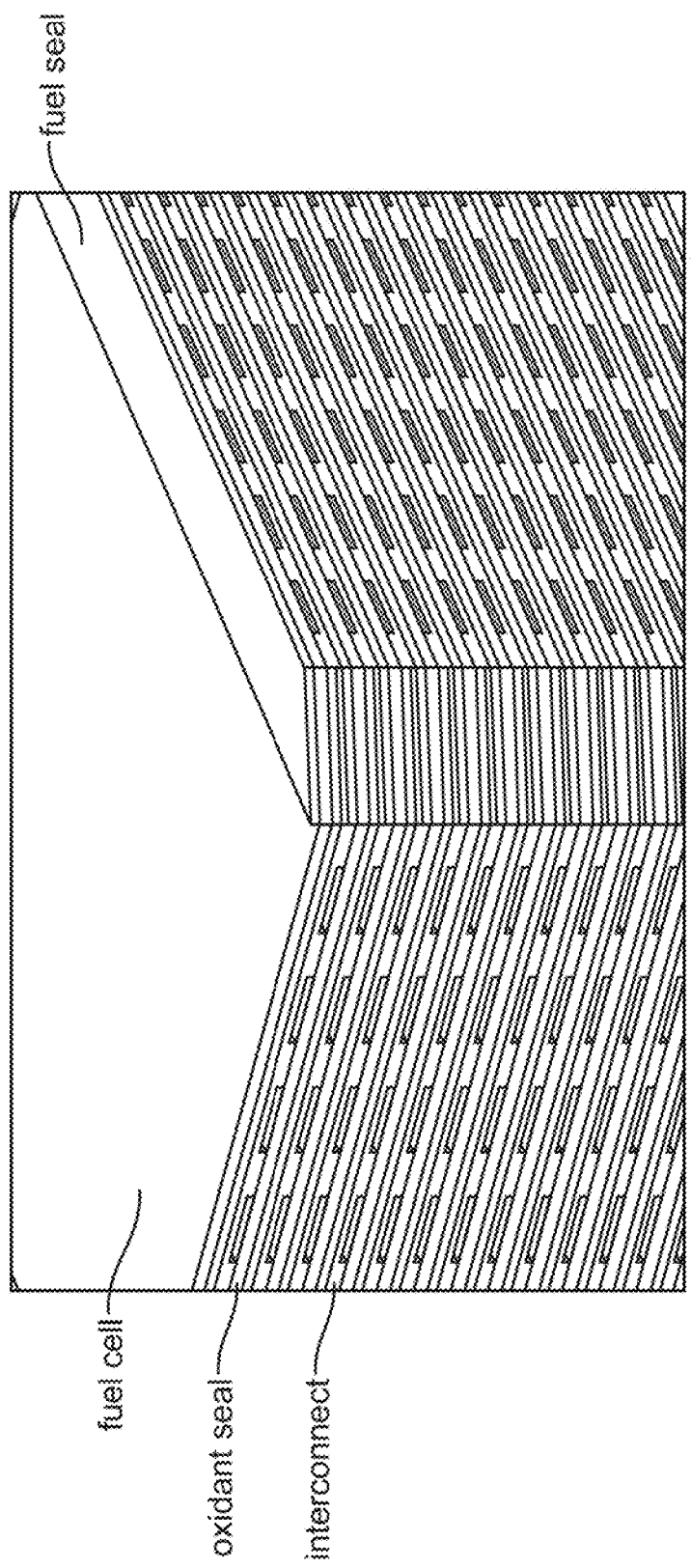
FIG. 10 is a perspective view of a fuel cell stack having an overlapping seal design that is known in the art.

FIG. 10 is a perspective view of a fuel cell stack having an overlapping seal design that is known in the art, and illustrates the typical compliance challenge in a cross flow stack configuration. For the sake of discussion, assume fuel is flowing lower-left to upper right, and oxidant is flowing lower right to upper left. Manifolds that separate fuel from oxidant external to the stack are not shown.

The upper-most visible seal is a fuel seal that separates the fuel travelling across the cell from the oxidant that is against the lower right face of the stack. Directly below the top cell is an oxidant seal along the left edge. This separates the oxygen flowing across the cell from the fuel exposed to the left edge. The pattern repeats across the full stack, which may include hundreds of cell layers.

The compliance problem arises where the seals overlap, as in the foreground of FIG. 10. The structure in the center foreground is made of repeating layers of seal, cell, seal, and interconnect. There is no ability to absorb strain (X, Y, or Z) in this region without one or more of the components yielding. If the goal is to use hermetic or near hermetic seals that are non-compliant then the cell is often the weakest component of the structure. In this case stress buildup will cause the cell to fracture before yielding in most cases. This type of structure is not robust to real world conditions.

In order to relieve the inevitable thermal stresses, compliance must be incorporated into the stack design. There are two main approaches to incorporating compliance. In the first approach, the seals are made to be compliant, often as a packed fiber/powder ceramic composite, or plate-like material (e.g., mica) which can move and relieve stress between components. These seals inevitably leak as a result of their structure, and therefore limit how small a cell can be used before leakage starts to dominate performance. In the second approach, a special interconnect or extra component is used that incorporates compliance features. This is done, for example, by rigidly sealing a thin sheet metal component to the cell, effectively extending the cell perimeter, then laser welding this cell extension component to the interconnects. In this strategy there will be a perimeter seal and internal port seals located distant from both the perimeter and the cell joint. For example the perimeter seal may contain the fuel, and the port seals may contain the oxidant. The added perimeter required for this compliant part means that small cell sizes are not favored.

In contrast, in the embodiments described herein, the interconnect and overall structure directly provide the desired compliance, but without compromising on seal quality and without adding extra components or spacing to the design. The design allows the use of narrow rigid seals, and achieves a compliant, bellows-like structure, without adding to the size of the structure. This combination of good sealing in a small area and a compliant structure allows effective use of small cells.

The compliant interconnect design may have many competing design constraints. First, it may be desirable for the interconnect to: (1) provide controlled flow distribution to both the cell fuel electrode, and the cell oxidant electrode; (2) provide compliance to absorb stresses; (3) provide suitable fuel and oxidant pressure drops; (4) provide adequate current conductive path; and (5) isolate the fuel stream from the oxidant stream over the life of the stack.

Figure 11:
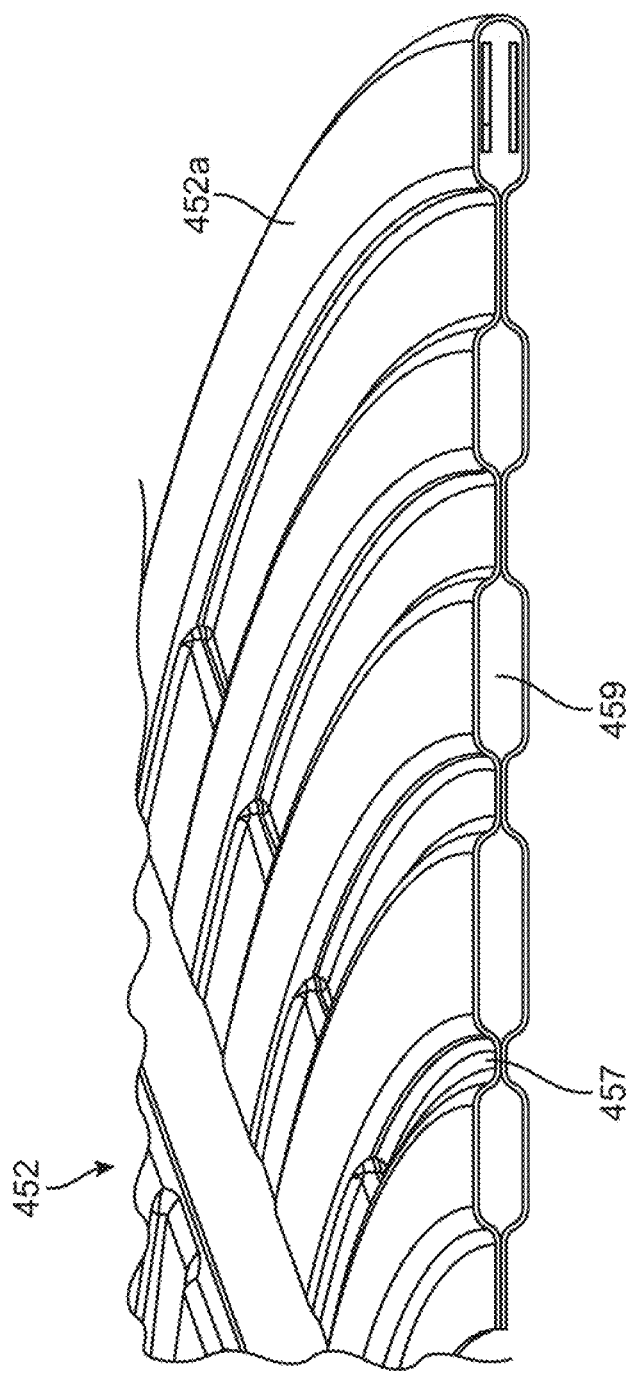
FIG. 11 is a cross-sectional perspective view of an interconnect according to an embodiment.
Figure 12B:
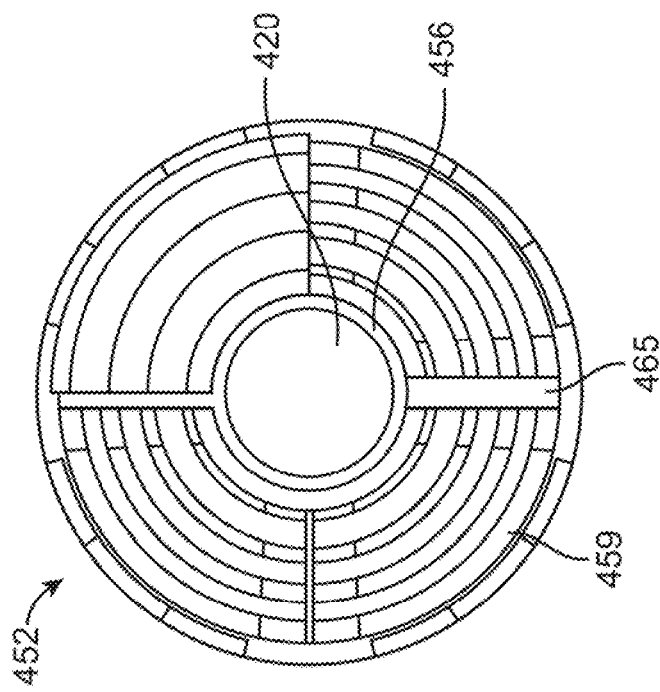
FIGS. 12A and 12B are top and bottom views, respectively, of the interconnect shown in FIG. 11.
Figure 12A:
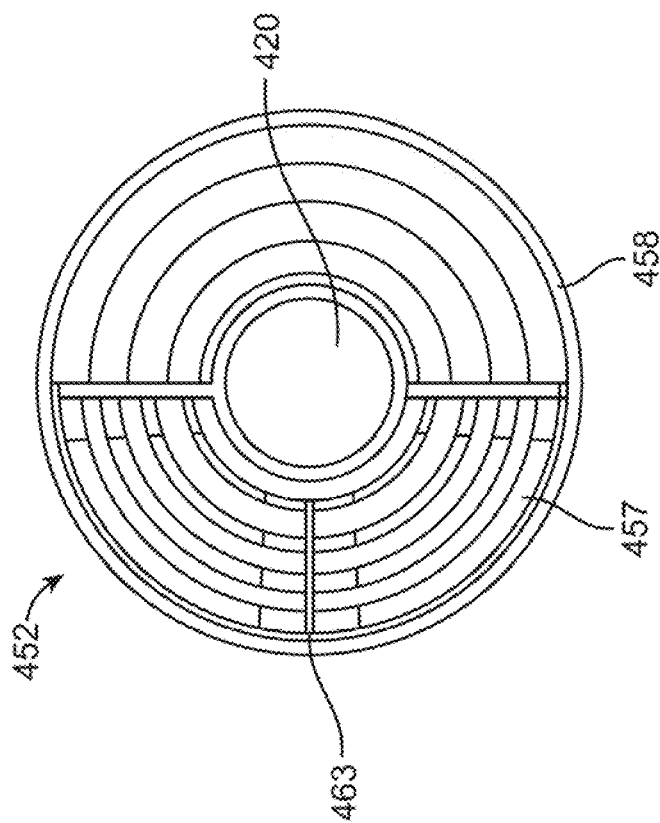

FIG. 11 is a cross-sectional perspective view of an interconnect 452 according to an embodiment. The interconnect 452 includes an interconnect main body 452a defining a plurality of fuel channels 457 and a plurality of oxidant channels 459. In FIG. 11, the fuel side is on the top. The fuel channels 457 simultaneously form the electrical contact areas to the cell oxidant electrode. The oxidant channels 459 simultaneously form the electrical contact areas to the cell fuel electrode. The fuel channels 457 are separated by ribs on the top side of the interconnect 452, while the oxidant channels 459 are separated by ribs on the bottom side of the interconnect 452, i.e., the fuel side ribs form the oxidant channels 459 and vice-versa. FIGS. 12A and 12B are top and bottom views, respectively, of the interconnect 452 shown in FIG. 11 having a longitudinal channel 420 described therethrough at a geometric center thereof. FIG. 12A shows a top, fuel side of the interconnect showing a fuel inlet channel 463 (or fuel outlet channel depending on direction of flow) fluidly coupled to each of the fuel channels 457. FIG. 12B shows a bottom, oxidant side of the interconnect showing an oxidant inlet channel 465 (or an oxidant outlet channel depending on the direction of flow). FIGS. 12A and 12B show the effective active area fed by each channel 457 for the fuel side (FIG. 12A) and 459 oxidant side (FIG. 12B) of the interconnect 452. The flat semi-circular areas overlaid on the interconnect 452 represent the cell active area exposed to each interconnect channel 457, 459. The active areas are each a function of both the position and size and of each channel 457, 459. The interconnect 452 is designed to provide flows down each channel 457, 459 that are in proportion to the active area served by that channel 457, 459. This is accomplished while respecting the size and spacing constraints that provide appropriate current collection from both cell electrodes. Any change to the geometry impacts flow and electrical characteristics of both sides of the interconnect 452. Optionally, contact interlayers may be added between the each cell and each interconnect 452, to aid in electrical contact.

In the example shown in FIGS. 12A and 12B, an outer seal member 458 is, in this example, a fuel seal member, which is on the outer perimeter (FIG. 12A). An inner seal member 456 is, in this example, an oxidant seal member, which is on the inner perimeter (FIG. 12B) around the longitudinal channel 420 of the fuel cell stack. The separation of the fuel seal member from the oxidant seal member in space and the corrugated interconnect design provide the necessary compliance without adding to the perimeter or thickness of the stack. Of course, in embodiments in which the oxidant flows through the longitudinal channel 420, the inner seal member 456 will act as a fuel seal, while the outer seal member 458 will act as an oxidant seal.

The base material for the interconnect 452 is on the order of 0.1 mm thick (e.g., 0.07 to 0.13 mm thick). This is possible because the active area of the cell is low, and because the distance from any point on the cell to the edge is relatively small, which lead to the stack temperature being well controlled. For larger stacks, or where distances are larger, the interconnect thickness must increase in order to have enough thermal conductivity to maintain control of the stack and cell temperatures.

Internal Seal Design

Figure 13:
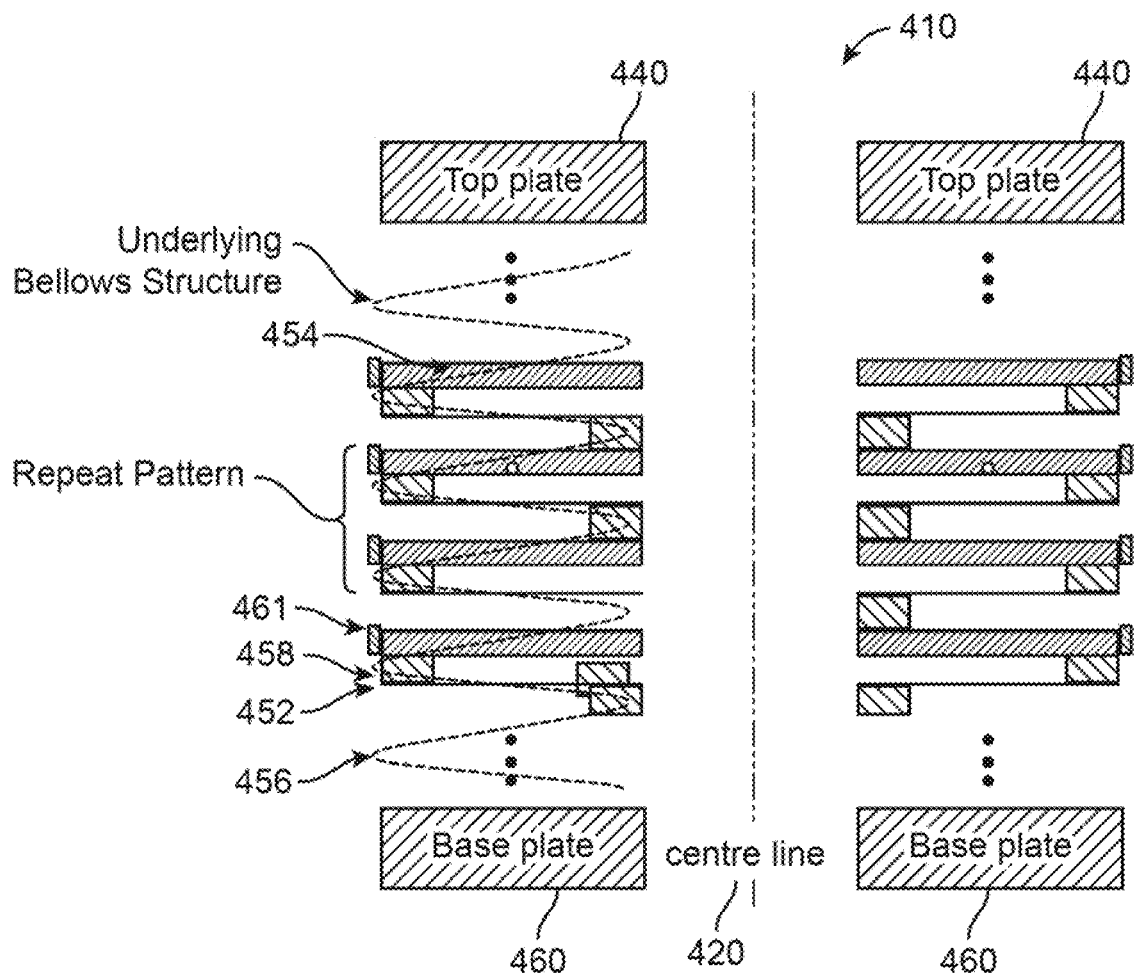
FIG. 13 is a schematic cross-sectional view of a fuel cell stack having a bellows-like structure, according to an embodiment.

The internal seals, those that are between the interconnect 452 and cells, and which separate fuel gas from oxidant gas, may be implemented as glass ceramic seals in the electrochemical cell stacks included in the array 100, 200 or 300. Their position may alternate between the inner diameter and outer diameter in a way that generates a bellows-like structure, which can be seen in the schematic cross-sectional view of FIG. 13 which shows a schematic illustration of an electrochemical cell stack comprising a fuel cell stack 410 which includes the interconnect 452 and is compressed between a top plate 440 and a bottom plate 460. In other words, the plurality of interconnects 452 included in the fuel cell stack 410 cooperatively form a bellows like structure such that the fuel cell stack 410 has compliance. The interconnect 452 may be on the order of 0.1 mm thick. The thin material coupled with the corrugations that generate the flow field make an interconnect 452 that readily relieves stress within that layer. This generates a robust structure where stress is prevented from building up layer to layer. As shown in FIG. 13, it is preferably that no additional separators or metal components are used in order to provide the stress relieving functionality. That is, the bellows-like structure of the fuel cell stack 410 is made of alternating a cell 454, an outer seal 458, an interconnect 452, and an inner seal 456.

Figure 14:
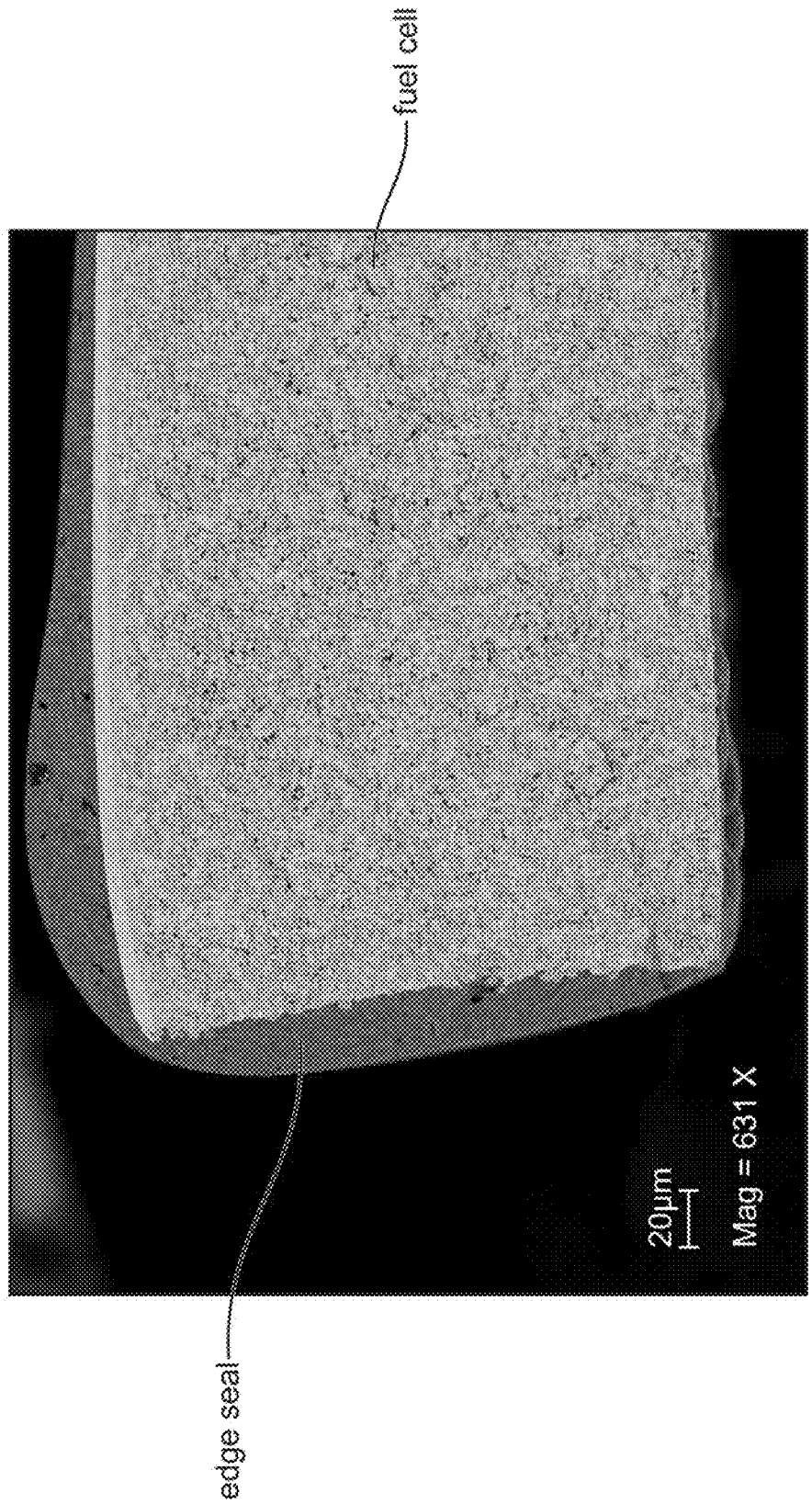
FIG. 14 is a photograph showing a cross-section of an electrochemical cell that has been edge sprayed to seal an edge of the electrochemical cell.

In addition to the inner seal 456 and the outer seal 458 an edge seal member 461 may be disposed on at least one of an outer edge of the electrochemical cells 454 (e.g., each of a first electrochemical cell and the second electrochemical cell included in an electrochemical cell unit, e.g., a fuel cell unit or an electrolysis cell unit) proximate to the outer perimeter of the interconnect 452 or an inner edge of the electrochemical cells 454 proximate to the longitudinal channel 420. For example, the edge of the cell anode support is typically porous. In the embodiment shown in FIG. 13, the edge seal member 461 is disposed on an outer edge of the electrochemical cells 454 so as to provide additional sealing between the fuel gas and oxidant gas. FIG. 14 is a photograph showing a cross-section of a fuel cell that may correspond to an electrochemical cell (e.g., the electrochemical cells 154a/b depicted in FIG. 1B) that has been sealed.

Post Design

As a manifold for gas (either fuel or oxidant) passing through the longitudinal channel to the electrochemical cells, a post may be used. The post may be located in the longitudinal channel, and configured to separate the gas inlet into the electrochemical cells from the longitudinal channel from the gas outlet from the electrochemical cells into the longitudinal channel. The post may be sealed in place with a ceramic slurry, paste, batting, or combination thereof to provide compliant sealing between the inlet and outlet streams. The post may be a machined metal, multi-part sheet metal, a brazement, or ceramic with features that form a vertical channel into which a compliant seal material is added.

Figure 15A:
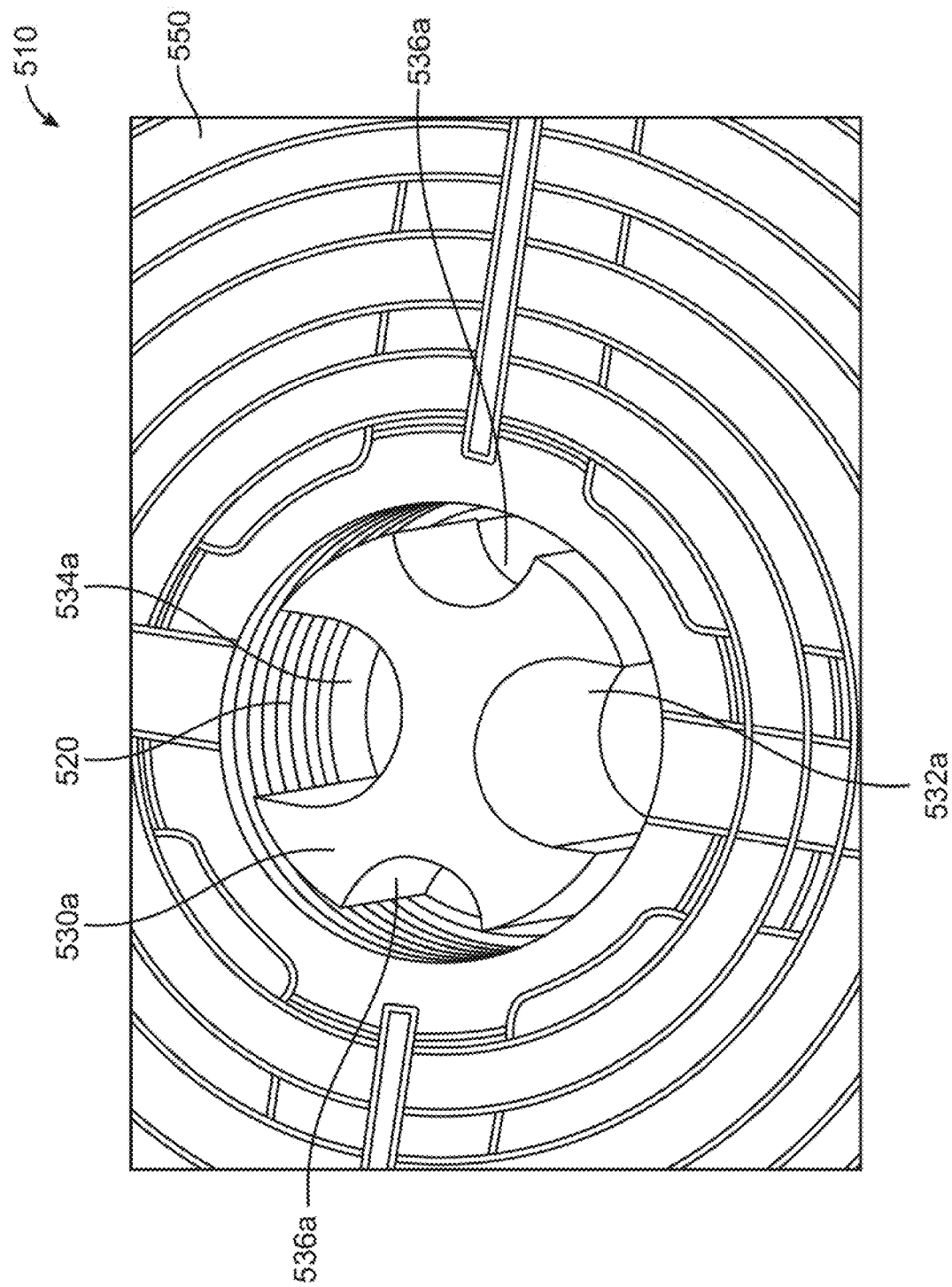
FIGS. 15A-15C are top cross sectional views of a portion of a fuel cell stack, showing a post located in a longitudinal channel of the stack, according to three different embodiments.
Figure 15B:
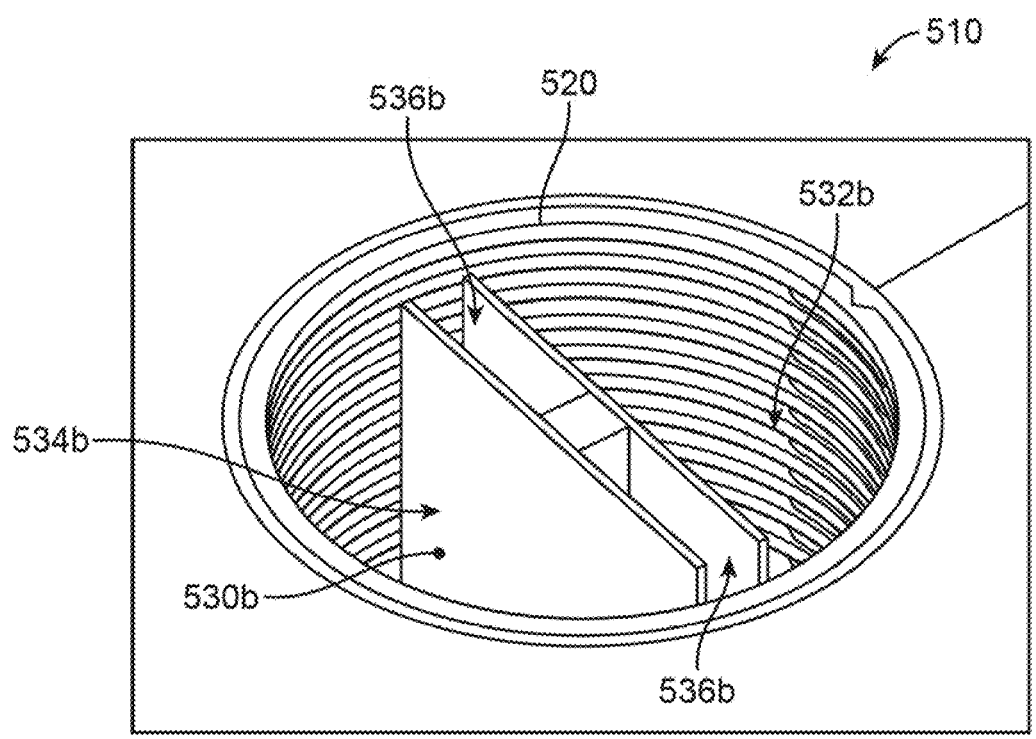
Figure 15C:
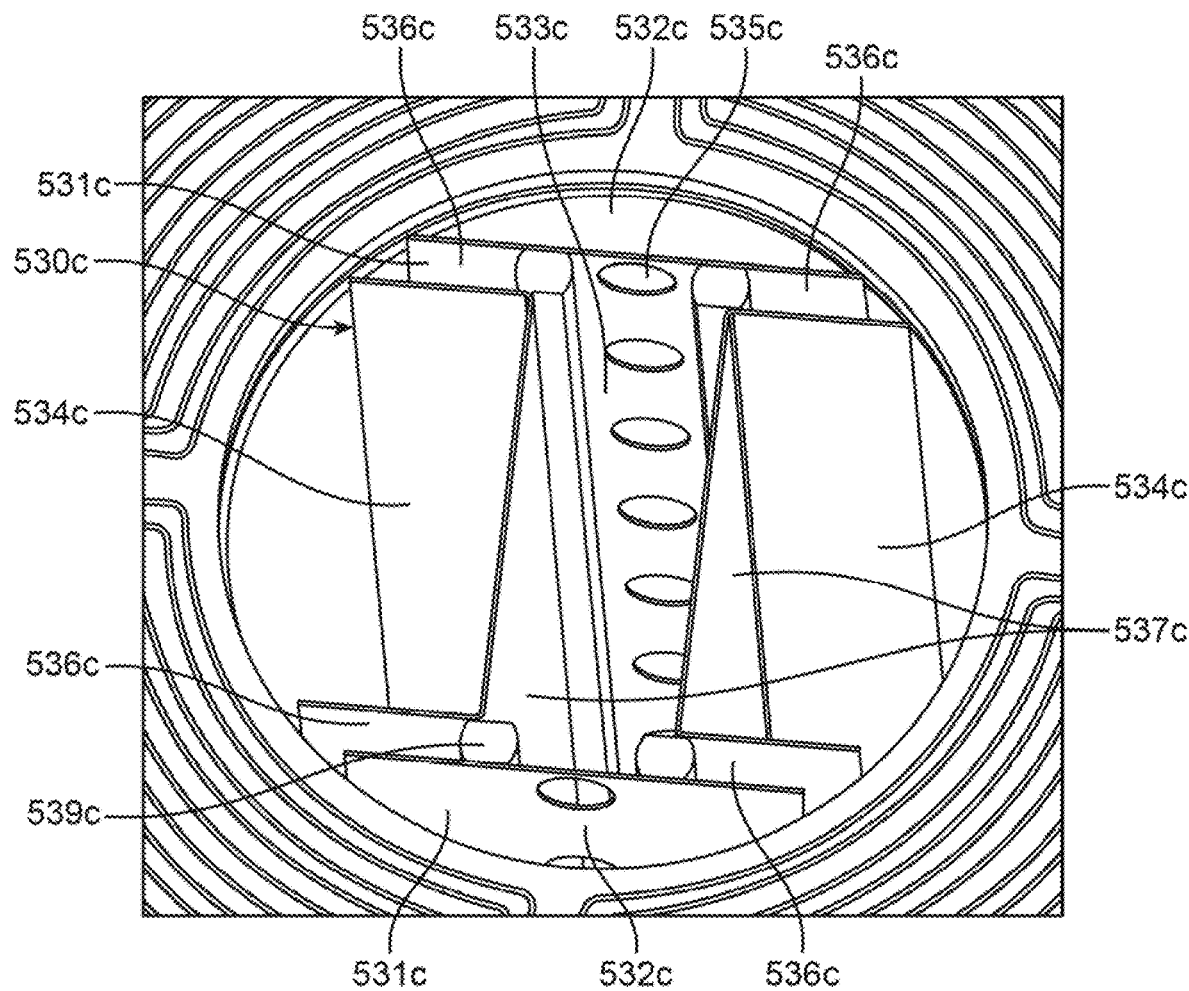

FIGS. 15A-15C are top cross sectional views of a portion of a fuel cell stack 510, showing various posts located in a longitudinal channel 520 of the stack 510, according to three different embodiments. In these embodiments, the longitudinal channel 520 is a central channel extending along an axial center of the stack 510, and thus the post within the channel is termed a "center post." However, in other embodiments, the post may be located in a channel that is offset from a center of the stack 510. In this embodiment it is also assumed that fuel gas passes through the longitudinal channel 420. FIG. 15A shows a circular post 530a according to one embodiment. The post 530 defines deep grooves axisymmetrically located on a periphery thereof so as to define a post inlet 532a configured to receive fuel and a post outlet 534a configured to receive and expel spent fuel the electrochemical cell stack 510. The post inlet 532a and the post outlet 534a are fluidly isolated from each other via seal cavities 536a. FIG. 15B shows a post 530b according to another embodiment disposed in the longitudinal channel 520. The post 530b comprises two parallel plates that divide the longitudinal channel 520 into a post inlet 532b, a post outlet 534b, and seal cavities 536 fluidly isolating the post inlet 532b from the post outlet 534b. In the embodiments of FIGS. 15A and 15B, the post 530a/b which are center posts include one fuel inlet port and one fuel outlet port.

FIG. 15C shows a post assembly 530c including two fuel inlet plates 531c positioned opposite each other. Two fuel outlet plates 537c are positioned perpendicular to the fuel inlet plates 531c so as to define two post outlets 534c opposite each other. In the embodiment of FIG. 15C, the post 534c includes a central channel 533c, for example, a fuel inlet port that is separated from two side post channels 532c (e.g., side fuel ports) by the fuel inlet plates 531c having a plurality of openings 535c. Fuel flows into the central channel 533c and then flows into the side post channels 532c via the openings 535c. The center post assembly 530c of this embodiment has two post outlets 534c which include fuel outlet ports. A sealing member 539c, such as a ceramic caulking material, is inserted into seal cavities 536c to separate inlet fuel from outlet fuel. This seal need not be hermetic, because the leak path does not result in combining fuel and air. Rather, the impact of a leak past this seal is to reduce the fuel flow through the stack itself. A moderate leak, up to a couple percent of total flow, will not have a significant impact on stack performance. Even moderate leaks may have no noticeable impact on any system characteristics because solid oxide fuel cell systems typically operate with excess fuel in order to sweep reaction products ($H_2O$, $CO_2$, etc.) from the fuel electrode.

The sealing member 539c material used in the post 530c may be designed to be somewhat compliant in order to allow thermal stresses to dissipate within the structure. As a consequence of the compliance requirement, the sealing member 539c is not rigidly bonded to the cell layers, and it is not hermetic. However it can be designed to be simultaneously compliant and of sufficiently low leakage that fuel will flow preferentially around the interconnect rather than leak through the seal.

Figure 16B:
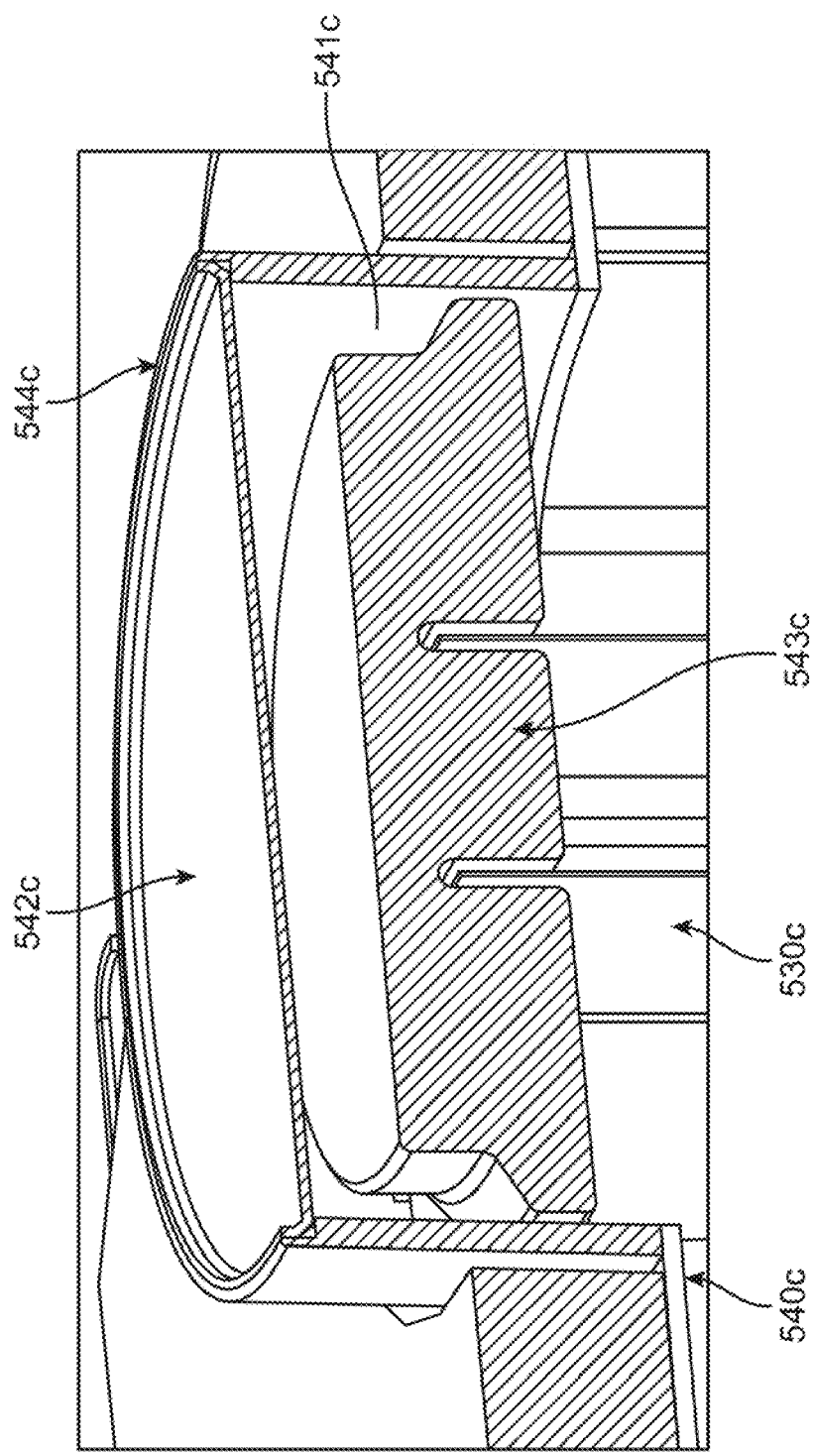

FIGS. 16A and 16B are cross-sectional perspective views of a top portion of the fuel cell stack 510 of FIGS. 15A and 15C, respectively, showing the center post 530a, 530c along with a top plate 540a/b and top cap 542a/b. A direct bond to top and bottom plates of the stack could induce unwanted thermal stress. To prevent this, the top (and optionally bottom) junctions are structured as a compliant fit. A sealant is provided in the gap between the center post and the top plate and/or bottom plate (e.g., the same sealant as used on the sides of the post). The allowed movement between the center post and the top plate need not be large as long as it is sufficient to relieve thermal stresses. An order of magnitude calculation of the desired relative motion follows:

$$\delta = \alpha * L * \Delta T = 12 \cdot 10^{-6}[K^{-1}] * 300[mm] * 50[K] = 0.18 \ [mm]$$

This calculation indicates that at an average coefficient of thermal expansion typical of SOFC materials of 12E-6 $K^{-1}$, a 300 mm tall stack will require 0.18 mm of motion between the top of the center post and the top plate, if the center post is 50° C. warmer (or colder) than the average stack temperature. This calculation does not represent any particular test case, it is intended only to give an understanding of the order of magnitude of differential thermal expansion that might occur.

Expanding further, as shown in FIGS. 16A and 16B, a top plate 540a/c is positioned is positioned at a top end of the fuel cell stack 510 around the post 530a/c such that a gap 541a/c is provided between the top end plate 540a/c and the post 530a/c. The gap 541a/c may be structured to allow movement of the post 530a/c therewithin for relieving thermal stress. In some embodiments, a compliant sealing member may be positioned in the gap 541a/c. For example, FIG. 16B shows a compliant sealing member 543c positioned in the gap 541a/c over the post assembly 530c. The compliant sealing member 543c may be configured to provide sufficient compliance so as to allow movement of the post 530c within the gap 541a/c. A top end cap 542a/c may be positioned on the top end plate 540a/c, for example, to close the stack. A secondary sealing member 544a/c may be interposed between the top end plate 540a/c and the top end cap 542a/c.

The compliant sealing member 543a/c between the center post 530a/c and the top plate 540a/c and/or bottom plate may leak. The secondary sealing member 544a and the top end cap 542a/c are added above the post 530a/c. No compliance may be desired from the secondary sealing member 544a, so it can be rigid and leak free.

End Plate Design

The electrochemical cell stacks (e.g., fuel cell stacks or electrolysis cell stacks) described herein may also include a bottom end plate in addition to a top end plate (e.g., the top end plates 540a/c). The bottom end plate mechanically supports the stack and provides gas connections for reactants (fuel and oxidant gas). The bottom end plate provides a sealing surface against which other seals of the fuel stack and/or array interface, and further provides a sealing surface for the stack outer manifold (e.g., the oxidant manifold) and the post. The bottom end plate provides allowances for mounting, and isolates the stack core (cells, interconnects, and seals) from stresses induced at the sealing faces and bolt locations. The bottom end plate also transmits compressive loads into the stack from the compression system. Further, the bottom end plate may act as one of the electrical connection points for the stack.

Figure 17A:
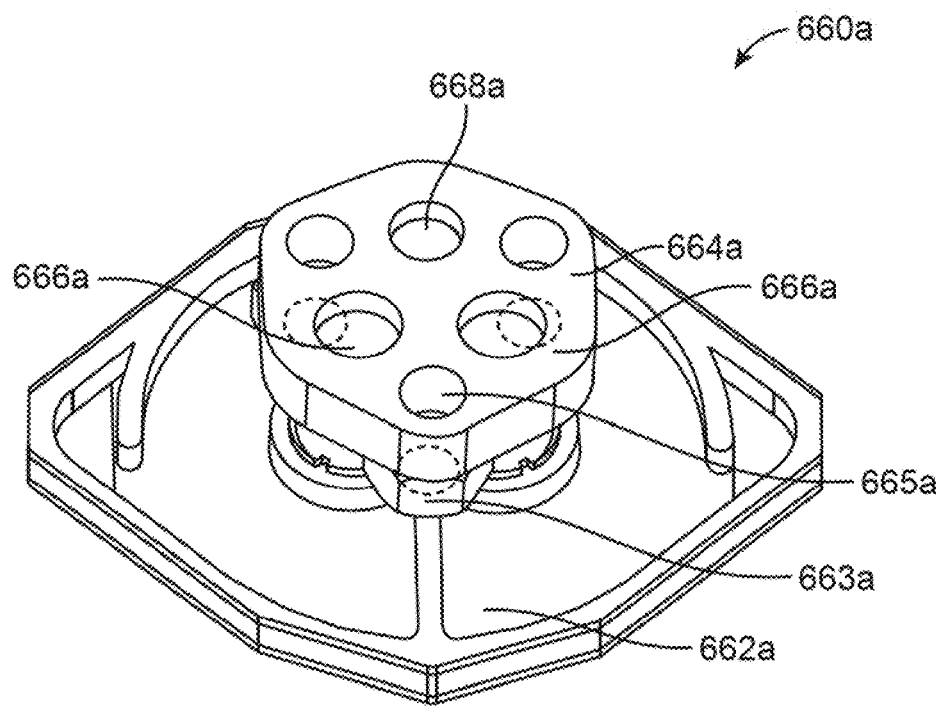
FIGS. 17A-17C are bottom perspective views of three different designs of a base plate assembly, according to embodiments.
Figure 17B:
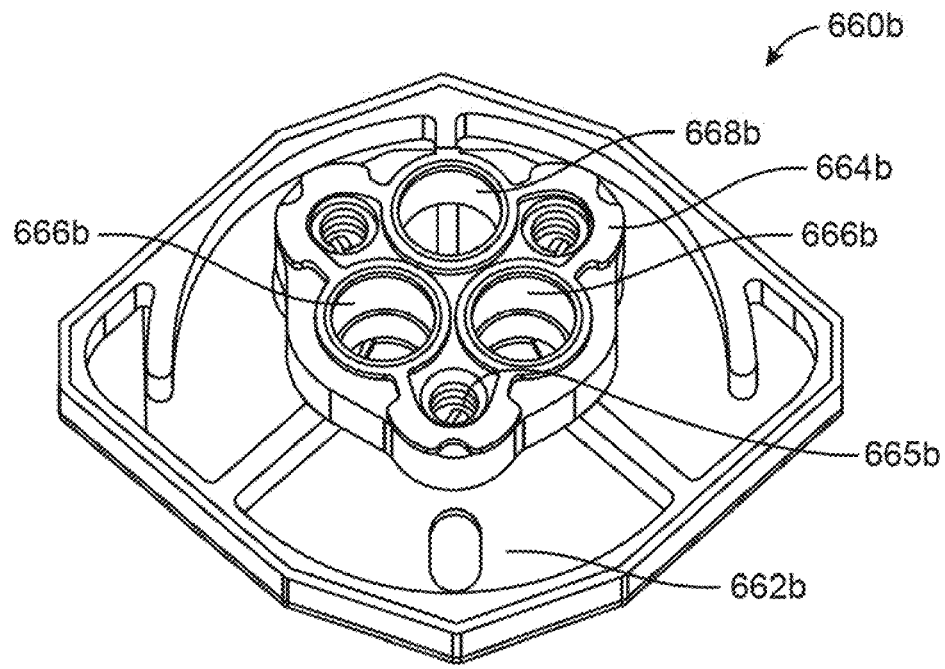
Figure 17C:
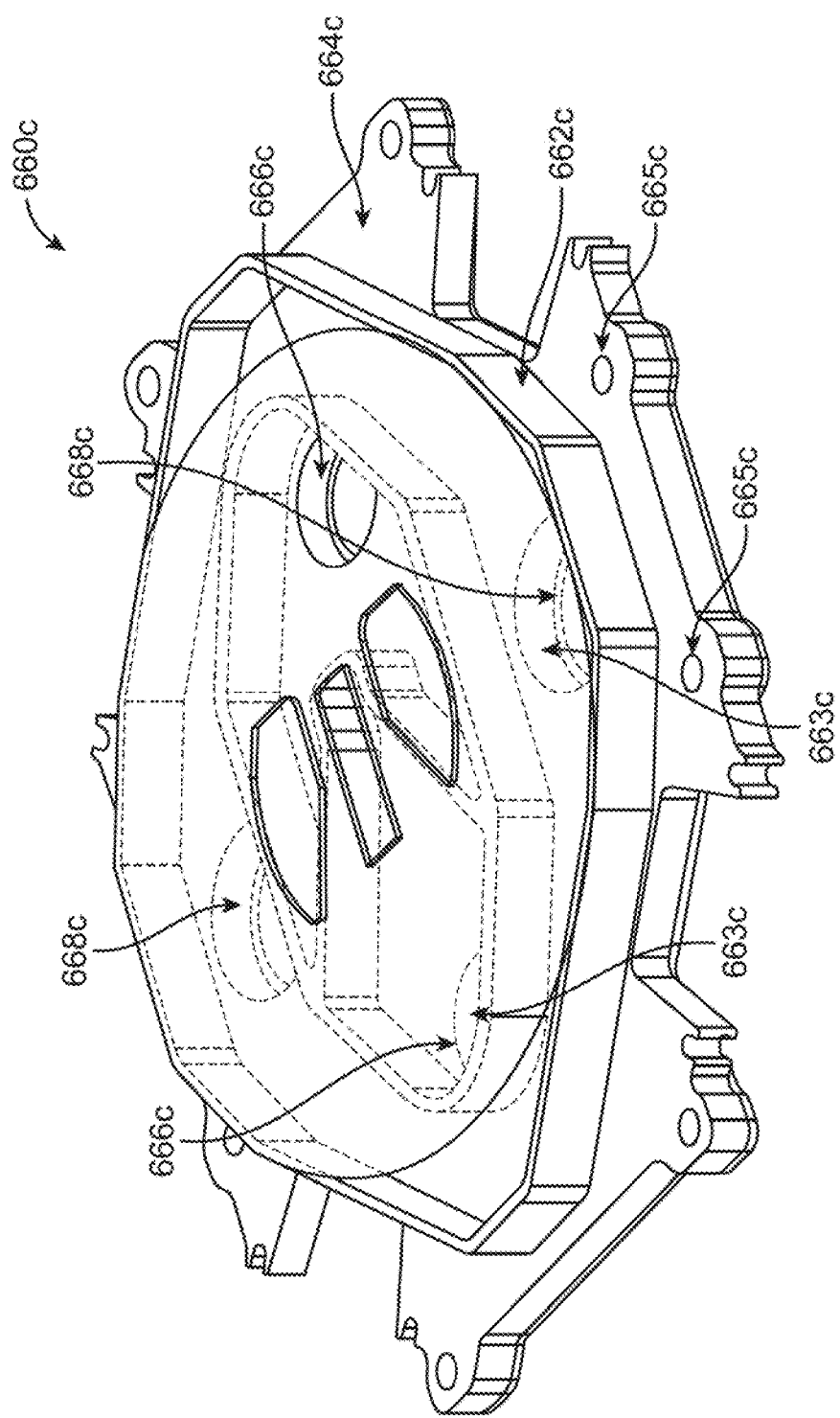

FIGS. 17A-17C are bottom perspective views of three different designs of base plate assemblies 660a/b/c, according to embodiments. Each of the base plates assemblies 660a/b/c include a bottom end plate 662a/b/c defining at least one fuel port 666a/b/c and at least one oxidant port 668a/b/c, and a high strength sealing plate 664a/b/c. The high strength sealing plate 664a/b/c is axially aligned with the bottom end plate 662a/b/c/ and configured to yield relative to the bottom end plate 662a/b/c so as to reduce transfer of mechanical stress from the high strength sealing plate 664a/b/c to the bottom end plate 662a/b/c. A plurality of attachment points 665a/b/c may be provided in the bottom end plate 662a/b/c so as to allow coupling of the electrochemical cell stack (e.g., a fuel cell or electrolysis cell stack) thereto.

In the embodiments of FIGS. 17A and 17B, the high strength sealing plate 664a/b is uppermost having a high strength sealing surface (e.g., made of a high strength super alloy such as Haynes 230). This provides the surface strength required to interface with a compression sealing member. High strength super alloys, however, typically have a higher coefficient of thermal expansion than is acceptable for the balance of stack components. Thus, isolation between the high strength sealing surface and the rest of the stack is provided. FIG. 17A depicts a base plate assembly 60a in which the high strength sealing plate 664a is separated from the bottom end plate 662a by short tubes 663a which are designed to yield under imposed thermal stress, limiting the transfer of thermal stress into the stack.

FIG. 17B depicts the base plate assembly 660b in which the high strength sealing plate 664b includes yield points, so that the high strength sealing plate 660b does not have sufficient strength to transfer stress through the bottom end plate 662b and into the stack. In the embodiments shown in FIGS. 17A and 17B, one oxidant port is routed through the bottom end plate 662a/b, as are two fuel ports. In the embodiment where oxidant, rather than fuel, is provided via the post, the bottom end plate may instead include one fuel port and two oxidant ports. Threaded members are introduced that allow bottom end plate mounting. The threaded members are isolated within the design to prevent them transmitting stress into the stack structure. The internal structure of the end plates is designed to carry the load from the compression system into the stack. Current collection losses lower than 0.1% at the connection between bottom end plate and system have been demonstrated with this design. The top end plate provides a sealing surface for the oxidant manifolds and the post. It also transmits compressive loads into the stack from the compression system, and isolates the stack core (cells, interconnects, seals) from stresses induced by the compression system. The top end plate provides a compliant sliding junction for the top of the post. The top end plate may also act as one of the electrical connection points for the stack.

FIG. 17C depicts the base plate assembly 660c in which the high strength sealing plate 665c is mechanically separate but contained within the bottom end plate 662c, thereby providing the necessary strength to achieve sealing between the stack and the manifold to which it attaches, without driving thermal stress into the stack structure through coefficient of thermal expansion (CTE) mismatch. In other words, the bottom end plate 662c is interposed between the stack of the plurality of fuel cell units and the high strength sealing plate 664c. A plurality of attachments points 665c may be provided on the high strength sealing plate 664c. The high strength sealing plate 664c is free to move laterally relative to the bottom end plate 662a so as to reduce stress transfer thereto, but when bolted to its mating manifold in system, captures a portion of the bottom end plate 662c between itself and the mating manifold system. The mechanical strength for sealing therefore comes from the high strength sealing plate 664c, while the transport of gases from the mating manifolds into the stack occurs through the mechanically separate and thermal expansion matched bottom end plate 662c. Friction between the high strength sealing plate 664c and the captured low strength, low CTE bottom end plate 662c may be partially alleviated by a ceramic release layer, but the captured portion of the bottom end plate 662c is further isolated from the high strength sealing plate 664c through a plurality of low yielding tubes (e.g., short low strength tubes) positioned adjacent to the high strength sealing plate 664c and the bottom end plate 662c so as to minimize the potential to transfer thermal expansion stresses into the stack structure.

Figure 18:
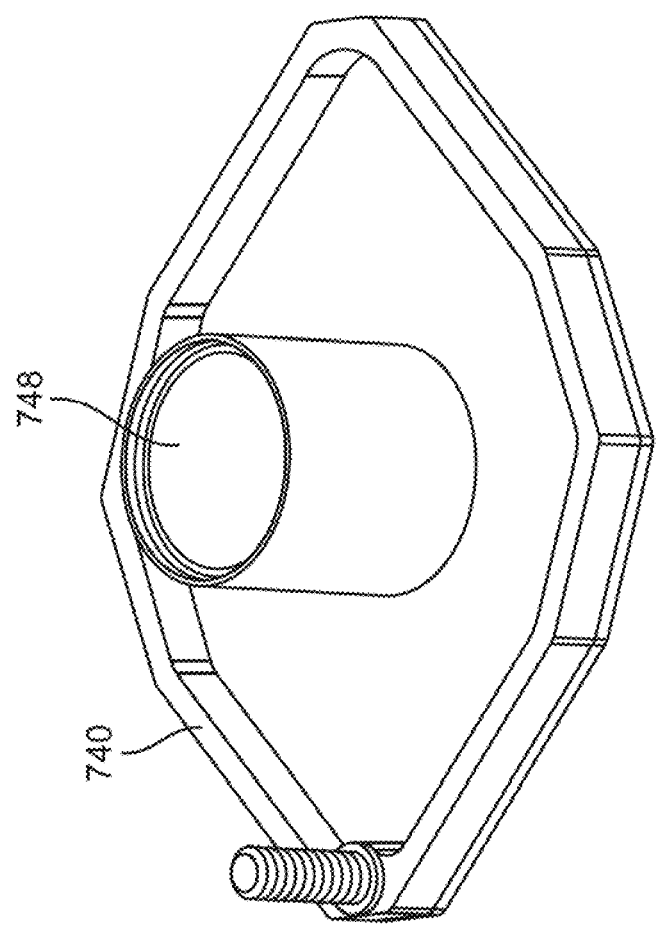
FIG. 18 is a top perspective view of a main top plate and post interface tube of a top compression plate assembly, according to one embodiment.

FIG. 18 is a top perspective view of a top end plate 740 including a post interface tube 748 extending axially from a surface of the top end plate 740 away from a post when the top end plate is positioned on a electrochemical cell stack (e.g., a fuel cell or electrolysis cell stack). The top end plate 740 may be included in a top compression plate assembly, according to some embodiments. At least a portion of the post interface tube 748 may be positioned around a portion of the post (e.g., a center post). The post interface tube 748 may provide a slip plane to allow for slight relative movement between the post and the top end plate 740.

In some embodiments, the stack includes an integrated compression system. This simplifies integration of the stack into arrays. One of the advantages of the small cell area and of the glass-ceramic seals is that compressive loads can be relatively small. The stack shown in FIG. 2, for example, used in the array 200 of FIG. 7A) is designed to operate with between 3.5 kgf and 9 kgf (34 N to 88 N), and another stack, for example, used in the array 300 of FIG. 7B is designed to operate at 9 kgf to 36 kgf compared to 360 kgf and 900 kgf, respectively for known 121 cm² and 550 cm² stacks. This simplifies both the compression element design and the compression plate design. First, consider compression plate stiffness requirements at a high level: The maximum deflection of a uniformly loaded 2D beam with pinned-pinned end connections is given by:

$$|V|_{max} = \frac{5w_0L^4}{384EI} \propto \frac{w_0L^4}{EI} = \frac{(w_0L)A^{1.5}}{EI}$$

This shows that, for a given allowable max deflection (e.g., deflection that is allowable without significantly impacting electrical contact), the beam stiffness must increase in direct proportion to the total load ($w_0L$) and with the 3$^{rd}$ power of beam length. In turn, beam length for a given stack can be approximated as the square root of cell active area. Two stacks can therefore be compared by the ratio $$\frac{EI_1}{EI_2} = \frac{F_1A_1^{1.5}}{F_2A_2^{1.5}}$$

With the caution that this is only an order of magnitude comparison, the above equation can be used to compare the compression plate stiffness requirements to that of a conventional 550 cm² stack. The calculation suggests that the fuel cell stack 110 of FIG. 2 or the fuel cell stacks included in the array 200 of 7A, for example, with 25 cm² active area can be approximately 10,000× less stiff while giving the same maximum deflection, while the fuel cell stack included in the array 300 of FIG. 7B, for example can be approximately 440× less stiff for the same maximum deflection. This allows for significant simplifications to the compression plate design. Note that the maximum allowable deflection is essentially independent of cell size, because deflection results in loss of electrical contact.

Figure 19A:
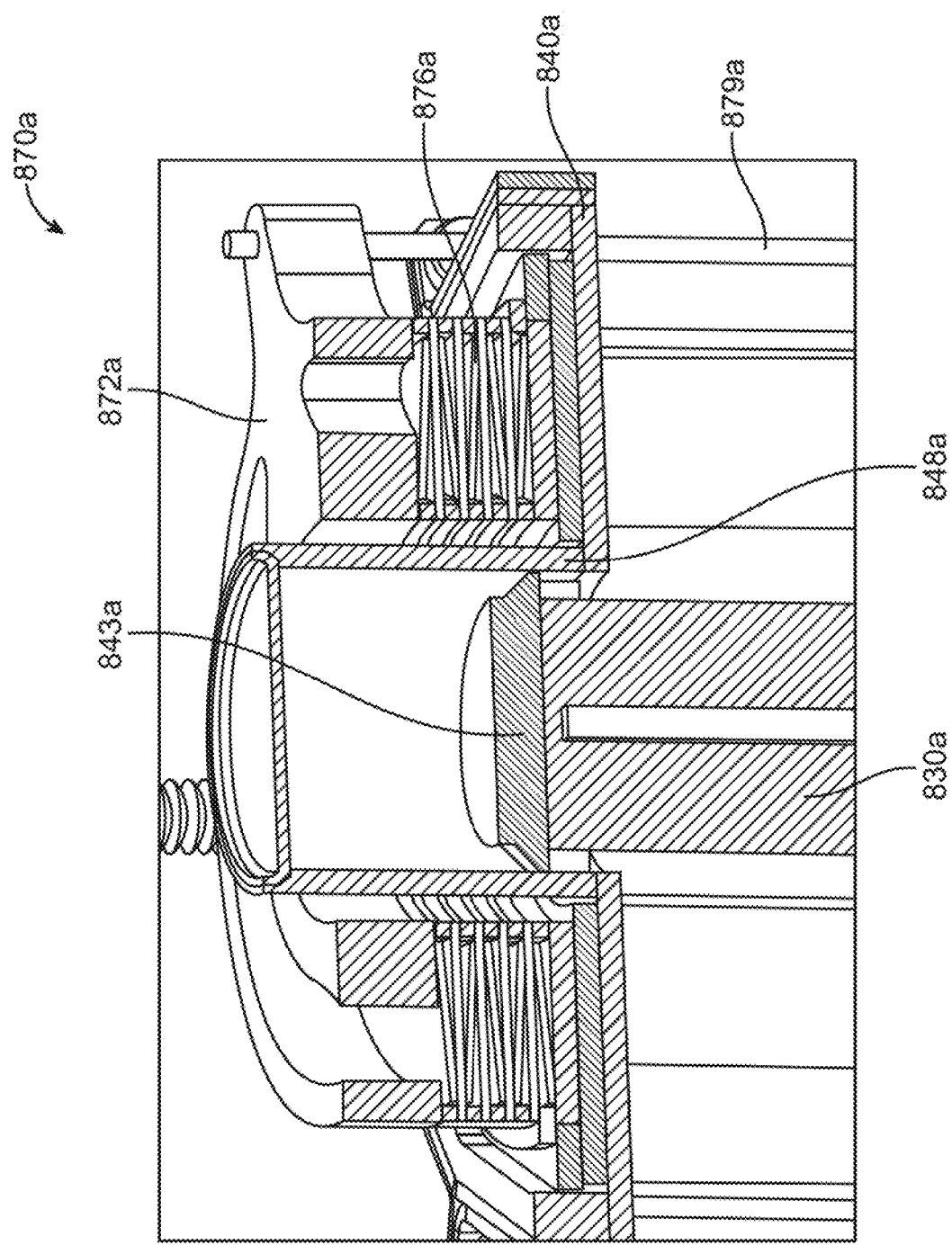
FIGS. 19A and 19B are top perspective views of top compression plate assemblies according to two different embodiments.
Figure 19B:
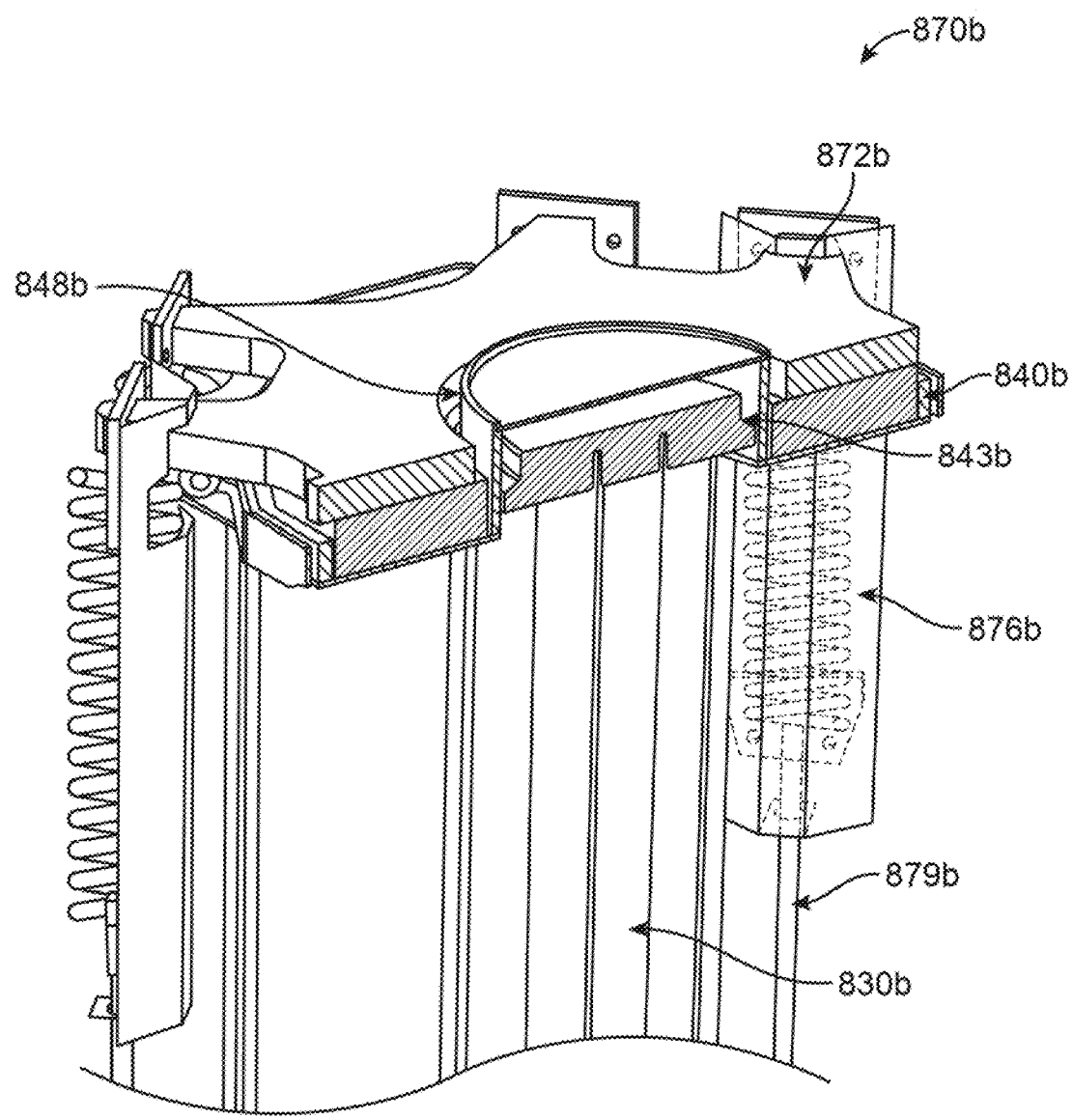

FIGS. 19A and 19B are top perspective views of top compression plate assemblies 870a/b according to two different embodiments. Each of the top compression plate assemblies 870a/b may be positioned on top end of a electrochemical cell stack and a base plate assembly (e.g., base plate assembly 660a/b/c) or a bottom end plate (e.g., the bottom end plate 662a/b/c) may be positioned on a bottom end of the electrochemical cell stack opposite the top end. The top compression plate assemblies 870a/b comprise a top end plate 840a/b and a top compression plate 872a/b positioned on the top end plate 840a/b. A biasing member 876a/b is positioned proximate to the top end of electrochemical cell stack and configured to exert a compressive force on the stack of the plurality of electrochemical cell units. Furthermore, at least one compression member 879a/b couples the compression plate 872a/b to the base plate assembly, for example, a bottom compression plate such as the high strength sealing plate of the base plate assembly, and is configured to transmit the compressive force from the top compression plate 872a/b to the base plate assembly.

Expanding further, FIG. 19A is a top perspective view of the top compression plate assembly 870 including the top end plate 840a and post interface tube 848a (e.g., the top end plate 740 of FIG. 18) along with the top compression plate 872a, a basing member 876a (e.g., a spring pack), and compression member 879a, according to an embodiment deployed in the fuel cell stack included in the array 200 of FIG. 7A. The top end plate 840 is positioned around a post 830a such that a gap exists therebetween, as previously described herein. A compliant sealing member 843a is positioned in the gap above the post 830a. In this example, the biasing member 876a is a stack of high temperature Belleville springs interposed between the top compression plate 872a and the top end plate 840a. Other embodiments could use coil springs, or various forms of wave washer. The biasing member 876a generates the compressive force to compress the stack. Two compression members 879a (e.g., tension rods) carry the forces from the top to the bottom of the stack, where a compression plate (not shown) transmits the load to the bottom end plate. The individual Belleville springs of the biasing member 876a are separated with guide shims that align and guide the spring pack so that it cannot drift sideways nor over-compress the Belleville springs. The Belleville springs are designed for low stress when at operating temperature. The compression members 879a are made of a super alloy that has high strength at temperature. They have a higher coefficient of thermal expansion than the stack, with the effect that the spring pack releases slightly on heat up.

The top compression plate assembly 870b of FIG. 19B is similar to that of FIG. 19A, except that the biasing member 876b of the compression plate assembly 870b of FIG. 19B includes a plurality of coil spring sets (eight in this embodiment) rather than the Belleville spring pack. Furthermore, the post 830b has a compliant sealing member 843b positioned thereon which may be similar to the post assembly 530c described with respect to FIG. 15C. The top compression plate assembly 870b was implemented in the fuel cell stack included in the array 300 of FIG. 7B.

Figure 20A:
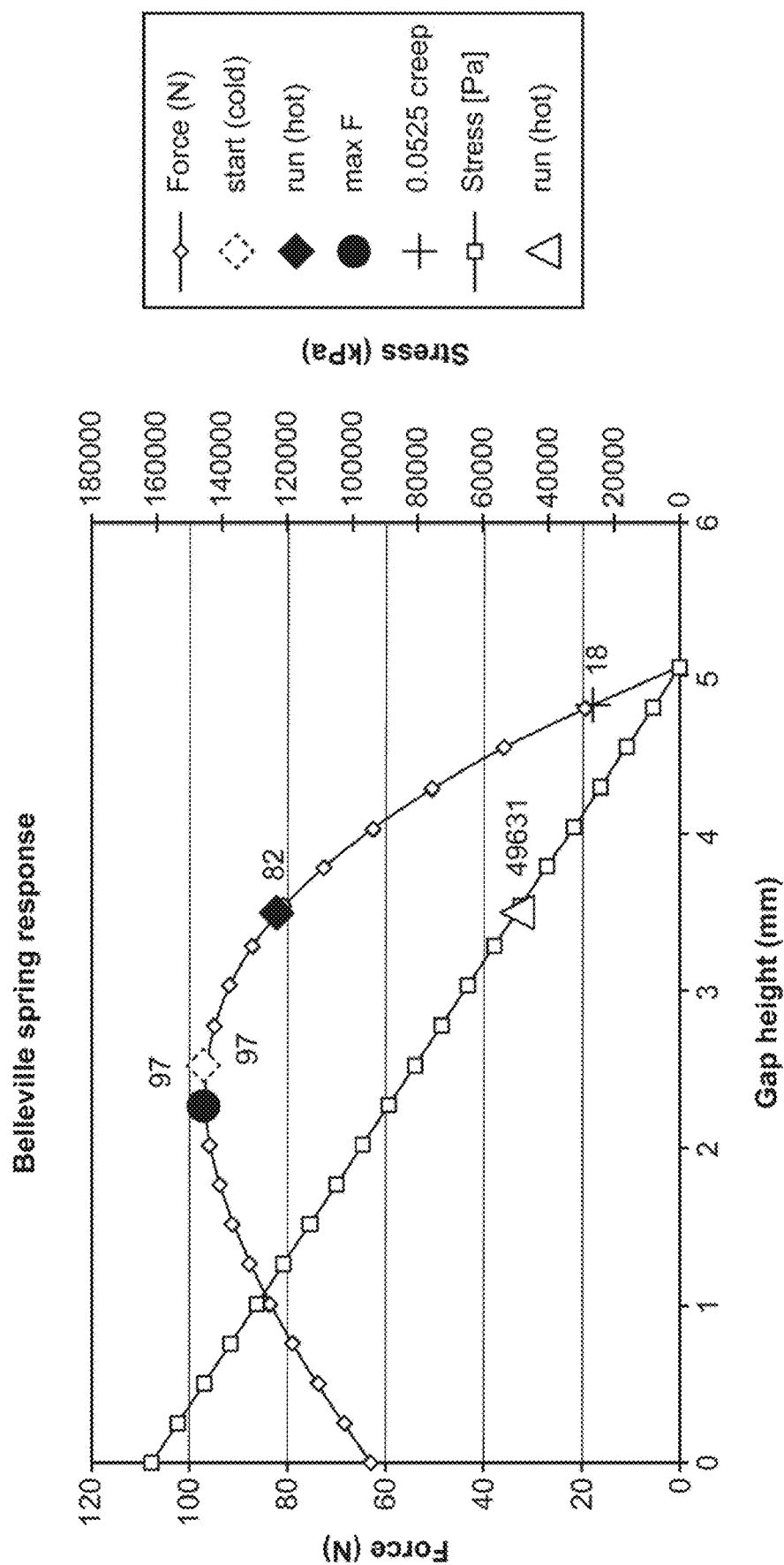
FIG. 20A is a graph showing the spring response of a Belleville spring pack that may be used in the top compression plate assembly of FIG. 19A, according to one embodiment.
Figure 20B:
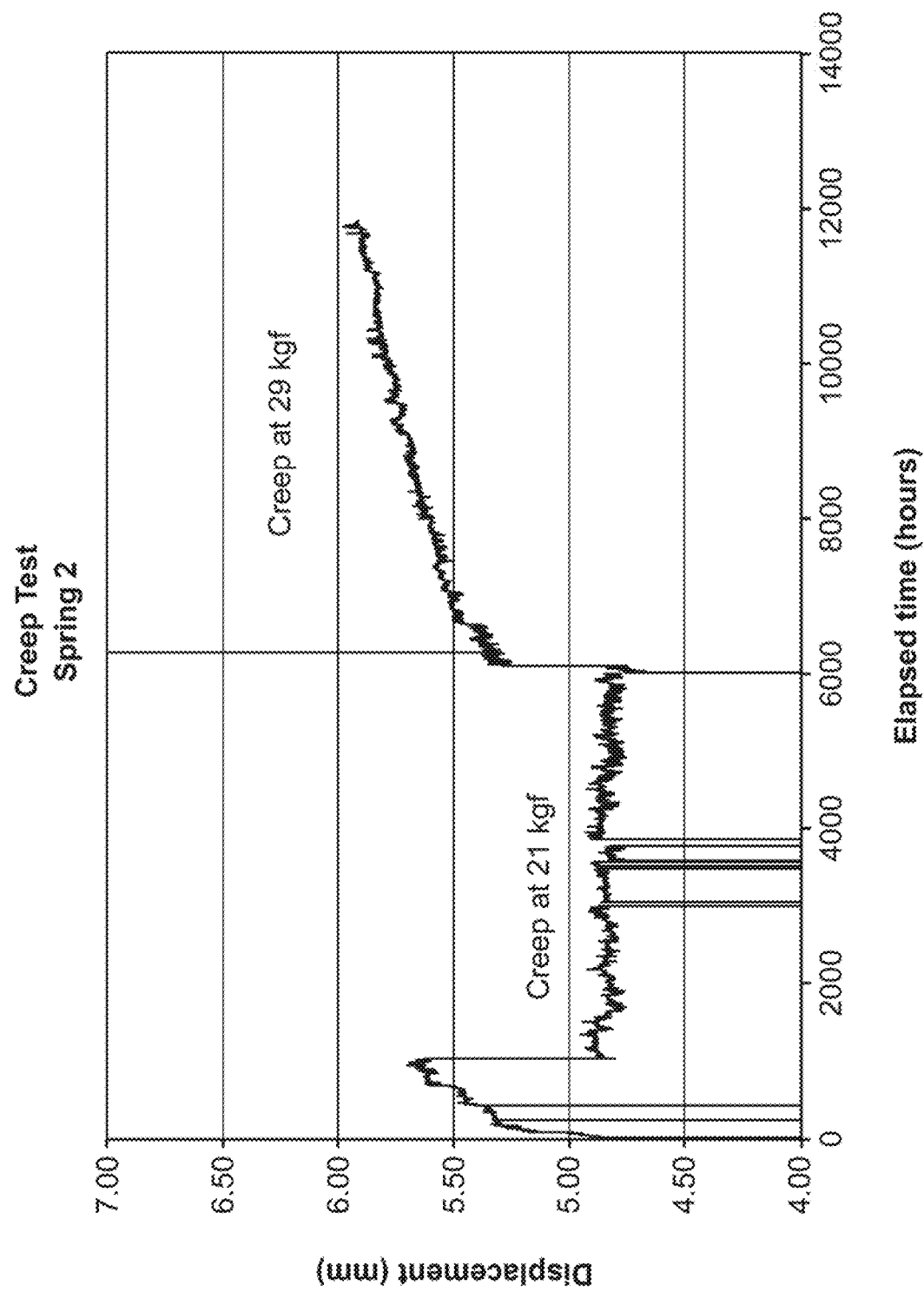
FIG. 20B is a graph showing creep of a coil spring that may be used in the top compression plate assembly of FIG. 19B, according to another embodiment.

FIG. 20A is a graph showing the spring response of a Belleville spring pack that may be used in the top compression plate assembly 870a of FIG. 19A, according to one embodiment. FIG. 20B is a graph showing creep of a coil spring that may be used in the top compression plate assembly of FIG. 19B, according to another embodiment. The differential growth of the stack relative to the tension rods has the effect of unloading the stack during heatup. This is by design and has the side benefit of providing more stack compression during transport when temperatures are cold and material creep is not of concern. The geometry is chosen such that the compression relaxes to a target compression at operation. The circle represents the peak force point, and is also where the spring goes unstable. If pushed to this limit, the spring risks inverting itself down the left side of the force displacement graph. If this occurs, the spring no longer provides useful loading to the stack, and is not recoverable without disassembly.

The design therefore limits the displacement to no more than the top diamond point (about 97 Newton) when the stack is cold. As the stack is heated, the differential thermal expansion allows the spring set to relax to the lower diamond point, where the stack is loaded to 82 Newton and the spring stress drops below 50 MPa, which is within the creep limits of certain super-alloys (e.g., Waspalloy, Haynes 282). The '+' point represents the compressive load remaining on the stack after 0.5% creep in the tension rods. The loading remains an acceptable 18 Newton after this creep, at which point the peak stress in the spring drops to 10 MPa. This unloading of spring and compression members will slow the net creep rate of the overall system. In order to make best use of the spring characteristics it is allowed to experience higher stress at room temperature where material creep is not a concern. The numbers provided are illustrative of a particular case. In general the strategy of designing for cold versus hot conditions, and for accounting for system creep in operation will apply to all designs, but the details will depend on the goals and requirements of the particular stack.

In a similar manner, the coil springs in FIG. 19B may have a higher design load cold, and relax to their hot compression target during operation. FIG. 20B shows over 1.5 years of testing of a sample coil spring at operating temperature in pure creep. The desired operating range for this spring, hot, is 9 kgf to 36 kgf. This testing shows that at 29 kgf some creep will occur, but as the load reduces to 21 kgf the spring is stable against further creep. These results validate the hot spring design against the target requirements.

Manifold Design

The outer manifolds connect the oxidant ports from each unit cell to the base plate, where the oxidant can be routed to (or from) the oxidant connection adjacent to the fuel connections. Opposing faces of the stack are left open to the environment where the oxidant can flow directly from (or to) all the cells. For example, FIG. 21A (fuel cell stack 110 and fuel cell stack included in array 200) and 21B (electrochemical cell stack of array 300) are bottom perspective views of electrochemical cell stacks 910a/b (e.g., fuel cell stacks or electrolysis cell stacks) including an outer manifold 912a/b.

Figure 21A:
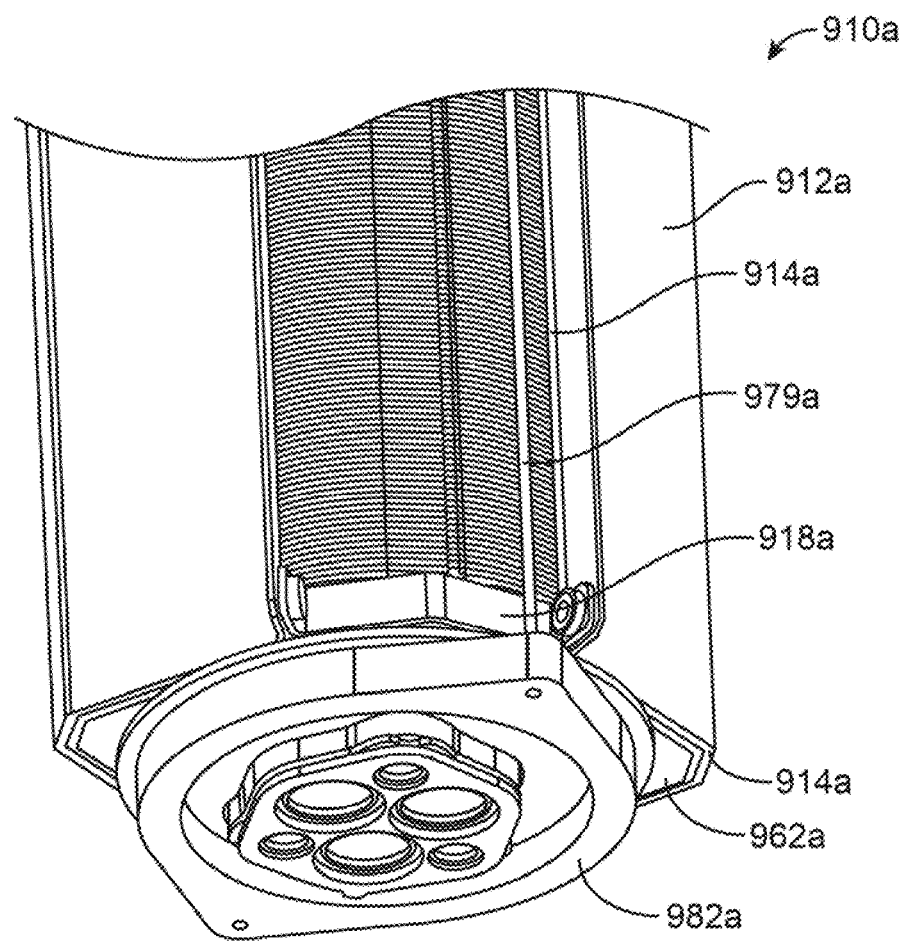
FIGS. 21A and 21B are bottom perspective views of fuel cell stacks including an outer manifold, according to two different embodiments.
Figure 21B:
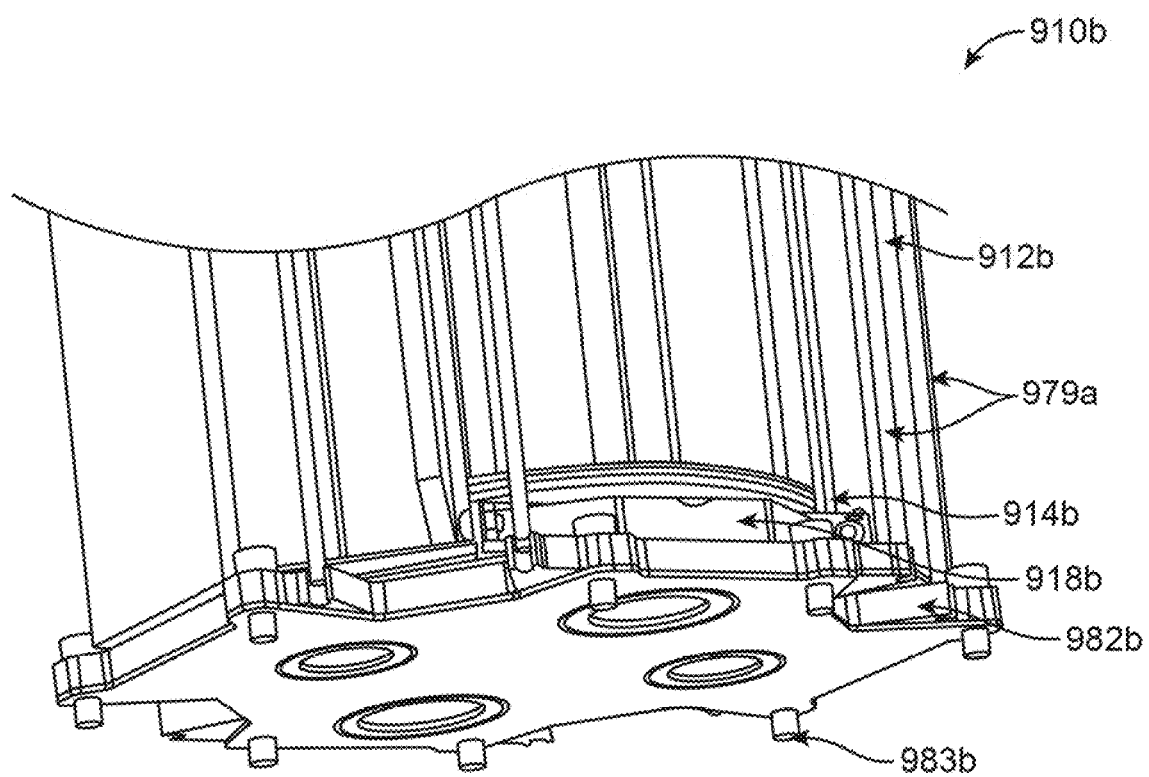

FIG. 21A shows an configuration with two inlets (front and rear faces) and two outlets (left and right faces, routed to base connection point). A bottom end plate 962a is positioned at a base of the electrochemical cell stack 910a and a bottom compression plate 982a is positioned below the bottom end plate 962a. Compression members 979a transmit compressive force from a top compression plate to the bottom compression plate 982a so as to urge the bottom compression plate 982a and thereby the bottom end plate 962a towards the electrochemical cell stack 910a so as to secure the electrochemical cell stack 910a. FIG. 21B shows an alternative implementation of the structure shown in FIG. 21A. The same functional parts are present, except in a different configuration, so that the attachment bolts 983b come down from the top of the bottom compression plate 982b rather than up from the bottom, as shown in the embodiments of FIG. 21A. Referring to FIGS. 21A-B, the manifolds 912a/b are made of sheet metal and held in place by bolted clips 918a/b. Between the manifolds 912a/b and the end plates and stack core is a dielectric seal member 914a/b positioned in a volume defined by the manifold 912a/b around the electrochemical cell stack and configured to fluidly seal a first portion of the volume from a second portion of the volume. The dielectric seal member 914a/b separates the oxidant inlet from the oxidant outlet. Small leaks across the seal formed by the dielectric seal member 914ab may be allowable without detriment to stack operation.

In the particular example shown in FIG. 21B the oxidant outlet (or inlet) port is divided in two and consists of the lower left and upper right openings in the bottom end plate (not shown) positioned between the bottom compression plate 982b and the electrochemical cell stack 910b. These are routed within the bottom end plate to a volume defined in the manifold 982b on the left and right of the electrochemical cell stack 910b. In this particular example two ports are shown which provides for lower parasitic pressure drop on the oxidant flow. The remaining ports (left and right openings) are the fuel in and fuel out ports, the position of which can be interchanged as needed.

Depending on the application, open or closed manifolds may be preferred. The open manifold 912a shown in FIG. 21A helps with thermal coupling to the environment. This is useful, for example, in an electrolysis system or energy storage system where there are operating conditions in which the electrochemical cell stack 910a is required to absorb heat from the environment. In a pure electrochemical cell system where reforming is limited to a level where the stack is running net exothermically, a full manifold may be preferred.

A full (closed) manifold effectively insulates the operating stack core from its environment. For exothermic operating conditions, this allows reduction of the environment temperature, potentially by up to 100° C. This can provide significant benefits in terms of reducing the insulation requirements around the stack or stack array, and in terms of allowing lower grade materials to be used around the stack. This may result in system level cost savings. It may also reduce other system level challenges such as chrome volatilization, and other material transport or material oxidation challenges.

The following section describes examples of performance of various electrochemical cell stacks according to the embodiments described herein. These examples are only for illustrative purposes and are not meant to limit the scope of the concepts described herein.

Experimental Examples

It is counter to current wisdom that by decreasing the component size, the overall power density (per kg and per L) can be increased. Accepted wisdom is that the path to increased power density and lower cost is to reduce part count while making each part bigger. This pre-supposes that stack volume and cost are significantly driven by the non-active parts of the stack (seal areas, end plates, compression, etc.) and that by moving to larger cells the contribution of these non-active areas to the overall stack cost will drop. Producing large cells is difficult for planar SOFC where the cells are thin ceramic components. Much effort continues to be expended trying to scale up SOFC cell size.

In contrast embodiments described herein demonstrate that, through novel design, smaller parts can lead to higher power density and the potential for lower cost. It shows that, counter to current wisdom, moving to smaller cells can reduce the cost of non-active components by enabling them to be smaller and simpler that their larger counterparts even when considered in proportion to total active area or power output.

Experiments were conducted, comparing three different known fuel cell stacks with an example fuel cell stack according to one embodiment. All stacks were manufactured using the same basic materials. Each stack was of a planar solid oxide fuel cell design. Each stack used anode supported nickel-yttria stabilized zirconia cells of the same type, but with size and thickness appropriate to the specific stack. Each stack had metallic interconnects made of ferritic stainless steel. Each stack had end plates of appropriate size and strength to support the compression forces necessary for stack operation. The stacks fabricated according to the embodiments described herein also contained a compression system. A baseline 28-cell stack with 121 $cm^2$ active area cells was operated at 390 $mA/cm^3$ and provided a gross power of 1200 W. It measures 190 mm×190 mm×150 mm for a total volume of 5.4 L and weighs 17 kg, achieving a power-to-weight ratio of 69 W/kg, and a power-to-volume ratio of 225 W/L. A 120 cell stack with 550 $cm^2$ active area cells was operated at 290 $mA/cm^2$ and provided a gross power of 16,900 W. It measures 395 mm×395 mm×618 mm for a total volume of 96 L and weighs 238 kg (with end plate), achieving a power-to-weight ratio of 71 W/kg, and a power-to-volume ratio of 176 W/L. In contrast, stack made according to an embodiment, with 225 cells with active area of 25 cm$^2$ each was operated at 0.39 mA/cm$^2$ and provided a gross power of 1760 W. It measures 79 mm×71 mm×254 mm for a total volume of 1.4 L and weighs 2.4 kg, and achieved a power-to-weight ratio of 733 W/kg, and a power-to-volume ratio of 1257 W/L. Although relatively young compared to the other stack designs, the stack of this embodiment already achieved 10× the power density by weight and about 7× the power density by volume. This results were unexpected, especially in view of the accepted belief that the path to increased power density and lower cost is to reduce part count while making each part bigger.

Figure 22:
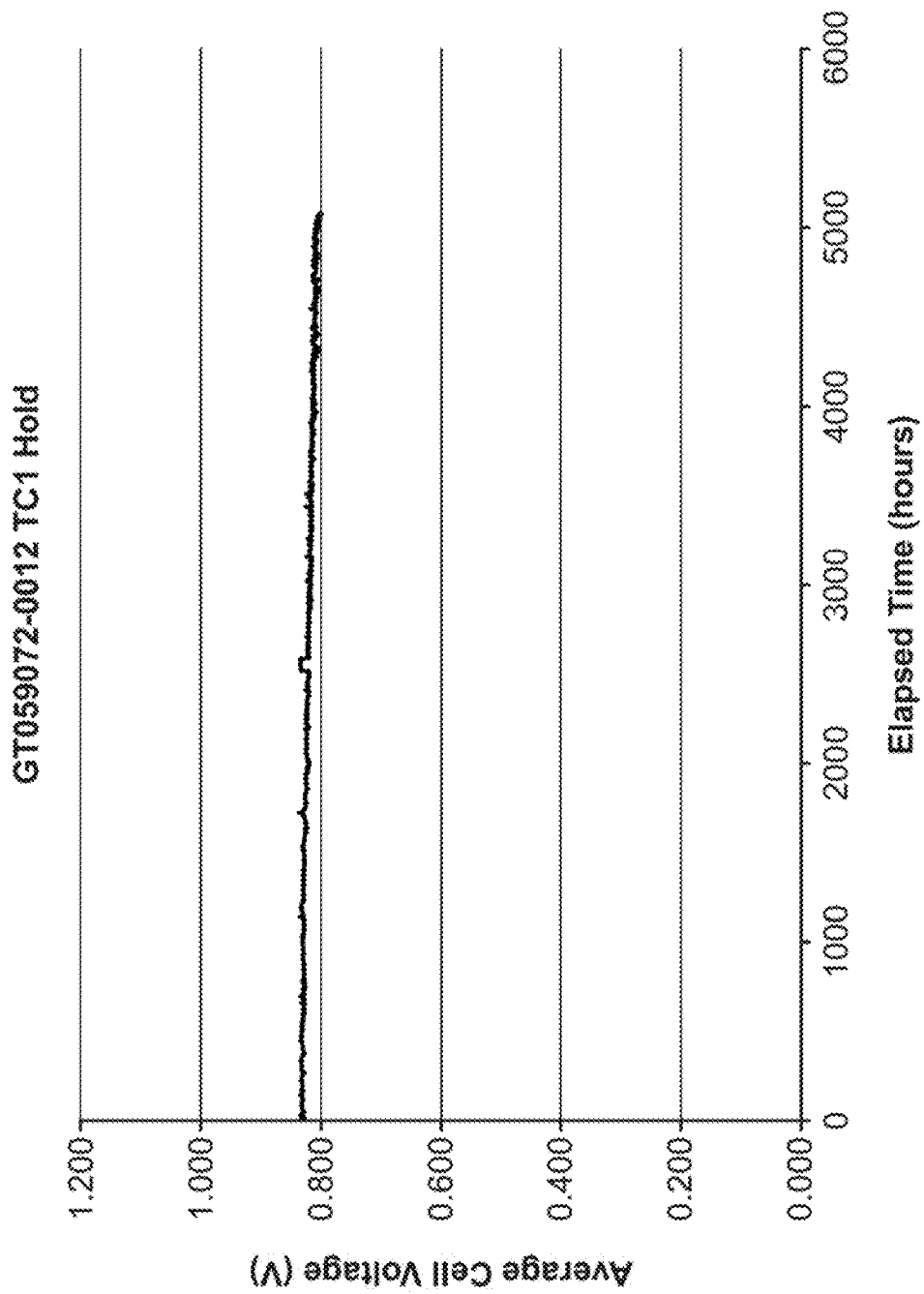
FIG. 22 shows test data resulting from testing performed using a 225-cell (~1 kW) stack operating on gas compositions representative of a typical natural gas fired system application.
Figure 23:
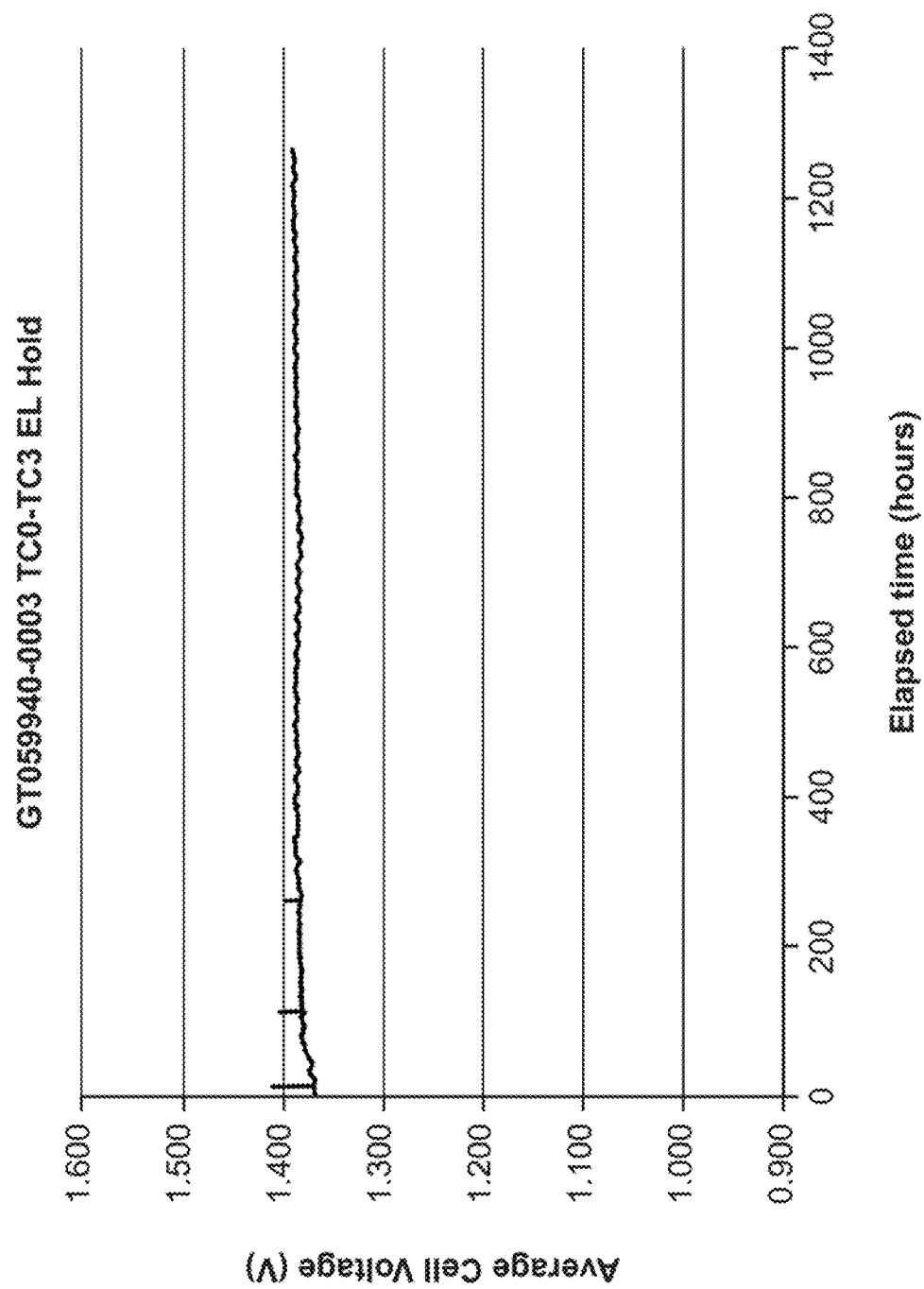
FIG. 23 shows test data resulting from testing performed using a 20-cell implementation according to the fuel cell stack array of FIG. 7A operating as an electrolyzer converting steam to hydrogen.
Figure 24:
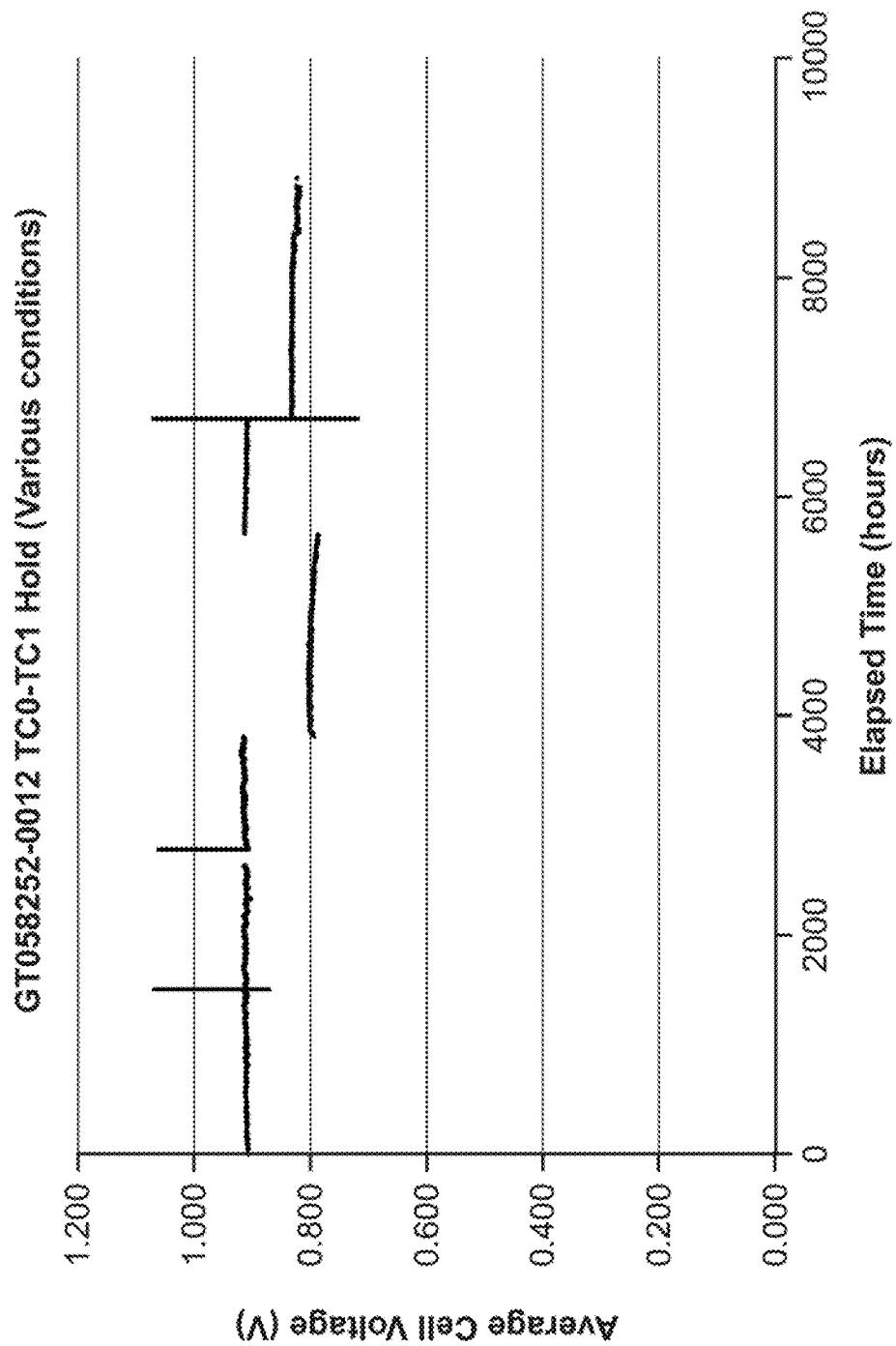
FIG. 24 shows results of a 60-cell implementation according to the fuel cell stack array of FIG. 7A running a variety of hydrogen fuel cell conditions, with a total test time exceeding one year.

A selection of test data is presented in FIGS. 22-24. FIG. 22 shows a 225-cell (~1 kW) stack according to the embodiments of fuel cell stack 110 and included in the array 200, operating on gas compositions representative of a typical natural gas fired system application. The gas conditions include representative levels of gas utilization, representative current density and temperature, and representative levels of in-stack steam reforming to convert inlet natural gas into hydrogen, carbon monoxide, and carbon dioxide. The stack demonstrated stable operation over more than 5000 hours, with a degradation rate in line with that expected from the cell materials that were used. Namely there is no aspect of the degradation that can be linked to the stack design. This provides a demonstration of the ability of the stack to handle the typical flows and thermal conditions, including in-stack reforming, of a natural gas fired system, while delivering the full potential of the underlying repeat cell materials.

FIG. 23 shows results of a 20-cell implementation of the same stack, running very aggressive electrolysis conditions of −2 A/cm$^2$. Some test interruptions caused by failures in the balance of plant (not attributable to the stack) occurred early in the test and are visible as spikes in the data at approximately 25, 125, and 250 hours elapsed time. After an initial degradation (in electrolysis degradation manifests as an increase in voltage) which may have been caused by the test interruptions, the stack demonstrated more than 1000 hours of operation with no degradation despite the aggressive conditions. This shows the flexibility of the stack to operate across a variety of thermal and flow conditions, and its relative immunity from degradation.

FIG. 24 shows results of a 60-cell implementation of the same stack, running a variety of pure hydrogen fuel cell conditions, with a total test time exceeding one year. While the changing conditions make determination of a degradation rate difficult, the stack displayed high stability (low degradation) over the full year of testing, including test conditions that were highly exothermic. This is visible as the relative flatness of the voltage curves, with the step changes corresponding to changes in the test conditions. This demonstrates the relative long term stability of the stack, as well as its ability to reject heat when operated in an exothermic mode and without internal reforming to absorb some of that exotherm.

FIGS. 23 and 24 show results that include thermal cycles, where no change in performance is observed before and after thermal cycle, illustrating the ability of the stack to be thermal cycled despite the use of glass ceramic seals. This demonstrates the success of the intrinsically compliant structure to enable the use of hermetic or near-hermetic glass-ceramic seals, while preventing the thermal stress buildup that would otherwise cause seal or cell failures.

Figure 25:
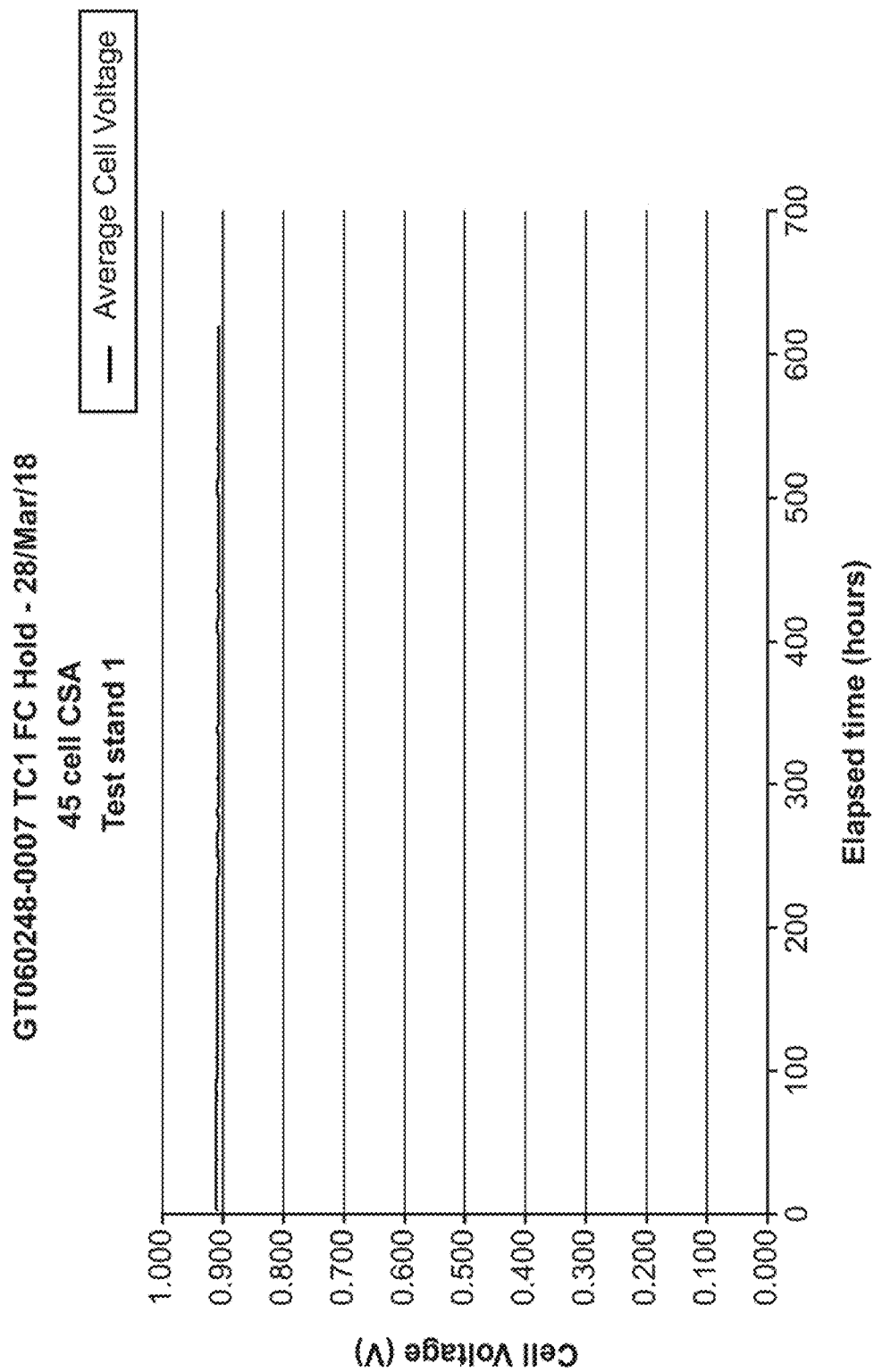
FIG. 25 shows results of a 45-cell implementation according to the fuel cell stack array of FIG. 7B running a 0.25 A/cm$^2$ fuel cell condition (power generation).

FIG. 25 shows results from a 45-cell implementation of a electrochemical cell stack according to the array 300, running in electrochemical cell mode at 0.25 A/cm$^2$, demonstrating very low degradation after one thermal cycle. These results showcase that the somewhat larger cell stack (81 cm$^2$ active area) has not interfered with the ability to reject thermal stress and to extract the full potential from the material set.

Figure 26:
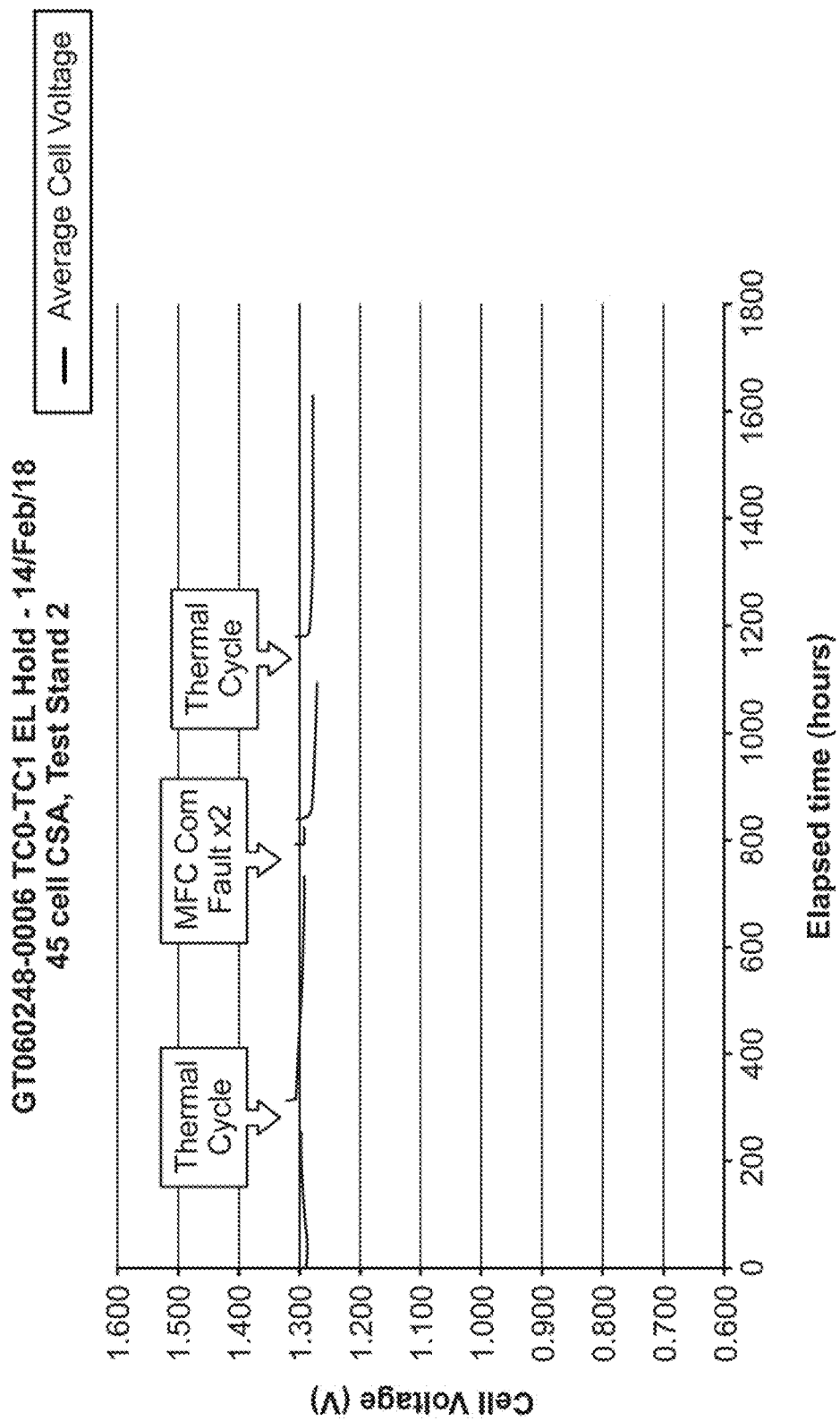
FIG. 26 shows results of a 45-cell implementation according to the fuel cell stack array of running a −1 A/cm$^2$ electrolysis (hydrogen production) condition.

FIG. 26 shows results from a separate 45-cell implementation of a fuel cell stack according to the array 300, running in electrolysis mode at −1 A/cm$^2$, demonstrating very low degradation, and in fact a slight improvement in overall performance after 1600 hours in test. This test also suffered aggressive thermal cycles due to balance of plant failures (not stack related) which had no negative impact on stack performance, demonstrating its robustness to aggressive transients.

The integrated design described above addresses many of the key barriers between SOFC technology and current markets, in part by offering an opportunity for significant cost reductions, both at the stack level (due to reduced material content, and easier to automate parts) and at the system level, where the stack characteristics offer opportunities for system simplification (high voltage output, low current, compact packaging, low external heat exchange requirements, no external compressive load requirement, etc.).

In all cases it is understood that the above-described arrangements are merely illustrative of the many possible specific embodiments that represent applications of the present invention. Numerous and varied other arrangements, including use of different electrolytes, can be readily devised in accordance with the principles of the concepts described herein without departing from the spirit and scope of the invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, perforated baffles may be further optimized to achieve the intent of increasing residence time without creating dead zones.

What is claimed is:

1. An electrochemical cell stack comprising:
   a plurality of electrochemical cells, each comprising an oxidant electrode, a fuel electrode, and an electrolyte disposed between the oxidant electrode and the fuel electrode; and
   a plurality of interconnects, each interconnect being disposed between adjacent electrochemical cells and comprising an interconnect main body, the interconnect main body including a plurality of corrugations defining a plurality of fuel channels on a first surface of the interconnect main body facing a first adjacent electrochemical cell, and a plurality of oxidant channels on a second surface of the interconnect main body facing a second adjacent electrochemical cell;
   wherein a longitudinal channel extends through the plurality of electrochemical cells and the plurality of interconnects in a longitudinal axis of the electrochemical cell stack, the longitudinal channel including a cavity defined by an outer surface;
   wherein each of the plurality of fuel channels and the plurality of oxidant channels are positioned around the longitudinal channel; and
   wherein a post is disposed in the cavity of the longitudinal channel and surrounded by the outer surface, the post defining at least one post inlet configured to deliver fuel to the plurality of electrochemical cells and at least one post outlet configured to receive unreacted fuel from the plurality of electrochemical cells and expel the unreacted fuel from the electrochemical cell stack, the at least one post inlet and the at least one post outlet being fluidly isolated from each other.

2. The electrochemical cell stack of claim 1, further comprising:
   a plurality of outer seal members, each positioned at an outer perimeter of a respective interconnect on the first surface; and
   a plurality of inner seal members, each positioned at an inner perimeter of the respective interconnect on the second surface around the longitudinal channel,
   wherein the outer seal members fluidly isolate the plurality of fuel channels from a volume outside the outer perimeter, and the inner seal members fluidly isolate the plurality of oxidant channels from the longitudinal channel.

3. The electrochemical cell stack of claim 2, wherein the outer seal members and the inner seal members alternate between the outer perimeter and the inner perimeter of the plurality of interconnects such that the plurality of interconnects and the plurality of electrochemical cells cooperatively form a bellows like structure and the electrochemical cell stack has compliance.

4. The electrochemical cell stack of claim 1, further comprising:
   a top end plate positioned at a top end of the electrochemical cell stack around the post such that a gap is provided between the top end plate and the post, the gap structured to allow movement of the post therewithin for relieving thermal stress.

5. The electrochemical cell stack of claim 4, further comprising a compliant sealing member positioned in the gap, the compliant sealing member configured to allow the movement of the post.

6. The electrochemical cell stack of claim 5, further comprising:
   a top end cap positioned on the top end plate; and
   a secondary sealing member interposed between the top end plate and the top end cap.

7. The electrochemical cell stack of claim 4, wherein the top end plate comprises a post interface tube extending axially from a surface of the top end plate away from the post, at least a portion of the post interface tube positioned around a portion of the post.

8. The electrochemical cell stack of claim 4, further comprising:
   a bottom end plate positioned on a bottom end of the electrochemical cell stack opposite the top end;
   a top compression plate positioned on the top end plate;
   a biasing member positioned proximate to the top end of the electrochemical cell stack and configured to exert a compressive force on the stack of the plurality of electrochemical cells; and
   at least one compression member coupled to the top compression plate and configured to transmit the compressive force from the top compression plate to the bottom end plate.

9. The electrochemical cell stack of claim 8, further comprising a bottom compression plate positioned at the bottom end of the electrochemical cell stack, wherein the at least one compression member is coupled to the bottom compression plate.

10. The electrochemical cell stack of claim 8, wherein the biasing member comprises a stack of Belleville springs interposed between the top compression plate and the top end plate.

11. The electrochemical cell stack of claim 8, wherein the biasing member comprises a plurality of coil springs operatively coupled to the top compression plate.

12. The electrochemical cell stack of claim 1, further comprising a base plate assembly positioned at a bottom end of the electrochemical cell stack, the base plate assembly comprising:
   a bottom end plate defining at least one fuel port and at least one oxidant port; and
   a sealing plate axially aligned with the bottom end plate and configured to yield relative to the bottom end plate so as to reduce transfer of mechanical stress from the sealing plate to the bottom end plate.

13. The electrochemical cell stack of claim 12, wherein the sealing plate is positioned between the stack of the plurality of electrochemical cells and the bottom end plate, and wherein the base plate assembly further comprises a plurality of short tubes positioned between the sealing plate and the bottom end plate.

14. The electrochemical cell stack of claim 12, wherein the bottom end plate is interposed between the stack of the plurality of electrochemical cells and the sealing plate, and wherein the base plate assembly further comprises a plurality of short tubes positioned between the sealing plate and the bottom end plate, the plurality of short tubes configured to yield in response to thermal stress such that the sealing plate is free to move laterally relative to the bottom end plate so as to reduce stress transfer to the bottom end plate.

15. The electrochemical cell stack of claim 2, further comprising a manifold disposed around the stack of the plurality of electrochemical cells, the manifold defining the volume around the outer perimeter, a first portion of the volume providing an inlet for oxidant into the electrochemical cell stack, and a second portion of the volume providing an outlet for spent oxidant from the electrochemical cell stack.

16. The electrochemical cell stack of claim 15, further comprising a dielectric sealing member positioned in the volume and configured to fluidly seal the first portion of the volume from the second portion of the volume.

17. An electrochemical cell assembly comprising:
a housing comprising a housing base; and
an array of electrochemical cell stacks disposed on the housing base within the housing, each of the electrochemical cell stacks included in the array comprising:
a plurality of electrochemical cells, each comprising an oxidant electrode, a fuel electrode, and an electrolyte disposed between the oxidant electrode and the fuel electrode; and
a plurality of interconnects, each interconnect being disposed between adjacent electrochemical cells and comprising an interconnect main body, the interconnect main body including a plurality of corrugations defining a plurality of fuel channels on a first surface of the interconnect main body facing a first adjacent electrochemical cell, and a plurality of oxidant channels on a second surface of the interconnect main body facing a second adjacent electrochemical cell;
wherein a longitudinal channel extends through the plurality of electrochemical cells and the plurality of interconnects in a longitudinal axis of the electrochemical cell stack, the longitudinal channel including a cavity defined by an outer surface;
wherein each of the plurality of fuel channels and the plurality of oxidant channels are positioned around the longitudinal channel; and
wherein a post is disposed in the cavity of the longitudinal channel and surrounded by the outer surface, the post defining at least one post inlet configured to deliver fuel to the plurality of electrochemical cells and at least one post outlet configured to receive unreacted fuel from the plurality of electrochemical cells and expel the unreacted fuel from the electrochemical cell stack, the at least one post inlet and the at least one post outlet being fluidly isolated from each other.

18. The electrochemical cell assembly of claim 17, further comprising:
a ring separator positioned around each of the electrochemical cell stacks; and
a cross separator positioned between each set of four electrochemical cell stacks included in the array of electrochemical cell stacks.

19. The electrochemical cell assembly of claim 17, further comprising an oxidant preheat tube positioned between each set of four electrochemical cell stacks through the corresponding cross separator.

20. The electrochemical cell assembly of claim 17, further comprising a fuel inlet, a fuel outlet, an oxidant inlet and an oxidant outlet fluidly coupled to the array of electrochemical cell stacks through the housing base, wherein the housing base defines at least one heat exchange channel configured to provide heat exchange between the fuel entering the housing base through the fuel inlet and spent fuel exiting the housing base through the fuel outlet.

21. The electrochemical cell assembly of claim 20, further comprising a fuel bypass inlet fluidly coupled to the array of electrochemical cell stacks through the housing base, the fuel bypass inlet bypassing the at least one heat exchange channel.

22. The electrochemical cell stack of claim 2, wherein the inner seal members and the outer seal members are ceramic seals.

23. The electrochemical cell stack of claim 1, wherein the post comprises a substantially circular cross-section and grooves extending longitudinally along a periphery of the post, the grooves defining the at least one post inlet and the at least one post outlet.

24. The electrochemical cell stack of claim 23, wherein the post further comprises two seal cavities extending longitudinally along the periphery of the post, the seal cavities each positioned between the at least one post inlet and the at least one post outlet along the periphery of the post.

25. The electrochemical cell stack of claim 1, wherein the post comprises two parallel plates extending across a center of the longitudinal channel, the post configured to divide the longitudinal channel into exactly one post outlet and exactly one post inlet, wherein the plurality of oxidant channels are fluidly isolated from the longitudinal channel.

26. The electrochemical cell stack of claim 25, wherein the post further comprises an elongated bar coupling the parallel plates together along the longitudinal axis of the electrochemical cell stack.

27. The electrochemical cell stack of claim 26, wherein the parallel plates define seal cavities therebetween, the seal cavities separated by the elongated bar.

28. The electrochemical cell stack of claim 1, wherein the post comprises a central channel fluidly coupled to two side channels each defining one of the post inlets.

29. The electrochemical cell stack of claim 28, wherein the post further comprises fuel inlet plates separating the central channel from the two side channels, each fuel inlet plate comprising a plurality of openings configured to allow fuel to flow therethrough.

30. The electrochemical cell stack of claim 29, wherein the post further comprises two fuel outlet plates each defining one of the post outlets and separating the post outlets from the central channel.

31. The electrochemical cell stack of claim 30, wherein the post defines exactly two fuel inlets and two fuel outlets and wherein the plurality of oxidant channels are fluidly isolated from the longitudinal channel.

32. The electrochemical cell stack of claim 30, wherein the fuel outlet plates each comprise a primary plate and two flanges extending perpendicularly from first and second longitudinal edges of the primary plate, each flange extending parallel and adjacent to one of the fuel inlet plates, wherein each flange and an adjacent fuel inlet plate define a seal cavity therebetween.

33. The electrochemical cell stack of claim 32, further comprising a seal member separating each seal cavity from the central channel.

* * * * *